US012783991B2

(12) United States Patent
Romano et al.

(10) Patent No.: US 12,783,991 B2
(45) Date of Patent: Nov. 3, 2026

(54) REFUSE CONTAMINATION ANALYSIS

(71) Applicant: The Heil Co., Chattanooga, TN (US)

(72) Inventors: Anthony Romano, Havertown, PA (US); Michael Dean Geary, Toronto (CA); John Forrest Smith, Fort Payne, AL (US); Garrett Eckerl, Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 334 days.

(21) Appl. No.: 18/411,989

(22) Filed: Jan. 12, 2024

(65) Prior Publication Data

US 2024/0346428 A1 Oct. 17, 2024

Related U.S. Application Data

(63) Continuation of application No. 16/523,903, filed on Jul. 26, 2019, now Pat. No. 11,875,301.
(Continued)

(51) Int. Cl.
*G06K 9/00* (2022.01)
*B65F 1/00* (2006.01)
(Continued)

(52) U.S. Cl.
CPC ....... *G06Q 10/0832* (2013.01); *B65F 1/0033* (2013.01); *G06F 18/24* (2023.01);
(Continued)

(58) Field of Classification Search
CPC ......... G06N 20/00; G06V 20/00; G06V 20/20
See application file for complete search history.

(56) References Cited

U.S. PATENT DOCUMENTS 2,272,693 A 2/1942 De
3,752,061 A * 8/1973 Hirsch .................. B30B 9/3078 100/189
(Continued)

FOREIGN PATENT DOCUMENTS

CA 2250547 A1 * 4/2000 ........... B30B 9/3042
CA 2918411 9/2016
(Continued)

OTHER PUBLICATIONS

Early detection and evaluation of waste through sensorized containers for a collection monitoring application, Alberto Rovetta et al., Elsevier, 2009, pp. 2939-2949 (Year: 2009).*
(Continued)

*Primary Examiner* — Jayesh A Patel
(74) *Attorney, Agent, or Firm* — Fish & Richardson P.C.

(57) ABSTRACT

A computer-implemented method for analyzing refuse includes operations of receiving sensor data indicating an operational state of a vehicle body component of a refuse collection vehicle (RCV); analyzing the sensor data to detect a presence of a triggering condition based at least partly on a particular operational state of the vehicle body component, as indicated by the sensor data; in response to detecting the triggering condition, accessing image data indicating a physical state of refuse collected by the RCV; providing the image data as input to at least one contaminant detection model trained, using at least one machine learning (ML) algorithm, to output a classification of the image data, the classification indicating a degree of contamination of the refuse; and storing, in a machine-readable medium, the classification of the image data.

20 Claims, 37 Drawing Sheets

Related U.S. Application Data

(60) Provisional application No. 62/760,764, filed on Nov. 13, 2018, provisional application No. 62/711,367, filed on Jul. 27, 2018.

(51) Int. Cl.

| | |
|---|---|
| ***G06F 18/24*** | (2023.01) |
| ***G06N 20/00*** | (2019.01) |
| ***G06Q 10/0832*** | (2023.01) |
| ***G06V 20/00*** | (2022.01) |
| ***G06V 20/20*** | (2022.01) |

(52) U.S. Cl.
CPC ............. *G06N 20/00* (2019.01); *G06V 20/00* (2022.01); *G06V 20/20* (2022.01); *B65F 2001/008* (2013.01)

(56) References Cited

U.S. PATENT DOCUMENTS

| | | | | |
|---|---|---|---|---|
| 4,260,316 | A | 4/1981 | Gollnick | |
| 4,714,122 | A | 12/1987 | Appleton et al. | |
| 4,854,406 | A | 8/1989 | Appleton et al. | |
| 5,062,759 | A | 11/1991 | Pieperhoff | |
| 5,215,423 | A * | 6/1993 | Schulte-Hinsken | G01S 17/875 414/408 |
| 5,636,122 | A | 6/1997 | Shah et al. | |
| 5,713,270 | A * | 2/1998 | Fitzgerald | B30B 9/3007 100/229 A |
| 5,762,461 | A * | 6/1998 | Frohlingsdorf | B65F 3/00 414/408 |
| 5,837,945 | A | 11/1998 | Cornwell et al. | |
| 5,890,865 | A | 4/1999 | Smith et al. | |
| 8,092,141 | B2 | 1/2012 | Curotto et al. | |
| 9,403,278 | B1 * | 8/2016 | Van Kampen | B25J 9/1612 |
| 9,884,585 | B1 | 2/2018 | Lubbers | |
| 10,026,336 | B2 * | 7/2018 | Holman | G07F 17/0092 |
| 10,633,180 | B2 | 4/2020 | Salinas et al. | |
| 10,692,220 | B2 | 6/2020 | Gao et al. | |
| 10,706,587 | B1 | 7/2020 | Sorgi et al. | |
| 10,721,375 | B1 | 7/2020 | Boyd et al. | |
| 11,010,903 | B1 | 5/2021 | Gallaudet et al. | |
| 11,144,066 | B1 | 10/2021 | Ebrahimi Afrouzi | |
| 11,222,491 | B2 | 1/2022 | Romano et al. | |
| 11,446,706 | B2 * | 9/2022 | Zeng | B07C 5/342 |
| 11,580,799 | B2 | 2/2023 | Romano et al. | |
| 11,615,275 | B2 | 3/2023 | Swaroop et al. | |
| 11,816,940 | B2 | 11/2023 | Romano et al. | |
| 11,875,301 | B2 | 1/2024 | Romano et al. | |
| 12,073,669 | B2 | 8/2024 | Romano et al. | |
| 12,080,040 | B2 | 9/2024 | Swaroop et al. | |
| 2002/0159870 | A1 | 10/2002 | Pruteanu et al. | |
| 2003/0031543 | A1 | 2/2003 | Elbrink | |
| 2007/0209529 | A1 * | 9/2007 | Poss | B65F 1/1607 100/229 A |
| 2008/0061977 | A1 | 3/2008 | Maruca et al. | |
| 2009/0092284 | A1 | 4/2009 | Breed et al. | |
| 2009/0169348 | A1 | 7/2009 | Maruca et al. | |
| 2009/0306836 | A1 * | 12/2009 | Ausman | G01D 7/00 701/3 |
| 2009/0306863 | A1 | 12/2009 | Curotto et al. | |
| 2011/0036738 | A1 | 2/2011 | Hiltl | |
| 2011/0068954 | A1 | 3/2011 | McQuade et al. | |
| 2011/0116899 | A1 | 5/2011 | Dickens | |
| 2011/0188976 | A1 | 8/2011 | Rowland et al. | |
| 2011/0190942 | A1 | 8/2011 | Nicholson et al. | |
| 2011/0210124 | A1 | 9/2011 | Da Silva et al. | |
| 2011/0279227 | A1 | 11/2011 | Maruca et al. | |
| 2013/0039728 | A1 | 2/2013 | Price et al. | |
| 2013/0083330 | A1 | 4/2013 | Piana et al. | |
| 2013/0215270 | A1 | 8/2013 | Murashita et al. | |
| 2013/0251485 | A1 | 9/2013 | Howell et al. | |
| 2013/0260448 | A1 | 10/2013 | Wilson et al. | |
| 2013/0313419 | A1 | 11/2013 | Nakazawa et al. | |
| 2014/0031736 | A1 * | 1/2014 | Wright | A61M 1/367 604/500 |
| 2014/0239059 | A1 | 8/2014 | Flood et al. | |
| 2014/0270495 | A1 | 9/2014 | Tu et al. | |
| 2014/0343801 | A1 * | 11/2014 | Whitfield, Jr. | B65F 3/041 701/49 |
| 2014/0379588 | A1 | 12/2014 | Gates et al. | |
| 2015/0139536 | A1 | 5/2015 | Jin et al. | |
| 2015/0348252 | A1 * | 12/2015 | Mask | G06V 20/52 382/103 |
| 2016/0232719 | A1 | 8/2016 | Brinig et al. | |
| 2017/0237949 | A1 | 8/2017 | Wang et al. | |
| 2017/0293800 | A1 | 10/2017 | Babenko et al. | |
| 2017/0332199 | A1 | 11/2017 | Elliott et al. | |
| 2017/0345169 | A1 | 11/2017 | Rodoni | |
| 2017/0355522 | A1 * | 12/2017 | Salinas | B65F 3/02 |
| 2017/0362030 | A1 | 12/2017 | Steimel | |
| 2018/0044109 | A1 | 2/2018 | Butcher et al. | |
| 2019/0087790 | A1 | 3/2019 | Flood | |
| 2019/0159162 | A1 | 5/2019 | Hassan | |
| 2019/0210798 | A1 | 7/2019 | Schultz | |
| 2019/0325220 | A1 | 10/2019 | Wildgrube et al. | |
| 2019/0385384 | A1 | 12/2019 | Romano et al. | |
| 2020/0034785 | A1 | 1/2020 | Romano et al. | |
| 2020/0082167 | A1 | 3/2020 | Shalom et al. | |
| 2020/0193620 | A1 | 6/2020 | Armstrong et al. | |
| 2021/0078799 | A1 | 3/2021 | Salinas et al. | |
| 2021/0158308 | A1 * | 5/2021 | Armstrong | G06Q 10/30 |
| 2021/0326658 | A1 | 10/2021 | Swaroop et al. | |
| 2021/0354911 | A1 * | 11/2021 | Yhap | B65F 1/0033 |
| 2022/0139126 | A1 | 5/2022 | Romano et al. | |
| 2022/0177220 | A1 | 6/2022 | Price et al. | |
| 2022/0229183 | A1 | 7/2022 | Chang | |
| 2023/0230340 | A1 | 7/2023 | Swaroop et al. | |
| 2023/0267784 | A1 | 8/2023 | Romano et al. | |
| 2024/0087381 | A1 | 3/2024 | Romano et al. | |
| 2025/0340370 | A1 | 11/2025 | Olsen et al. | |

FOREIGN PATENT DOCUMENTS

| | | | | |
|---|---|---|---|---|
| CN | 104495139 | B * | 2/2017 | G07F 7/08 |
| CN | 107600791 | A * | 1/2018 | |
| EP | 3216725 | A1 * | 9/2017 | B65F 3/201 |
| EP | 3483092 | | 5/2019 | |
| JP | H0447703 | Y2 * | 11/1992 | |
| KR | 10-2017-0109273 | | 9/2017 | |
| WO | WO-2012015664 | A1 * | 2/2012 | H02S 40/38 |
| WO | WO2012106174 | A1 * | 8/2012 | |
| WO | WO 2017176855 | | 10/2017 | |
| WO | WO 2018189668 | | 10/2018 | |

OTHER PUBLICATIONS

CA Office Action issued in Canadian Application No. 2,969,939, dated Jul. 19, 2019, 3 pages.

CA Office Action issued in Canadian Application No. 2,969,939, dated Oct. 4, 2018, 4 pages.

Extended European Search Report in European Appln No. 21793530.3, mailed on Jul. 3, 2024, 10 pages.

International Search Report and Written Opinion in International Appln. No. PCT/US2021/022761, dated Jul. 9, 2021, 7 pages.

Liu et al., "Deep Learning Model Comparison for Vision-Based Classification of Full/Empty-Load Trucks in Earthmoving Operations," Applied Sciences, Nov. 2019, 9(22):1-20.

Office Action in Canadian Appln. No. 3,107,756, dated May 22, 2026, 3 pages.

Extended Search Report in European Appln. No. 19840950.0, dated Sep. 10, 2021, 11 pages.

Pace, "Life Cycle Assessment Based Modeling of Organic Waste Residue Using Anaerobic Digestion and Composting," Dissertation for the degree of Doctor of Philosophy in Biological Systems Engineering, University of California, Jul. 2017, 133 pages.

PCT International Preliminary Report on Patentability in International Appln. No. PCT/US2019/043771, dated Feb. 11, 2021, 9 pages.

(56) References Cited

OTHER PUBLICATIONS

PCT International Search Report and Written Opinion in International Appln. No. PCT/US2019/043771, dated Nov. 12, 2019, 12 pages.

Pekdur, "Autonomous Solid Waste Separation System Design," Thesis for the degree of Master of Science in Mechanical Engineering, Izmir Institute of Technology, Graduate School of Engineering and Sciences, Jun. 2006, 85 pages.

Rose et al., "A comparative life cycle assessment of diesel and compressed natural gas powered refuse collection vehicles in a Canadian city," Energy Policy, 2013, 52:453-461.

Sudha et al., "An Automatic Classification Method for Environment—Friendly Waste Segregation Using Deep Learning," 2016 IEEE International Conference on Technological Innovations in ICT for Agriculture and Rural Development, 2016, 6 pages.

* cited by examiner

Contamination Detected

Time: 6/5/2:39:31 PM

Location: 37.422-122.084

2000

REFUSE CONTAMINATION ANALYSIS

CROSS-REFERENCE TO RELATED APPLICATIONS

This application is a continuation of U.S. patent application Ser. No. 16/523,903, entitled "Refuse Contamination Analysis," filed Jul. 26, 2019, which claims the benefit under 35 U.S.C. § 119 (e) of U.S. Patent Application No. 62/711,367, entitled "Refuse Contamination Analysis," filed Jul. 27, 2018, and U.S. Patent Application No. 62/760,764, entitled "Applied Machine Learning For Refuse Contaminant Detection," filed Nov. 13, 2018, all of which are incorporated herein by reference in their entirety.

BACKGROUND

In the refuse industry, refuse collection and processing often involves one or stages in which different types of materials are handled separately. For example, recyclable materials (e.g., glass, paper, certain plastics, etc.) can be handled separately from non-recyclable refuse, and/or biodegradable refuse can be handled separately from non-biodegradable refuse. In some instances, a customer of a refuse collection company may be asked to separate recyclable and non-recyclable materials for separate pickup. Accordingly, the mixing of different types of materials, which would be separately handled, into a same refuse collection bin may pose challenges to a refuse collection and processing company.

SUMMARY

Implementations of the present disclosure are generally directed to analyzing refuse to determine different types of materials that may be present in the refuse. More particularly, implementations of the present disclosure are directed to collecting image(s) and/or other contaminant sensor data of the refuse, employing machine learning to analyze the image(s) and/or other contaminant sensor data to detect the presence (or absence) of various types of materials (e.g., recyclable and/or non-recyclable materials) in the refuse, and sending alert notifications and/or performing other action(s) based on identifying different types of materials (e.g., contamination) in the refuse.

In general, innovative aspects of the subject matter described in this specification can be embodied in methods that include operations of: receiving sensor data indicating an operational state of at least one vehicle body component in the vehicle, the sensor data generated by at least one sensor device that is arranged to determine the operational state of the at least one vehicle body component; analyzing the sensor data to detect a presence of at least one triggering condition that is based at least partly on a particular operational state of the at least one vehicle body component, as indicated by the sensor data; capturing at least one image showing the refuse that has been emptied from a container handled by the vehicle at a time proximal to when the at least one triggering condition is present, wherein the at least one image is captured while the refuse is stationary; and analyzing the at least one image to determine that the refuse exhibits contamination and, in response, performing at least one action associated with the contamination.

In general, innovative aspects of the subject matter described in this specification can be embodied in methods that include operations of: receiving sensor data indicating an operational state of at least one vehicle body component in the vehicle, the sensor data generated by at least one sensor device that is arranged to determine the operational state of the at least one vehicle body component; analyzing the sensor data to detect a presence of at least one triggering condition that is based at least partly on a particular operational state of the at least one vehicle body component, as indicated by the sensor data; capturing at least one image showing the refuse as it is being emptied, into a receptacle that is conveyed by the vehicle and that is not a component of the vehicle, the at least one image captured at a time proximal to when the at least one triggering condition is present; and analyzing the at least one image to determine that the refuse exhibits contamination and, in response, performing at least one action associated with the contamination.

These and other implementations can each optionally include one or more of the following innovative features: the at least one vehicle component includes a lifting component that operates to empty the container into the receptacle of the vehicle; the at least one triggering condition includes the operational state in which the lifting component is at a predetermined point in its operational cycle to empty the container; the predetermined point is a completion of the operational cycle to empty the container; the at least one image is selected, from a plurality of images captured by the at least one camera, based on a timestamp of at least one image being at a predetermined offset after a time when the at least one triggering condition is present; determining that the refuse exhibits contamination comprises presenting the at least one image in a user interface (UI) executing on a computing device, and receiving an indication that is provided through the UI to indicate that the refuse exhibits the contamination; determining that the container exhibits contamination comprises providing the at least one image as input to an image classification engine that has been trained, using machine learning, to identify images that show refuse contamination, and receiving, as output from the image classification engine, an indication that the refuse exhibits contamination as determined based on a classification of the at least one image by the image classification engine; the vehicle is a refuse collection vehicle; the container is a refuse container; the at least one image is captured by at least one camera that is affixed to the vehicle; the receptacle is a hopper of the vehicle; the receptacle is conveyed by the vehicle and not a permanently attached component of the vehicle; the receptacle is a Curotto-Can™ being conveyed by the vehicle; and/or the receptacle is a carry can being conveyed by the vehicle.

In general, innovative aspects of the subject matter described in this specification can be embodied in methods that include operations of: accessing data that describes a physical state of the refuse, the data generated by at least one sensor device arranged to sense the refuse; providing the data as input to at least one contaminant detection model that has been trained, using at least one machine learning (ML) algorithm, to output a classification of the data, wherein the classification indicates a degree of contamination of the refuse; and based on the classification, performing at least one action that is associated with the degree of contamination of the refuse.

These and other implementations can each optionally include one or more of the following innovative features: the at least one sensor device includes at least one camera; the data includes one or more of image data and video data of the refuse; the data shows the refuse in one or more of the visible, infrared, x-ray, microwave, and ultraviolet spectra; the at least one sensor device includes one or more of a SONAR device, a LIDAR device, and a RADAR device that emits sound a signal toward the refuse; the data describes at least a portion of the signal that is reflected off of the refuse; the classification and feedback regarding the classification are provided to a model training module to retrain the at least one contaminant detection model; the feedback is generated by at least one of a manual review process and an automated review process; the data is provided to multiple contaminant detection models that each outputs a respective classification based on the data; the at least one action is performed based on the multiple classifications output by the multiple contaminant detection models; the degree of contamination is a presence of non-recyclable material in the refuse; the at least one contaminant detection model further outputs a boundary information that describes one or more boundaries of contaminant objects identified in the refuse, the boundary information including one or more of a bounding box and object segmentation information for each of the contaminant objects; at least a portion of the refuse is spread by a vibration generating mechanism prior to collection of the data; at least a portion of the refuse is illuminated by a light source during the collection of the data; the light source is configurable to provide illumination based on one or more of a time of day, a location of a vehicle transporting the refuse, a direction of the vehicle, and shadows on the refuse; the at least one contaminant detection model corresponds to one or more of a particular type of vehicle transporting the refuse, a particular vehicle, a particular locale, and a particular set of one or more possible contaminants to be identified; the data is provided to multiple contaminant detection models that each outputs a respective classification based on the data; each of the multiple contaminant detection models analyzes data that is produced by a respective one or more sensor devices; the at least one action is performed based on the multiple classifications output by the multiple contaminant detection models; the multiple contaminant detection models provide redundancy to accommodate failure of the at least one sensor device; the at least one action includes correlating the classification with a location where the refuse, which exhibits the contamination, is collected; and/or the classification is an object classification that identifies one or more contaminant objects present in the refuse.

Moreover, implementations can each optionally include one or more of the following innovative features: the at least one contaminant detection model further operates, based on location information (e.g., GPS information) and/or at least one signal from vehicle body or vehicle chassis, to correlate with at least one location source of contaminant(s) identified in the refuse; classification includes contaminant object detection, and action(s) include tagging object detection with time and location, notify billing, notify recycling facility, in real-time to re-route the vehicle; the at least one location source of contaminant identified in the refuse or at least one location source of recycling material identified in the refuse is used in conjunction with a GIS layer to identify the producing source or customer; the data shows the refuse direct or indirect material weight or density; the at least one sensor device includes at least one microphone, the data includes one or more of audio data of the refuse, the analysis is further based on proximity of the microphone to the contaminant sensor field-of-view; the at least one contaminant detection model further in use at least one GPS information or at least one signal from vehicle body or vehicle chassis or at least one sensor to create a customized machine learning network; peer-to-peer inter-vehicle networking to share detection model data) and/or load balancing between vehicle (e.g., edge) and cloud or between vehicles based on processing availability, communication costs, real-time requirements, etc.; the classification includes an object classification that indicates a list of recyclable materials present in the refuse and/or a list of contaminant materials present in the refuse; the machine learning includes one or more of classification (e.g., the recyclables are contaminated) and object detection (e.g., what and where are the contaminants); the degree of contamination is a presence of recyclable material in the refuse; and/or the at least one contaminant detection model further uses boundary information that describes one or more boundaries of contaminant objects identified in the refuse as an input for training and classification. In some implementations, refuse weight is measured and provides an indicator of contamination (e.g., Styrofoam and plastic bags are very light compared to other objects). Moreover, audio data that is collected to capture the sound of dropped items may be synchronized with video sensors and can indicate the (e.g., unique) sound of Styrofoam or other contaminants. Multiple microphones can be used to help determine the location of the contaminant within the collected refuse.

In another general aspect, methods include operations of: receiving sensor data indicating an operational state of a vehicle body component of a refuse collection vehicle (RCV), the sensor data generated by a sensor device configured to detect the operational state of the vehicle body component; analyzing the sensor data to detect a presence of a triggering condition based at least partly on a particular operational state of the vehicle body component, as indicated by the sensor data; in response to detecting the triggering condition, accessing image data indicating a physical state of refuse collected by the RCV, the image data being generated by a camera mounted on the RCV and configured to generate digitized images of the refuse; providing the image data as input to at least one contaminant detection model trained, using at least one machine learning (ML) algorithm, to output a classification of the image data, the classification indicating a degree of contamination of the refuse; and storing, in a machine-readable medium, the classification of the image data.

These and other implementations can each optionally include one or more of the following innovative features: determining that the degree of contamination of the refuse exceeds a contamination threshold, and in response to determining the degree of contamination of the refuse exceeds the contamination threshold, routing the RCV to a recycling facility, the degree of contamination indicating a degree of recyclable material in the refuse; determining that the degree of contamination of the refuse exceeds a contamination threshold, and in response to determining the degree of contamination of the refuse exceeds the contamination threshold, routing the RCV to a landfill facility, the degree of contamination indicating a degree of non-recyclable material in the refuse; determining that the degree of contamination of the refuse exceeds a contamination threshold, and in response to determining the degree of contamination of the refuse exceeds the contamination threshold, transmitting a notification to a customer associated with the refuse exhibiting a degree of contamination above the contamination threshold; the at least one contaminant detection model further outputs boundary information that describes one or more boundaries of contaminant objects identified in the refuse, the boundary information including object segmentation information for each of the contaminant objects; the classification and feedback regarding the classification are provided to a model training module to retrain the at least one contaminant detection model, the feedback being generated by a review process; the vehicle body component includes a lifting component that operates to empty a container into a receptacle of the vehicle, and the triggering condition includes an operational state in which the lifting component is at a predetermined point in its operational cycle to empty the container.

In another general aspect, a refuse collection vehicle includes: a hopper configured to receive refuse; a refuse collection surface movable to deposit refuse for transport in the hopper; and a camera configured to generate digitized images of refuse positioned on the refuse collection surface.

These and other implementations can each optionally include one or more of the following innovative features: the refuse collection surface is movable to cover an opening of the hopper and configured to temporarily interrupt falling of the refuse into the hopper; the refuse collection surface is arranged within the hopper and moveable within the hopper; the refuse collection surface can be moved vertically within the hopper to accommodate an additional refuse placed on the refuse collection surface; a vibration generating mechanism configured to spread the refuse across the refuse collection surface prior to collection of digitized images of the refuse positioned on the refuse collection surface by the camera; a light source configured to illuminate the refuse on the refuse collection surface during collection of digitized images of the refuse positioned on the refuse collection surface by the camera; a body sensor device configured to detect an operational state of a vehicle body component of the RCV, and at least one processor communicably coupled to the body sensor device and the camera, the at least one processor configured to perform operations including: analyzing sensor data to detect a presence of a triggering condition based at least partly on a particular operational state of the vehicle body component, the sensor data being generated by the body sensor device and indicating an operational state of the vehicle body component of the RCV, in response to detecting the triggering condition, accessing image data generated by the camera, the image data indicating a physical state of refuse positioned on the refuse collection surface, providing the image data as input to at least one contaminant detection model trained, using at least one machine learning (ML) algorithm, to output a classification of the data, the classification indicating a degree of contamination of the refuse, and storing, in a machine-readable medium, the classification of the image data.

In another general aspect, a system includes: a refuse collection vehicle (RCV) that includes: a hopper configured to receive refuse, a refuse collection surface movable to deposit refuse for transport in the hopper, a body sensor device configured to detect an operational state of a vehicle body component of the RCV, and a camera configured to generate digitized images of refuse positioned on the refuse collection surface; and at least one processor communicably coupled to the body sensor device and the camera, the at least one processor configured to perform operations including: analyzing sensor data to detect a presence of a triggering condition based at least partly on a particular operational state of the vehicle body component, the sensor data being generated by the body sensor device and indicating an operational state of the vehicle body component of the RCV; in response to detecting the triggering condition, accessing image data generated by the camera, the image data indicating a physical state of refuse positioned on the refuse collection surface; providing the image data as input to at least one contaminant detection model trained, using at least one machine learning (ML) algorithm, to output a classification of the data, the classification indicating a degree of contamination of the refuse; and storing, in a machine-readable medium, the classification of the image data.

These and other implementations can each optionally include one or more of the following innovative features: the at least one processor is also configured to route the RCV to a waste receiving facility selected at least in part on the classification of the data indicating the degree of contamination of the refuse; the at least one processor is also configured to: determine that the degree of contamination of the refuse exceeds a contamination threshold, and in response to determining the degree of contamination of the refuse exceeds the contamination threshold, transmit a notification to a customer associated with the refuse exhibiting a degree of contamination above the contamination threshold; the refuse collection surface is movable to cover an opening of the hopper and configured to temporarily interrupt falling of the refuse into the hopper; the refuse collection surface is arranged within the hopper and moveable within the hopper; the at least one processor includes an onboard computing device located in the RCV.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
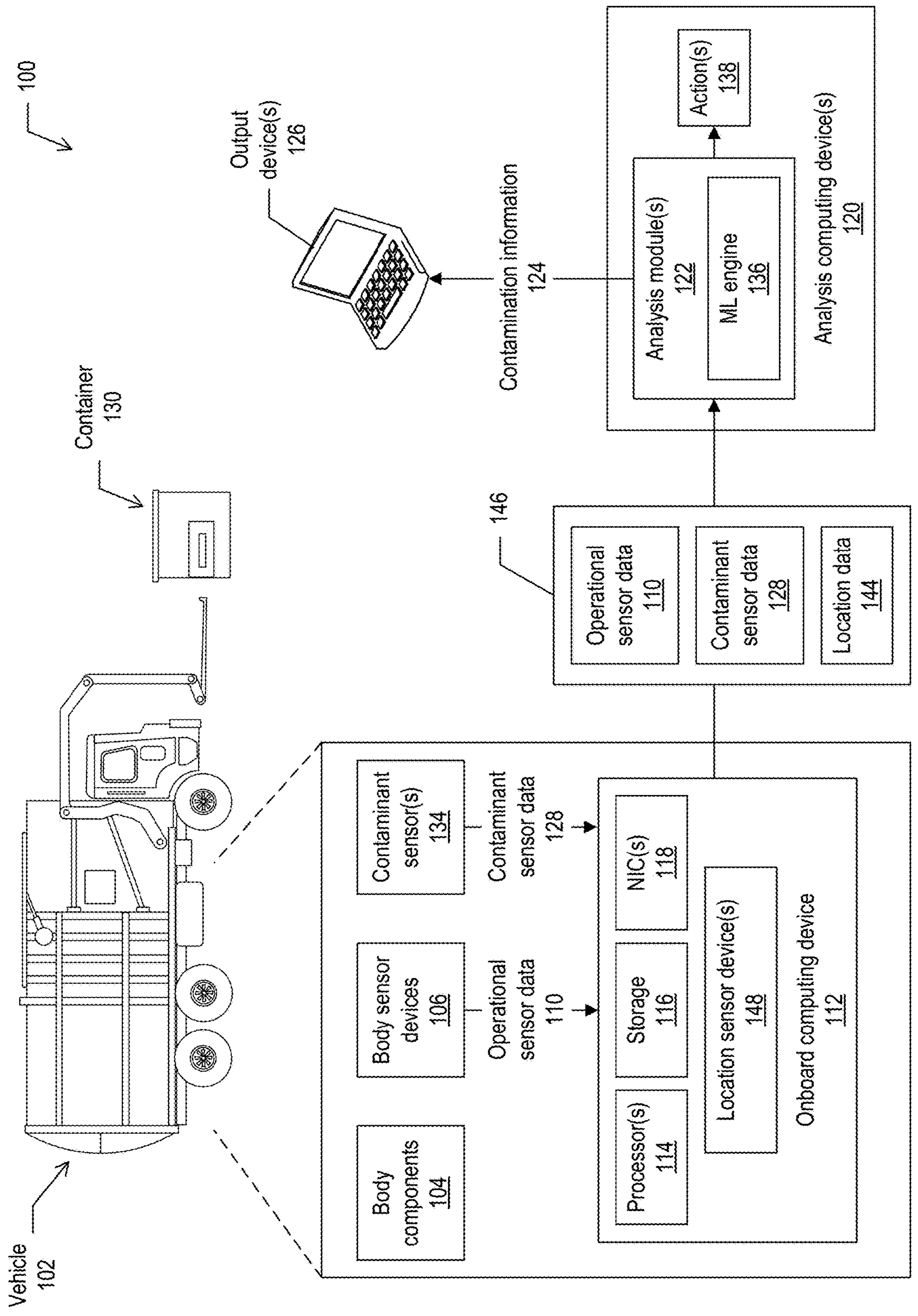
FIGS. 1A and 1B depict example systems for identifying refuse contamination and/or other issue(s), according to implementations of the present disclosure.

Implementations of the present disclosure are directed to systems, devices, methods, and computer-readable media for identifying different types of materials that may be present in refuse, based at least partly on analysis of image data and/or other contaminant sensor data generated by camera(s), other contaminant sensor device(s), and/or other device(s) that are components of a refuse collection vehicle (RCV) or that are otherwise in proximity to the RCV. During (or after) the collection of refuse by a RCV, one or more images of refuse can be generated by camera(s) that are in, on, or in proximity to the RCV. The image(s) can be analyzed to detect different types of materials that may be present in the refuse, such as the presence of recyclable materials in refuse that is otherwise expected to be non-recyclable. In some examples, the identification of material(s) in collected refuse can trigger the sending of an alert notification to one or more individuals, and/or other actions. In some implementations, various machine learning (ML) trained models can be employed to identify contamination in a refuse stream.

In some implementations, the image(s) of the refuse are generated while the refuse is in a substantially stationary state, such as after it has been emptied into or onto some component of the RCV. For example, the image(s) can be taken of the refuse after it has been emptied into a hopper of the RCV, such that a set of image(s) is taken of a top or near-top layer of refuse (e.g., the recently emptied refuse) in the hopper after each instance when a refuse container has been emptied into the hopper (e.g., after each instance of service a refuse collection customer). In some implementations, the refuse may be initially emptied onto or into a particular structural component of the RCV, and the image(s) may be taken of the refuse while it is on or in the structural component. The refuse may be subsequently moved (or allowed to fall) into the hopper after the image(s) have been taken. In this way, the image(s) may be taken while the emptying of the refuse from the container into the hopper is temporarily interrupted by a structure in the RCV, such as a ledge, gate, some other surface, or intermediary refuse holding chamber. Such examples are described further below.

In some instances, the emptying of a refuse container by an RCV includes emptying the refuse container into a receptacle that is being transported by the RCV but that is not a permanently attached component of the RCV, instead of being emptied into a hopper of the RCV. Examples of such a receptacle can include, but are not limited to, a Curotto-Can™ (e.g., carried by a front arm of the RCV) and a carry can (e.g., carried by a Bayne Lifter or other mechanism on the side of the RCV). The receptacle can be an automated can, such as a Curotto-Can™, or a semi-automated can, such as a carry can with tipper mechanism. In some implementations, the image(s) of the refuse are generated while the refuse is falling into the collection receptacle that is being transported by the RCV but that is not a component of the RCV itself.

In some implementations, operational sensor devices are located at various positions on the vehicle and arranged to generate operational sensor data that indicates a current operational state of one or more body components of the vehicle. As used herein, a body component describes a component of the vehicle that is not directly involved in causing the translational movement of the vehicle from one location to another. A body component is also referred to as a vehicle body component. For example, a body component can be a lifting component (e.g., lift arm) that operates to lift a refuse container and/or empty the refuse held by the the refuse container into a hopper of the RCV or other receptacle. Other types of body components are described below. The operational sensor data can be analyzed to determine the presence of a triggering condition that is based at least partly on the state or position of at least one body component, such as the lifting component being at a particular position in its cycle to lift and empty a refuse container into the hopper of the vehicle. Triggering conditions can also be based on other factors, such as the speed, deceleration, and/or location of the vehicle.

Based on a time when the triggering condition is present, one or more images of the refuse can be analyzed to determine different types of materials present in refuse in an RCV. For example, the image(s) can be generated at a time that is offset from a time when a lift arm empties a container into the hopper or Curotto-Can™, such as three seconds after the time when the refuse would have fallen into the hopper or can and come to rest. As another example, the image(s) can be generated at a time when the lift arm completes its cycle of empting a container, such as at the time when the lift arm would have replaced the emptied container back onto the ground.

In some implementations, determination of container overages can be through a user interface (UI) that displays various image(s) of refuse associated with refuse collection events, such as the emptying of different containers associated with different customers. A user can use control(s) of the UI to identify those image(s) that show different types of materials in the refuse, such as image(s) of refuse that contains recyclable materials. In some implementations, the image data can be provided to an image classification engine that has been trained or otherwise developed, using one or more suitable machine learning (ML) techniques, to analyze the image(s) and identify those image(s) that show the presence of different types of materials. ML techniques are also referred to herein as artificial intelligence (AI). For example, an engine can be trained to distinguish between recyclable materials and non-recyclable materials in the refuse stream. Other suitable techniques can also be employed to identify the presence of different types of materials in the refuse, such as image analysis that includes object recognition to recognize particular types of objects or materials. In some examples, spectral analysis can be employed to identify materials based on characteristic emissive and/or reflective properties of the materials. For example, a particular material can be characterized as emitting a particular, characteristic spectrum of visible, infrared (IR), ultraviolet (UV), and/or other ranges of the electromagnetic (EM) spectrum. The image(s) can be analyzed to look for that characteristic spectrum, and the presence of materials in the refuse can be determined based on such analysis. In some examples, variable-intensity light sources and/or emitters may be employed inside the hopper or elsewhere to generate the data that is analyzed.

Although examples herein may describe analyzing image(s) in the visible light spectrum to identify different types of materials in the refuse, implementations are not so limited. Implementations can also employ other ranges of the EM spectrum to identify materials, such as through analysis of images that capture emissions in the IR, microwave, or UV ranges. Implementations can also employ other types of contaminant sensors to detect the presence of materials in the refuse, such as radar or ultrasound probing. The imaging of the refuse can be passive, such as capturing image(s) of the refuse using camera(s). The imaging of the refuse can also be active, such as through using EM, sonic, or other types of probing to send a signal toward the refuse and detect any signal(s) reflected back from the refuse. In some implementations, the probing can activate radio-frequency identification (RFID), near-field communication (NFC), and/or other types of transmitters that may be present in the refuse. The materials in the refuse can then be identified based on signal(s) detected from the transmitters. In such examples, the data analyzed to identify contamination may include a non-image data stream that is processed sequentially and/or by frequency band, or in the frequency domain following a Fourier transform of the data.

Various action(s) can be performed based on the identification of different types of materials in the refuse. For example, a notification message can be sent to various individual(s) to describe the materials detected in a particular collection of refuse that has been collected from a particular customer, in instances where the refuse collected from that customer includes recyclables, biodegradable materials, and/or other materials that may be undesirable in that particular collection stream. As another example, an account of the owner (or entity responsible for the container) can be charged to compensate a refuse collection organization for handling the collection of refuse that has a particular mix of materials.

Identifying contaminants (unexpected or undesirable materials in a refuse stream) is important to the recycling industry because most recyclables today are collected via single-stream recycling. The ability to bring a pure stream of recyclable material back to the recycling facility increases and preserves the value that can be reclaimed from those materials, and decreases the amount of waste and expense that facility operators must manage. Implementations provide techniques for classification of materials within refuse, to help ensure a more efficient pure stream of recyclable (or non-recyclable) material. Contamination can refer to the presence of non-recyclable material in a stream that is expected to be recyclable, the presence of a recyclable material in a stream that is expected to be non-recyclable, and/or in general the presence of an unsuitable, unexpected, and/or undesirable material in a refuse stream.

In some implementations, the classification employs a ML-powered object classification using camera(s) and/or other contaminant sensor(s). The camera(s) and/or other contaminant sensor(s) collect image data (e.g., still image(s) and/or video data) and/or other contaminant sensor data which is analyzed, using a suitable ML and/or AI technique, to determine materials that are present in refuse, and determine whether undesirable materials are present in refuse. For example, the determination may identify the presence of recyclable materials in a stream that is expected to be non-recyclable, and/or identify the presence of non-recyclable materials in a stream that is expected to be recyclable. Accordingly, the analysis may determine when an unsuitable type of material is present in a stream of refuse. The analysis can employ time-of-flight calculations. Further, the analysis can employ single and/or dual sensor and/or camera combinations for binocular distance determination, size determination, and/or other determinations.

The image generation devices (e.g., cameras) and/or other contaminant sensor devices can include, but are not limited to, one or more of the following: visible spectrum cameras, thermal (IR) cameras, temperature sensors, IR sensors, UV sensors, ultrasonic (ultrasound) sensors, Doppler-based sensors, time-of-flight (TOF) sensors, color sensors (e.g., for determining, RGB data, XYZ data, etc., with or without IR channel blocking), microwave radiation sensors, x-ray radiation sensors, radar, laser-based sensors, LIDAR-based sensors, thermal-based sensors, spectral cameras (e.g., including hyper- and/or ultra-spectral imaging technology that use spectral fingerprints to classify very small objects at high speeds), and so forth.

Implementations may be employed with respect to any suitable type of RCV, with any suitable type of body and/or hopper variants. For example, the RCV may be an automated side loader vehicle, with cameras and/or other contaminant sensors at the hopper opening. The other contaminant sensors may also include a weight sensor in the lift arm to provide data to determine a likelihood of contamination based at least partly on weight (e.g., given that recyclables are usually not heavy). Weight information can be used to determine the likely weight of an uncontaminated volume, and determine contamination based on deviations from expected weight.

As another example, the RCV can be a commercial front loader (e.g., for dumpster type containers), with cameras and/or other sensors at the hopper opening. In some instances, data from on-vehicle cameras and/or other sensors can be correlated with data provided by cameras and/or sensors in the containers, to identify contamination.

As another example, the RCV can be a residential front loader (e.g., with or without a Curotto-Can™ can), with cameras and/or other sensors at hopper opening and/or at the front of the body (e.g., above the bumper) to view into the Curotto-Can™. Cameras and/or other sensors can also be located in the Curotto-Can™ itself. In such instances, weight sensors can be located on the arm of the Curotto-Can™ and/or on the lift arms attached to the Curotto-Can™, to detect changes in weight of carried refuse and determine possible contamination based on weight.

As another example, the RCV can be a rear loader, with cameras and/or other sensors embedded in an acrylic strip or other suitable component (e.g., across the floor of the rear hopper). In such examples, an analysis of the refuse can be performed during the sweep motion of the tailgate compactor, as it pulls the refuse across the strip of various sensors. Moreover, the cameras and/or other sensors can view the waste as it sits in the rear hopper, in a stationary state that is suitable for collection of image(s) and/or other contaminant sensor data.

In some implementations, the image(s) and/or other contaminant sensor data can be captured while the refuse is stationary in the Curotto-Can™. Moreover, the image(s) and/or other contaminant sensor data can be captured while the refuse is falling into the Curotto-Can™, or into some other structure that is being conveyed by the RCV but that is not an attached component of the RCV, which as while the lift arm of the RCV is operating to empty a container into the Curotto-Can™ that is being conveyed by the RCV. Image(s) and/or other contaminant sensor data can also be captured while the refuse is in other components of the RCV, and/or in containers that are external to the RCV, such as in stationary compactors, stationary containers (e.g., dumpsters), and so forth.

In some implementations, an in-container camera can be employed to capture information regarding refuse while the refuse is in the container. Such image data, and/or other contaminant sensor data from the interior of containers, can be used to identify contamination. In some examples, such data can be used in combination with weight information describing a change in weight over time, where such weight in formation is captured by weight sensors in the feet or other supporting components of the container. In some implementations, weight information (e.g., measured by on-container sensors and/or in-RCV sensors) can be used in combination with image data (e.g., in-container camera images and/or on-RCV camera images) and/or other contaminant sensor data to train a classification engine, using any suitable ML or AI technique, to identify the presence of contaminating materials in a portion of refuse, as described further herein. The image data can also include image(s) of a container prior to the container being picked up an emptied. Such image(s) can be used in the analysis to determine likelihood of contamination, likelihood of overage (e.g., overfilled container), and/or other issues or problems. In general, implementations can employ an array of contaminant sensors (e.g., cameras and/or other types of sensors) to collect data that is correlated and/or otherwise analyzed to identify contamination or other issues present in a refuse stream.

Implementations can enable the optimization of burden depths of incoming refuse in an RCV hopper, Curotto-Can™, stationary compactor, and/or other refuse receptacles, to enable optimal separation of refuse and to improve accuracy of classification of material or contamination in a RCV or compactor, including identifying contamination before the different types of refuse are comingled in the compactor and/or RCV.

Figure 1B:
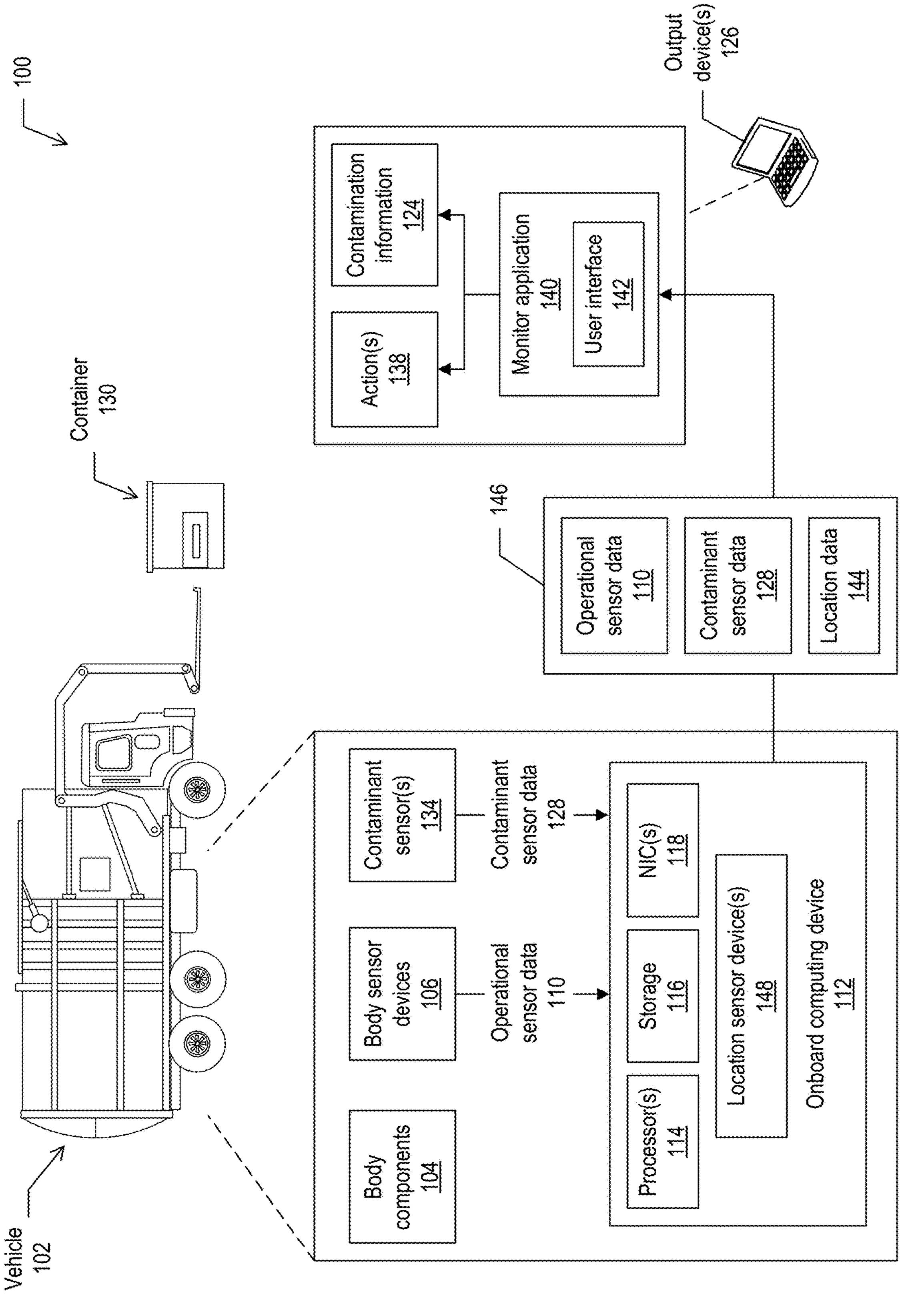

FIG. 1A depicts an example system for identifying refuse contamination and/or other issue(s), according to implementations of the present disclosure. As shown in the examples of FIGS. 1A and 1B, a vehicle 102 can include any suitable number of body components 104. The vehicle 102 can be an RCV that operates to collect and transport refuse (e.g., garbage). The refuse collection vehicle can also be described as a garbage collection vehicle, or garbage truck. The vehicle 102 can be configured to lift containers 130 that contain refuse, and empty the refuse in the containers into a hopper of the vehicle 102 and/or Curotto-Can™ conveyed by the RCV, to enable transport of the refuse to a collection site, compacting of the refuse, and/or other refuse handling activities. The vehicle 102 can also handle containers in other ways, such as by transporting the containers to another site for emptying.

The body components 104 can include various components that are appropriate for the particular type of vehicle 102. For example, a garbage collection vehicle may be a truck with an automated side loader (ASL). Alternatively, the vehicle may be a front-loading truck, a rear loading truck, a roll off truck, or some other type of garbage collection vehicle. A vehicle with an ASL may include body components involved in the operation of the ASL, such as arms and/or a fork, as well as other body components such as a pump, a tailgate, a packer, and so forth. A front-loading vehicle, such as the example shown in FIGS. 1A-IC, may include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the hopper, and/or expel the garbage from the hopper.

The vehicle 102 can include any number of body sensor devices 106 that sense body component(s), and generate operational sensor data 110 describing the operation(s) and/or the operational state of various body components 104. The body sensor devices 106 are also referred to as operational sensor devices, or operational sensors. Operational sensors may be arranged in the body components, or in proximity to the body components, to monitor the operations of the body components. The operational sensors may emit signals that include the operational sensor data 110 describing the body component operations, and the signals may vary appropriately based on the particular body component being monitored. In some implementations, the operational sensor data 110 is analyzed, by a computing device on the vehicle and/or by remote computing device(s), to identify the presence of a triggering condition based at least partly on the operational state of one or more body components, as described further below.

In some implementations, one or more contaminant sensors 134 can be mounted on the vehicle 102 or otherwise present on or in the vehicle 102. The contaminant sensor(s) 134 can each generate contaminant sensor data 128 that includes one or more images of a scene external to and in proximity to the vehicle 102 and/or image(s) of an interior of the vehicle 102. For example, contaminant sensor(s) 134 can be mounted to capture image(s) of refuse before, during, and/or after the emptying of refuse into the hopper of the vehicle, a Curotto-Can™, and/or other receptacle. In some implementations, one or more contaminant sensors 134 are arranged to capture image(s) of a container 130 before, after, and/or during the operations of body components 104 to empty the container 130 into the hopper of the vehicle 102. For example, for a front-loading vehicle, the contaminant sensor(s) 134 can be arranged to image objects in front of the vehicle. As another example, for a side loading vehicle, the contaminant sensor(s) 134 can be arranged to image objects to the side of the vehicle, such as a side that mounts the ASL to lift containers.

In some implementations, the operational sensor data and contaminant sensor data may be communicated from the body sensors and the contaminant sensors, respectively, to an onboard computing device 112 in the vehicle 102. In some instances, the onboard computing device is an under-dash device (UDU), and may also be referred to as the Gateway. Alternatively, the device 112 may be placed in some other suitable location in or on the vehicle. The sensor data and/or image data may be communicated from the sensors and/or camera, to the onboard computing device 112, over a wired connection (e.g., an internal bus) and/or over a wireless connection. In some implementations, a J1939 bus connects the various sensors and/or cameras with the onboard computing device. In some implementations, the sensors and/or cameras may be incorporated into the various body components. Alternatively, the sensors and/or cameras may be separate from the body components. In some implementations, the sensors and/or cameras digitize the signals that communicate the sensor data and/or image data, before sending the signals to the onboard computing device, if the signals are not already in a digital format.

The onboard computing device 112 can include one or more processors 114 that provide computing capacity, data storage 116 of any suitable size and format, and network interface controller(s) 118 that facilitate communication of the device 112 with other device(s) over one or more wired or wireless networks.

In some implementations, the analysis of the operational sensor data 110 and/or contaminant sensor data 128 is performed at least partly by the onboard computing device 112, e.g., by processes that execute on the processor(s) 114. For example, the onboard computing device 112 may execute processes that perform an analysis of the sensor data 110 to detect the presence of a triggering condition, such as a lift arm being in a particular position in its cycle to empty a container into the hopper of the vehicle. On detecting the triggering condition, the device 112 can transmit one or more signals 146 to analysis computing device(s) 120, where such signal(s) 146 can include the contaminant sensor data 128, e.g., including one or more images of the refuse that were captured during a time period proximal to when the container was emptied. In some implementations, the onboard computing device 112 transmits signal(s) 146 that include at least a portion of the operational sensor data 110 and/or contaminant sensor data 128 to the analysis computing device(s) 120, and analysis module(s) 122 executing on the device(s) 120 can analyze the sensor data 110 to detect the presence of a triggering condition.

In some instances, a triggering condition may also be based at least partly on a location of the vehicle 102, as determined through a satellite-based navigation system such as the global positioning system (GPS), or through other techniques. In such instances, the onboard computing device 112 can include location sensor device(s) 148, such as GPS receivers or other types of sensors that enable location determination. The location sensor(s) can generate location data 144 that describes a current location of the vehicle 102 at one or more times. The location data 144 can be used, alone or in conjunction with the sensor data 110, to determine the presence of a triggering condition. For example, a triggering condition can be present when the location of the vehicle 102 is at, or within a threshold distance of, a previously determined and stored location of a container 130 to be emptied. Accordingly, the location data and sensor data can be analyzed, on the device 112 and/or the device(s) 120, to determine the presence of a triggering condition. The data analysis of the operational sensor data 110 and/or contaminant sensor data 128, on the device 112, the analysis device(s) 120, or elsewhere, may be performed in real time with respect to the generation of the sensor data, image data, and/or location data. Alternatively, the analysis can be performed periodically (e.g., in a batch analysis process), such as once a day and/or at the end of a particular vehicle's refuse collection route. In these examples, the image(s) and/or sensor data analyzed may include those image(s) and/or sensor data captured at a time that is a predetermined offset from the triggering condition, such as 5 seconds after the completion of a cycle to empty a container in the hopper and/or Curotto-Can™ of an RCV.

In the example of FIG. 1A, the signal(s) 146 including the operational sensor data 110, the contaminant sensor data 128, and/or the location data 144 are sent to the analysis computing device(s) 120, and analysis module(s) 122 executing on the device(s) 120 analyze the data to determine whether any contamination is present in the refuse handled by the vehicle 102. Such analysis can include determining whether a triggering condition is present, analyzing image(s) and/or sensor data of the refuse that are captured at a time that is proximal to the triggering condition, and based on the image analysis, identifying instances in which the refuse exhibits contamination. In some implementations, the analysis module(s) 122 can include a ML engine 136, which can also be described as a classifier, a model, an image classifier, or an image classification engine. The engine 136 can be trained, using any suitable ML technique, to identify images and/or sensor data that show contamination or lack of contamination. ML aspects are described further herein For example, the engine 136 can be trained to look for various pattern(s) and/or feature(s) within image(s) and/or sensor data that indicate the presence, or absence, of contamination, such as spectral patterns that indicate contamination, particular recognized objects that are contaminants, weight data indicating possible contamination, and so forth. In some implementations, the engine 136 can be trained based on a (e.g., large) data set of images and/or sensor data that have been tagged as exhibiting or not exhibiting contamination, e.g., by an operator reviewing the image(s) and/or sensor data. In some implementations, the contamination (or absence of contamination) designations that are made by the operator through the monitor application 140, as described further below, can be used as training data for further train or otherwise refine the operations of the engine 136.

Contamination information 124, describing instances of refuse collection that have been determined to show contamination at the time of their collection, can be communicated to one or more output computing devices 126 for presentation to various users. In some instances, the contamination information 124 can be communicated as a notification, alert, warning, and/or other type of message to inform user(s) of the presence of contamination in one or more containers of interest. For example, an owner of the container, user of the container, or some other individual responsible for the container can be notified of the contamination. In some implementations, one or more actions 138 can be performed based on the determination of contamination. Such action(s) 138 can include sending the notification(s) including the contamination information 124 as described above. Action(s) 138 can also include billing a responsible party to charge them for the contamination.

In some implementations, the analysis of the image and/or sensor data to identify contaminants (or lack of contaminants) is performed at least partly on the onboard computing device 112, operating for example as an edge device. For example, the device 112 may include a processor with a central processing unit (CPU), a digital signal processor (DSP), a graphics processing unit (GPU), and/or a neural network processing unit that operate to analyze the image and/or sensor data on the device 112.

In the example of FIG. 1B, the signal(s) 146 including the operational sensor data 110, the contaminant sensor data 128, and/or the location data 144 are sent to the output computing device(s) 126, and image(s) are presented in a UI 142 of a monitor application 140 executing on the device(s) 126. In some implementations, the operational sensor data 110, location data 144, and/or other information is analyzed on the device 112 to identify triggering conditions, and the contaminant sensor data 128 that is communicated to and presented on the device(s) 126 includes images of refuse that are captured proximal to a time when the triggering condition is present. For example, one or more images of refuse from each container handled by a vehicle on its route can be captured during a time period that is a pre-determined offset prior to when the lift arm of the vehicle passes through a particular point in its container-emptying cycle. Those captured image(s), for each of one or more containers, can be communicated to the device(s) 126 and presented in the UI 142 of the monitor application 140. An operator can examine the images using the monitor application 140, and use a control of the application to flag those particular image(s), if any, that contamination of refuse. The container(s) for which image(s) were flagged can be added to contamination information 124 that is communicated to various parties, and in some instances the flagging of contamination instances can trigger action(s) 138 to be performed, as described above. The contamination information 124 can be included in reports that are generated and sent to various parties.

A large amount of sensor data and image data can be generated by the sensors and cameras respectively, and received by the onboard computing device 112. In some implementations, a suitable data compression technique is employed to compress the sensor data, image data, location data, and/or other information before it is communicated in the signal(s) 1246, over network(s), to the remote device(s) 120 and/or 126 for further analysis. In some implementations, the compression is lossless, and no filtering is performed on the data that is generated and communicated to the onboard computing device and then communicated to the remote device(s). Accordingly, such implementations avoid the risk of losing possibly relevant data through filtering.

Sensors can be provided on the vehicle body to evaluate cycles and/or other parameters of various body components. For example, the sensors can measure the hydraulic pressure of various hydraulic components, and/or pneumatic pressure of pneumatic components. The sensors can also detect and/or measure the particular position and/or operational state of body components such as the top door of a refuse vehicle, a Curotto-Can™ attached to a refuse vehicle, a lift arm, a refuse compression mechanism, a tailgate, and so forth, to detect events such as a lift arm cycle, a pack cycle, a tailgate open or close event, an eject event, tailgate locking event, and/or other body component operations. Various operations of body components, positions of body components, and/or states of body components can be designated as triggering conditions that trigger the capture, communication, and/or analysis of images to identify contamination.

In some implementations, a vehicle includes a body controller that manages and/or monitors various body components of the vehicle. The body controller of a vehicle can be connected to multiple sensors in the body of the vehicle. The body controller can transmit one or more signals over the J1939 network, or other wiring on the vehicle, when the body controller senses a state change from any of the sensors. These signals from the body controller can be received by the onboard computing device that is monitoring the J1939 network. In some implementations, the onboard computing device has a GPS chip or other location determination devices that logs the location of the vehicle at each second or at other intervals. The onboard computing device can identify the body component signals (as distinguished from vehicle signals) and transmit them, along with the location (e.g., GPS) data and/or image data, to the remote computing device(s) 120 and/or 126, e.g., through a cellular connection, WiFi network, other wireless connection, or through a serial line, Ethernet cable, or other wired connection.

The sensor data 110 can be analyzed, on the device 112 or elsewhere, to identify specific signals from the body controller that indicate that a container has been serviced (e.g., the forks moved or the grabber moved, etc.). In some implementations, the signal can also be cross-referenced with the location data to locate where (e.g., geographically) the signal was captured. The signal can then be compared to a dataset of known container locations, to determine a triggering condition with greater confidence that through the use of the sensor data alone. For example, a lift arm event can be correlated with location data showing that the vehicle is at a location of a container, to infer that a triggering condition is present and that a container is being handled. The image(s) of the container, captured during or before the period when the container was handled (e.g., emptied into the vehicle), can be analyzed to look for contamination.

In some implementations, the onboard computing device is a multi-purpose hardware platform. The device can include a UDU (Gateway) and/or a window unit (WU) (e.g., camera) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

The onboard computing device can determine the speed and/or location of the vehicle using various techniques. CAN_SPEED can be determined using the CAN interface and using J1939 or J1962, reading wheel speed indicator. The wheel speed can be created by the vehicle ECU. The vehicle ECU can have hardware connected to a wheel axle and can measure rotation with a sensor. GPS_SPEED can provide data from GPS and be linked, such as to a minimum of three satellites and a fourth satellite to determine altitude or elevation. Actual coordinates of the vehicle on the map can be plotted and/or verified, to determine the altitude of vehicle. SENSOR_SPEED can be provided using motion sensors, such as accelerometer, gyroscope, and so forth. These hardware component may sample at high frequency and may be used to measure delta, rate of acceleration, and derive speed from the measurements. Other speed sensors can also be used. LOCATION_WITH_NO_GPS can be provided using the GPS chipset with dead reckoning, and can derive actual vehicle location and movement by using a combination of SENSOR_SPEED and CAN_SPEED. Even if GPS is not available, some systems can determine accurately where the vehicle is based on such dead reckoning.

Figure 1C:
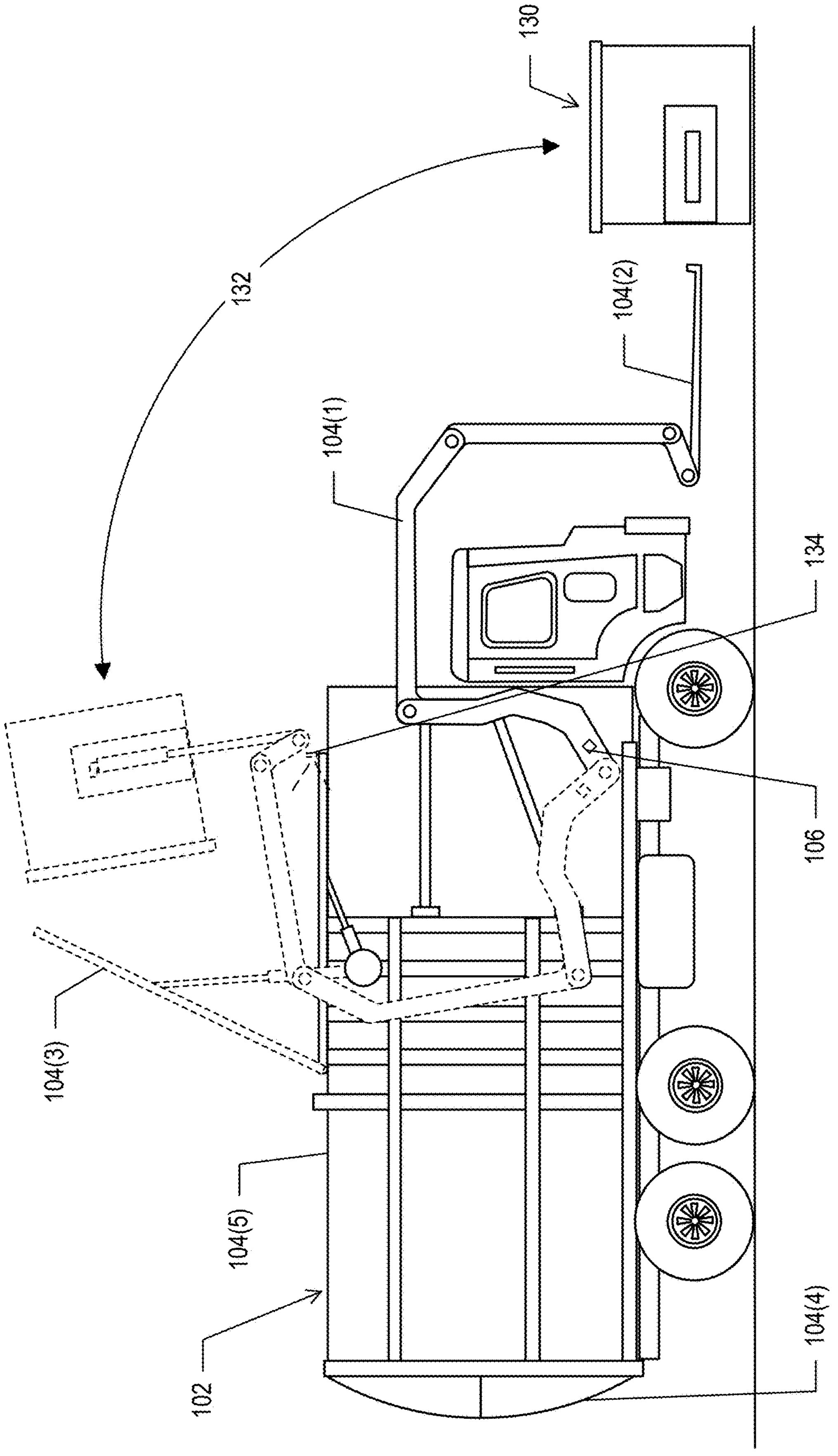
FIG. 1C depicts an example schematic of a refuse collection vehicle, according to implementations of the present disclosure.

FIG. 1C depicts an example schematic of a refuse collection vehicle, according to implementations of the present disclosure. As shown in the example of FIG. 1C, a vehicle 102 can include any suitable number and type of body components 104 according to the design and/or purpose of the vehicle 102. For example, a vehicle 102 can include body components 104 including, but not limited to: a lift arm 104(1), a grabber mechanism 104(2), a top lid or hopper lid 104(3), a back gate or tailgate 104(4), and a hopper 104(5) to hold refuse during its transport. One or more sensors 106 can be situated to determine the state and/or detect the operations of the body components 104. In the example shown, the lift arm 104(1) includes a sensor 106 that is arranged to detect the position of the arm 104(1), such as during its cycle 132 to lift a container 130 and empty it into the hoper 104(5). The vehicle 102 can also include one or more contaminant sensors 134 that capture images in proximity to the vehicle 102 and/or, in some instances, of the interior of the vehicle. In the example shown, a contaminant sensor 134 (e.g., a camera) is positioned to visualize refuse in the vehicle 102 or falling into the vehicle 102, such as refuse in the hopper or Curotto-Can™ of the vehicle 102. The contaminant sensor(s) 134 may also be placed in other positions and/or orientations.

The operational sensor data can be analyzed to determine the triggering condition that indicates a container is being serviced, was serviced, or is about to be serviced. Based on the triggering condition, one or more images captured by the camera(s), and/or other contaminant sensor data captured by other contaminant sensors, can be analyzed to determine the presence of any contamination. For example, a triggering condition can be a particular point in the cycle of the lift arm to lift a container and empty it into the hopper. As another example, a triggering condition can be a cycle of the top lid (e.g., lid to the hopper) that indicates the top lid is being opened to empty a container into the hopper. As another example, a triggering condition can be a cycle of the grabber to grab a container for emptying into the hopper. The triggering condition can be used to determine a time, or time period, of the image(s) to be analyzed. For example, the time period can be a predetermined offset prior to or after the triggering condition, such that the images analyzed are those that were captured just prior to or after the container being emptied into the hopper. In a particular example, the analyzed images can include images that were captured between 5 and 10 seconds after the completion of the cycle of the lift arm to lift a container and empty it into the hopper or Curotto-Can™. Accordingly, the analyzed images and/or other contaminant sensor data can include data captured immediately after a service event in which a container is emptied into the hopper or Curotto-Can™ of a refuse vehicle.

In some implementations, the operational sensor data can be used in correlation with location data to determine the presence of a triggering condition that determines a time period for the contaminant sensor data to be analyzed. For example, the detection of a lift arm completing its cycle, in conjunction with a determination that the current GPS location of the vehicle corresponds to a known location of a container that is serviced, can be used as a triggering condition to determine one or more images and/or other contaminant sensor data to be analyzed. Image(s) and/or other contaminant sensor data can be generated with a timestamp indicating the date and/or time when they were captured. The image(s) and/or other contaminant sensor data can also include metadata describing which contaminant sensor (e.g., camera and/or other sensor) generated the data. The timestamp and/or other metadata can be used to determine which image(s) and/or other contaminant sensor data are to be analyzed to identify contamination.

In some implementations, the onboard computing device 112 (e.g., UDU) collects operational sensor data 110 on an ongoing basis and/or periodically (e.g., every second, every 5 seconds, etc.), and the data is analyzed to determine whether a triggering condition is present. Contaminant sensor data 128 can also be generated and received on an ongoing basis, and a time window of image data can be retrieved and analyzed to determine contamination, in response to detecting a triggering condition. For example, the time window of images from the triggering condition until 5 seconds after the triggering condition can be analyzed to look for contamination. In some instances, the platform knows when a particular service event occurred, e.g., based on the operational sensor data 110 and/or location of the vehicle. That service event can be correlated to the image data that is being generated by the cameras. For example, a portion of the image data (including one or more images) within a time period after or including the time of the service event (e.g., 5 seconds after to emptying a container) can be analyzed to capture image(s) of the refuse. The image data can include any number of still images. In some implementations, the image data can include video data, such that the image(s) are frames of the video data.

In some implementations, the determination of a triggering condition can be further based on the location and/or movement of the vehicle. For example, a triggering condition can be determined based on the vehicle moving at less than a threshold speed (or decelerating to below a threshold speed) prior to the operational sensor data indicating a particular operational state of body components, and/or when the vehicle is within a threshold distance (e.g., within 10-15 feet) of a known location of a container to be handled. One or more images can be retrieved that visualize the refuse after the container is emptied into the hopper or Curotto-Can™ (e.g., at a time that is determined based on the operational sensor data). Velocity, acceleration (or deceleration), and/or location of the vehicle can be based at least partly on information received from the vehicle's onboard systems, such as a GPS receiver and/or telematics sensor(s) describing the current speed, orientation, and/or location of the vehicle at one or more times.

In some implementations, the image(s) can be captured automatically by the cameras and stored (e.g., for a period of time) in the storage 116 of device 112. The particular image(s) from within the time period of interest (e.g., prior to emptying the container), based on the presence of the triggering condition, can be retrieved and analyzed automatically in response to detecting the triggering condition. In some implementations, the generation and/or retrieve of image(s) for analysis can be based at least partly on a command received from an operator. For example, a driver or other personnel present on the vehicle can push a button on, or otherwise issue a command to, the device 112, to request image capture when the vehicle is within suitable distance of the container to be handled.

In some implementations, the data to be uploaded to the device(s) 120 and/or device 126 can be packaged, in the signal(s) 146, into bundles of (e.g., telemetry) data every 5-10 minutes. This bundle of data can be compressed and/or encrypted, and transmitted to the remote device(s) over a suitable network, such as a wireless cell network. In some implementations, the uploaded data includes the relevant data for one or more particular container handling events. For example, the operational sensor data and/or location data can be analyzed on the device 112 to determine the presence of a triggering condition, and the particular image(s) (and/or video data) for the appropriate time period based on the triggering condition can be uploaded for analysis along with the corresponding time period of telemetry data, operational sensor data, and/or location data. In some instances, the data can be uploaded in real time with respect to the handling of the container, or the data can be uploaded in batches periodically. Data upload may be delayed until a suitable network connection is available between the onboard computing device 112 and the remote device(s) 120 and/or 126.

In some implementations, at least a portion of the analysis that is described herein as being performed on the analysis computing device(s) 120 and/or the output device(s) 126 can be performed by the onboard computing device 112 instead of or in addition to being performed on the analysis computing device(s) 120 and/or the output device(s) 126.

Figure 2:
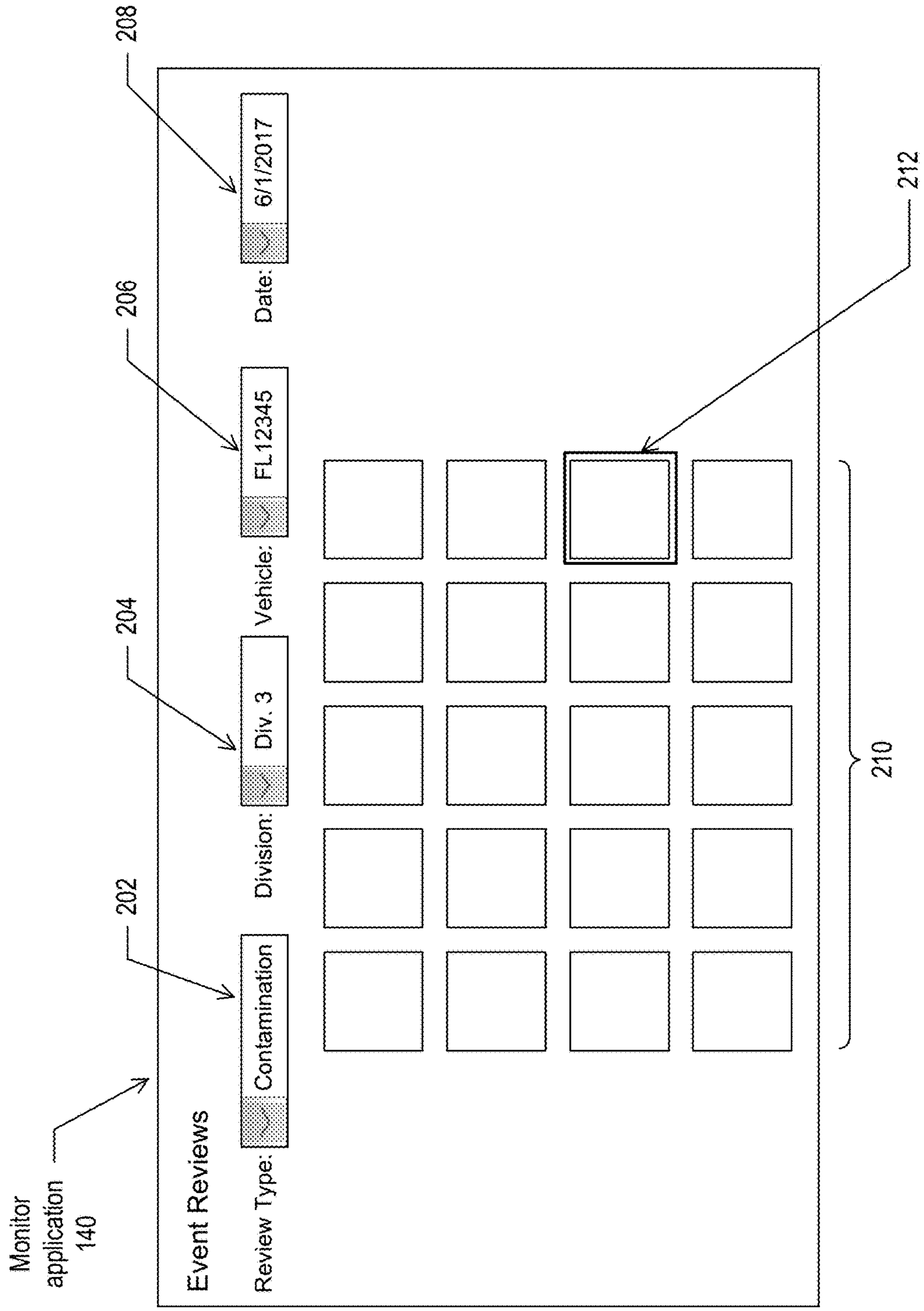
FIG. 2 depict an example user interface for identifying refuse contamination and/or other issue(s), according to implementations of the present disclosure.

FIG. 2 depict example UIs for identifying refuse contamination and/or other issue(s), according to implementations of the present disclosure. In the example of FIG. 2, the application 140 is presenting a UI 142 for image review by an operator. The UI can include a control 202 to allow the operator to select the type of review, such as a review to identify contamination as shown in the example. Other types of review can include reviewing images 212 of containers to look for containers that are overloaded, damaged, improperly positioned, or otherwise unsuitable for refuse collection handling. The UI can also include controls 204, 206, and/or 208 to respectively filter images 212 based on a division of an organization (e.g., a particular city or other area), the particular vehicle that generated the image data, and/or the date (or other time period) when the images were generated. A grid 210 can present a plurality of images 212 that were captured, by cameras on one or more vehicles, during the vehicle(s)' route to collect refuse from containers. The operator can select one or more of the images 212 to indicate that contamination is present, if the review type 202 is "Contamination." For other types of review, the selection of an image can indicate that the image exhibits the problem that is being reviewed for, such as repair issues, poorly positioned containers, and so forth.

In some implementations, clicking on one of the images causes the UI to present a larger view of the image and/or more detail regarding the handling of the particular refuse and/or container. For example, the UI can present a larger view of the image, a map showing the location of the container (or the location of the vehicle when the image was captured), and a graph showing a characteristic of the vehicle over time, during the time period proximal to handling the container. The displayed characteristic can be speed of the vehicle, as in the example shown, acceleration/deceleration, or some other characteristic. The graph can also show the point in time when the triggering condition was present (e.g., labeled "Event" in this example). The UI can also allow the operator to request the generation of a report that summarizes the results of the review of various images.

In some implementations, the analysis of the image data to identify contamination (and/or other issues), through the review application 140 and/or the engine 136, can be performed in real time with respect to the generation of the images (e.g., during the vehicle's route to collect refuse from the containers). In some implementations, the analysis can be performed at some time after the image(s) were generated and/or after the vehicle has completed its route.

As used herein, a real time process or operation describes a process or operation that is performed in response to detecting a triggering condition (e.g., event), in which the real time process is performed without any unnecessary delay following the triggering condition, apart from the delay that is incurred due to the limitations (e.g., speed, bandwidth) of any networks being used, transfer of data between system components, memory access speed, processing speed, and/or computing resources. A real time process or operation may be performed within a short period of time following the detection of the triggering condition, and/or may be performed at least partly concurrently with the triggering condition. A triggering condition may be the receipt of a communication, the detection of a particular system state, and/or other types of events. In some instances, a real time process is performed within a same execution path, such as within a same process or thread, as the triggering condition. In some instances, a real time process is performed by a different process or thread that is created or requested by a process that detects the triggering condition. A real time process may also be described as synchronous with respect to the triggering condition.

As described herein, the triggering condition can be one or more of the following: a particular operational state of a body component (e.g., a position of the lift arm in its cycle), a velocity (e.g., speed and/or direction of travel) of the vehicle, an acceleration or deceleration of the vehicle, a location of the vehicle, and/or other criteria. The presence of the triggering condition can cause the collection and/or analysis of the image data to identify contamination and/or other issues present in the refuse collected from one or more containers.

The application 140 can generate a report of contamination or other issues. The application can also send signals that trigger action(s) to be performed, and/or perform the action(s) itself. Such action(s) can include a charge against an entity responsible for contamination of the refuse in the container. Action(s) can also include sending notification(s) to such entities and/or individuals responsible for administering the refuse collection vehicles, to notify the recipients of identified contamination or other conditions exhibited by containers. The application 140 can provide additional information to the recipients of the notifications, to demonstrate the identified problem, including image(s) of the refuse contamination, time, date, and/or location information, and so forth.

Figure 3:
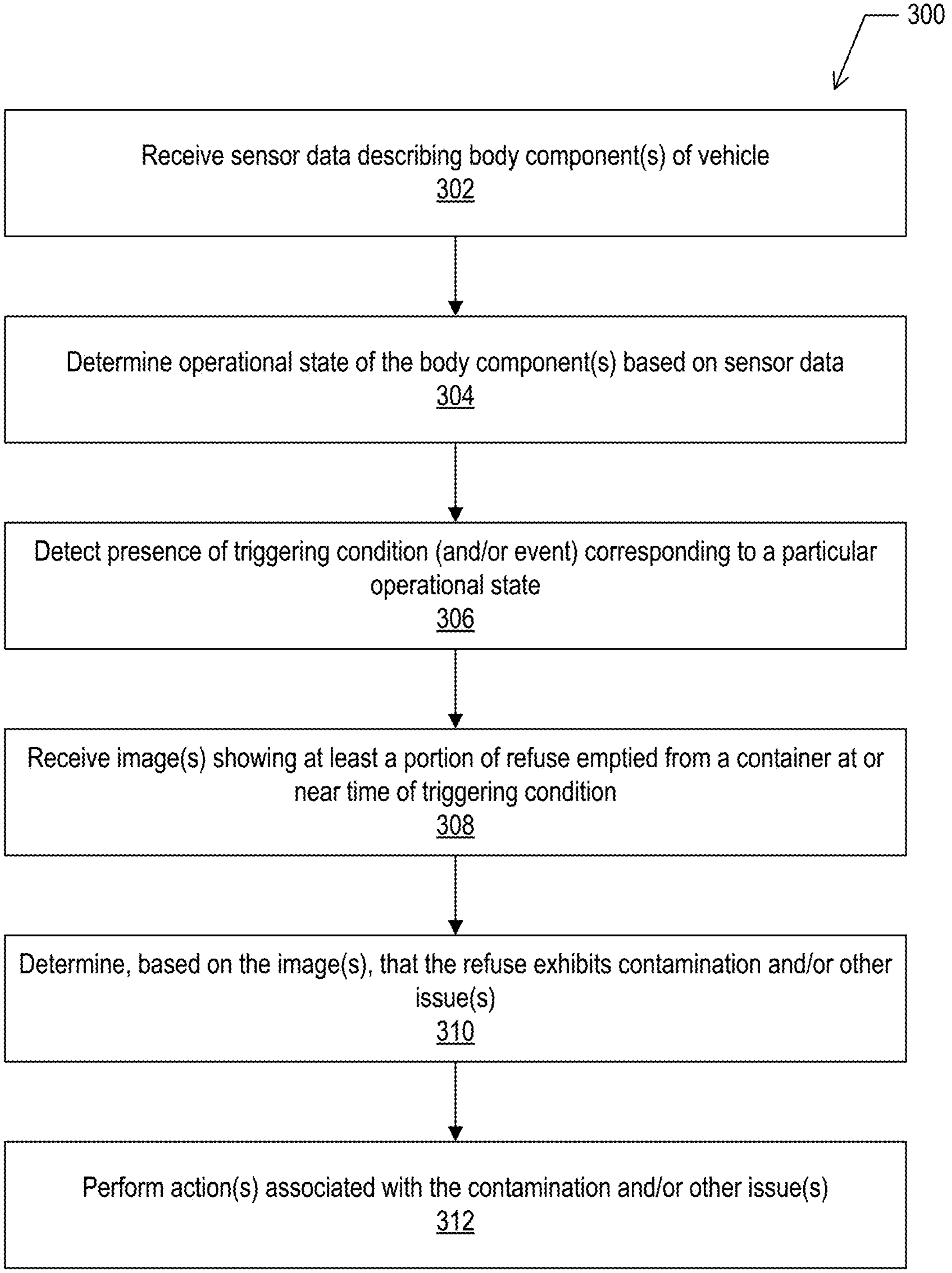
FIG. 3 depicts a flow diagram of an example process for identifying container contamination and/or other issue(s), according to implementations of the present disclosure.

FIG. 3 depicts a flow diagram of an example process for identifying container contamination and/or other issue(s), according to implementations of the present disclosure. Operations of the process can be performed by one or more of the analysis module(s) 122, the engine 136, the monitor application 140, the UI 142, and/or other software module(s) executing on the onboard computing device 112, the analysis computing device(s) 120, the output device(s) 126, and/or elsewhere.

Operational sensor data is received (302), and analyzed to determine (304) an operational state and/or position of one or more body components of the vehicle. The presence of a triggering condition is detected (306) based at least partly on a particular operational state of the body component(s), such as the position of a lift arm at a particular point in its cycle to empty a container, a state of a grabber that is grabbing a container, and/or the opening of a hopper lid to receive emptied refuse into the hopper. As described above, the triggering condition can also be based at least partly on other information, such as the speed, deceleration, and/or location of the vehicle prior to handling a container. Image(s) are received (308) showing at least a portion of refused emptied from a container at or near the time of the triggering condition, such as a period of time (e.g., 10-15 seconds) prior to the triggering condition. Based on the image(s), a determination is made (310) whether the container exhibits contamination and/or other issue(s). As described above, the determination can be performed by an image classification engine (e.g., through ML-based model application), and/or through an operator reviewing the image(s) in the application 140. One or more actions can be performed (312) based on the identified contamination and/or other issue(s).

The image(s) can be stationary image(s) of the refuse, captured after the refuse has been emptied into a hopper of the RCV and/or a Curotto-Can™ conveyed by the RCV. In some implementations, the image(s) can be image(s) of the refuse as it is falling into the Curotto-Can™. Image(s) can be still image(s) and/or video data as described above, and can include visible light images, IR images, UV images, and/or image(s) from other spectrum ranges. Other types of contaminant sensor data can also be analyzed, in addition to or instead of analyzing the image data, to identify contamination as described above.

In implementations where the analysis is performed at least partly on the onboard computing device 112 (e.g., edge processing), the determination of a triggering condition as described in 302-306 may not be employed, and may at least partly be omitted from the process. With the analysis (e.g., ML analysis) performed on the device 112, the refuse stream can be evaluated in real time as the image data and/or sensor data is received, without a body component-based triggering event that prompts the analysis.

Figure 4A:
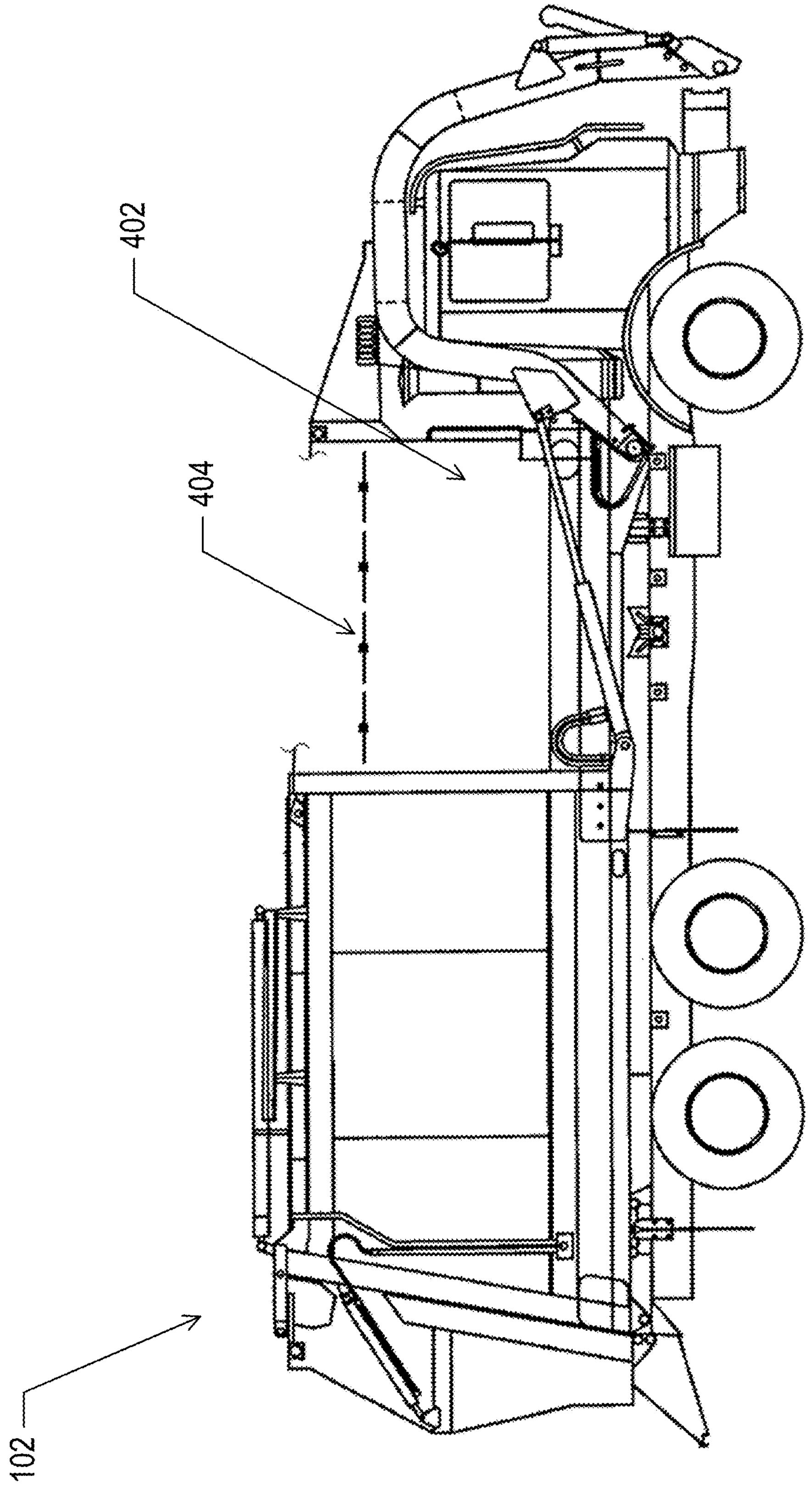
FIGS. 4A-4D depict example schematics of a refuse collection vehicle configured for identifying contamination and/or other issue(s), according to implementations of the present disclosure.
Figure 4B:
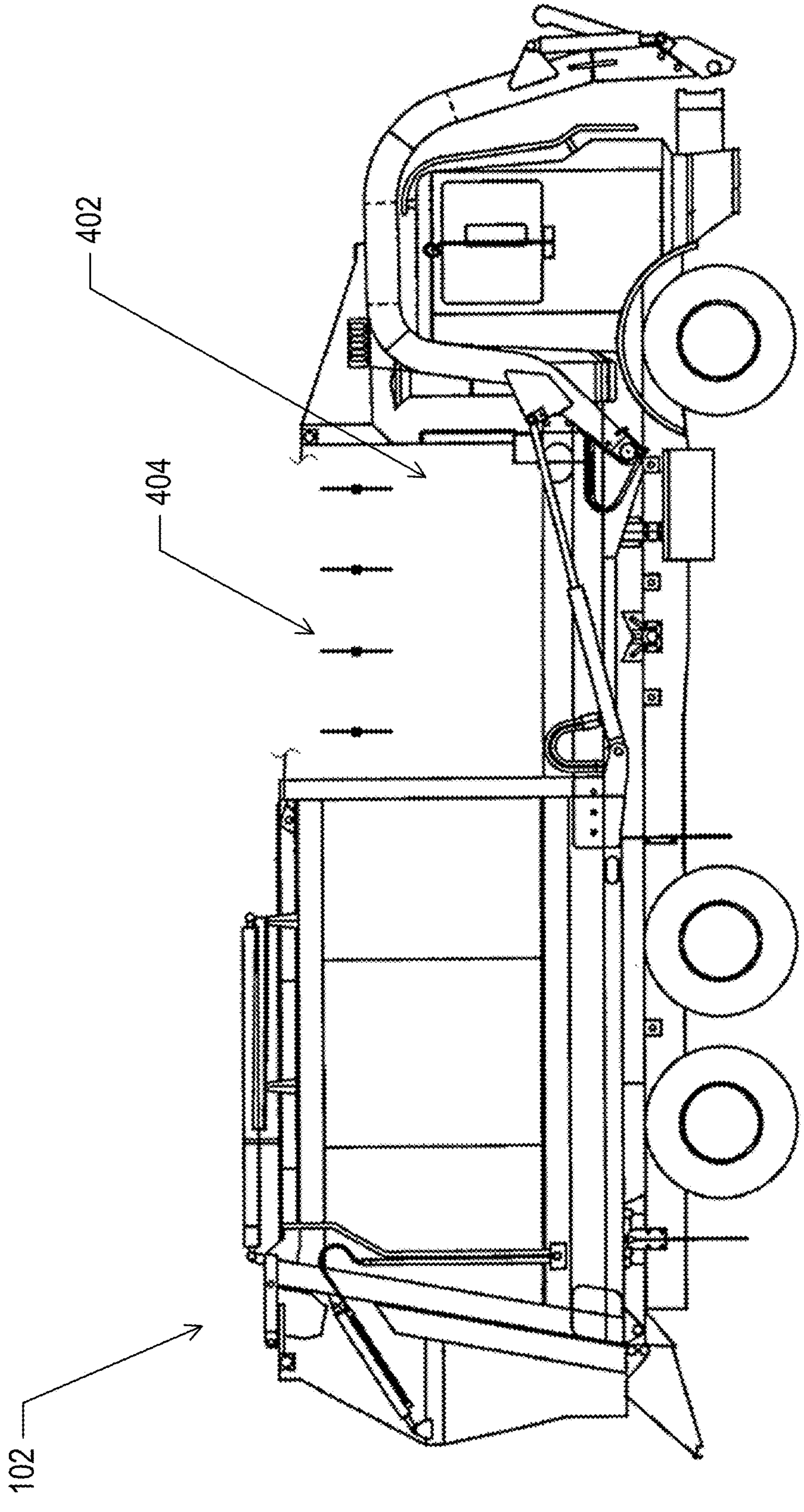
Figure 4C:
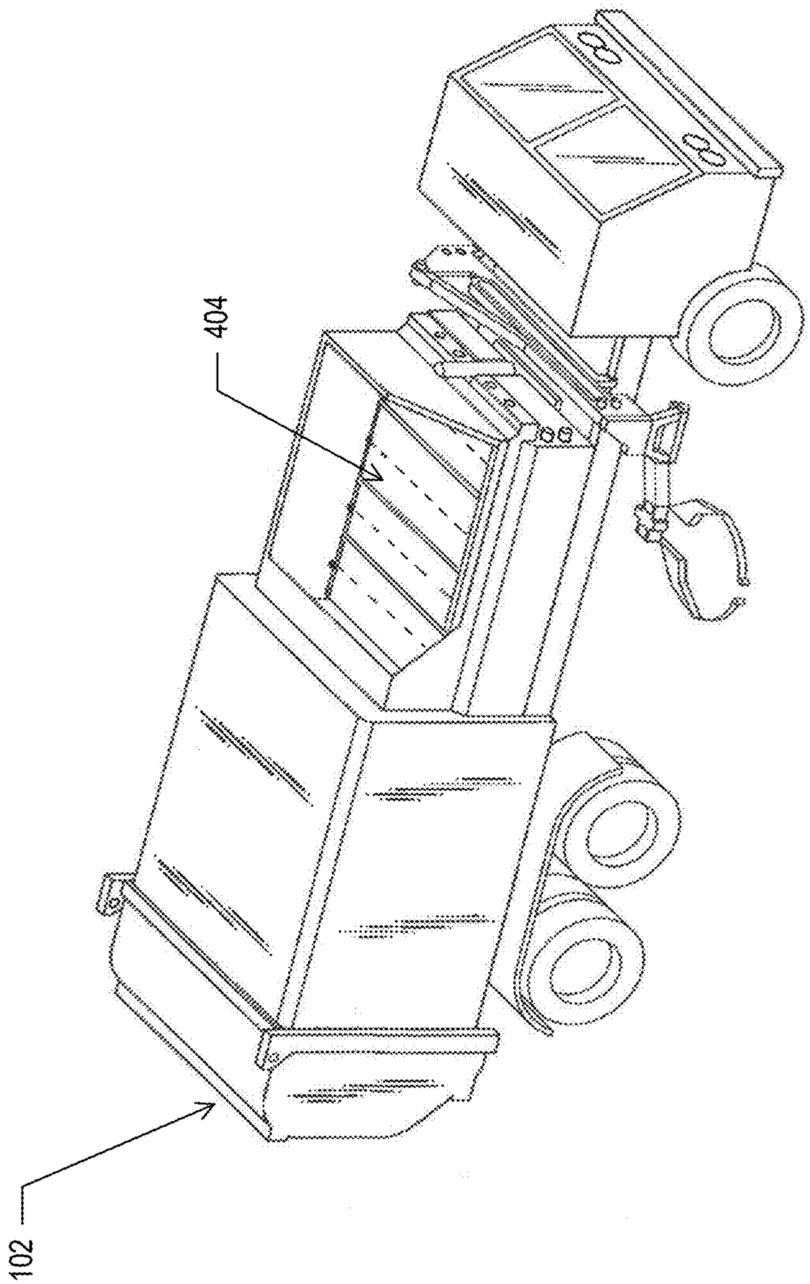
Figure 4D:
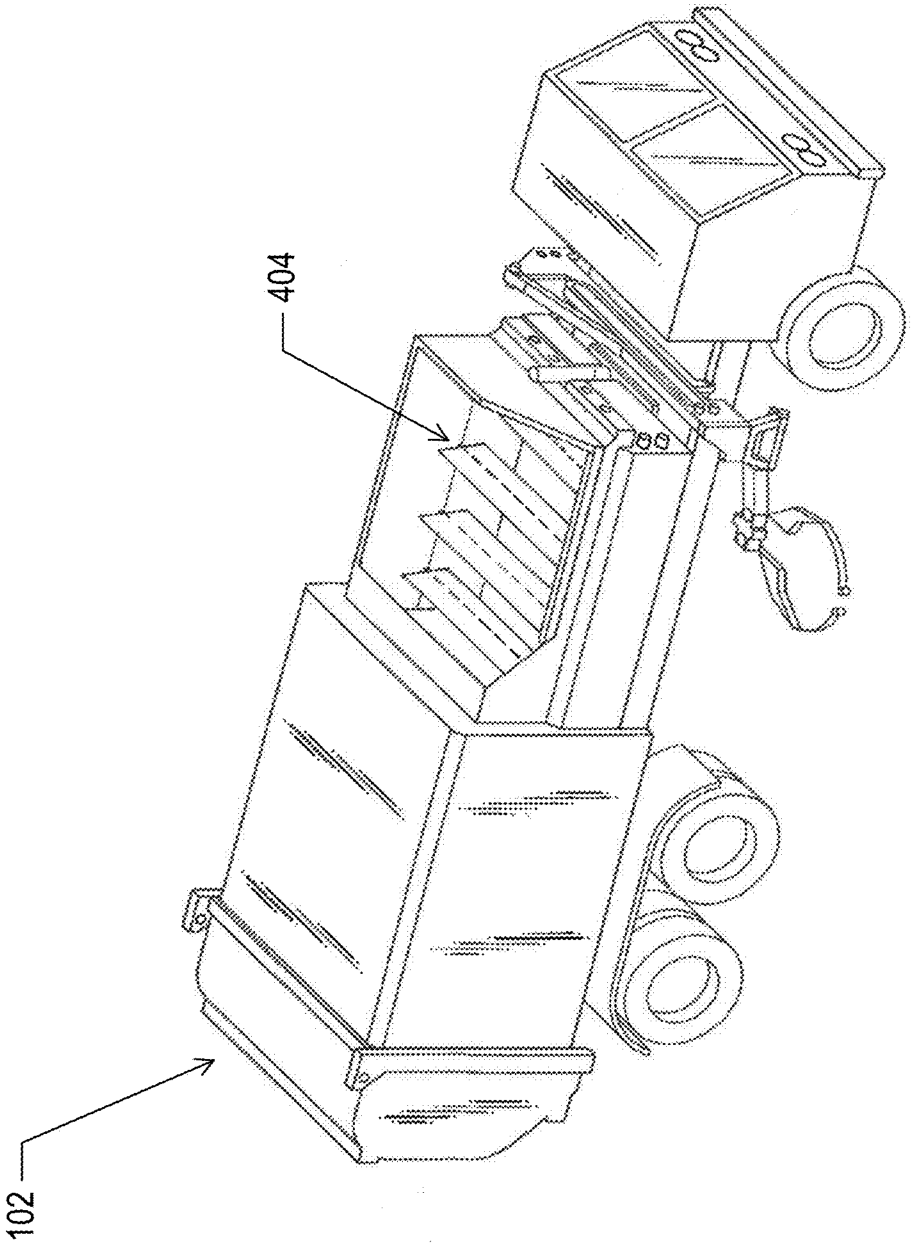

FIGS. 4A-4D depict example schematics of an RCV configured for identifying contamination and/or other issue(s), according to implementations of the present disclosure. In these examples, the RCV 102 has been configured with a set of pivot vanes 404 at a near the top of the hopper 402 of the RCV 102, the hopper 402 that stores the refuse. As shown in FIGS. 4A and 4C, when the pivot vanes 404 are in a closed configuration, they form a surface on which refuse from an emptied container can land and rest temporarily while image(s) and/or other contaminant sensor data are collected of the refuse by proximal camera(s) and/or other contaminant sensor(s). When the pivot vanes 404 are opened, as shown in FIGS. 4B and 4D, the refuse can fall into the hopper 402. Accordingly, the pivot vanes 404 can temporarily interrupt the falling of the refuse into the hopper 402, allowing contaminant sensor data (e.g., image(s)) to be collected from the stationary refuse for analysis to identify contamination.

Figure 5A:
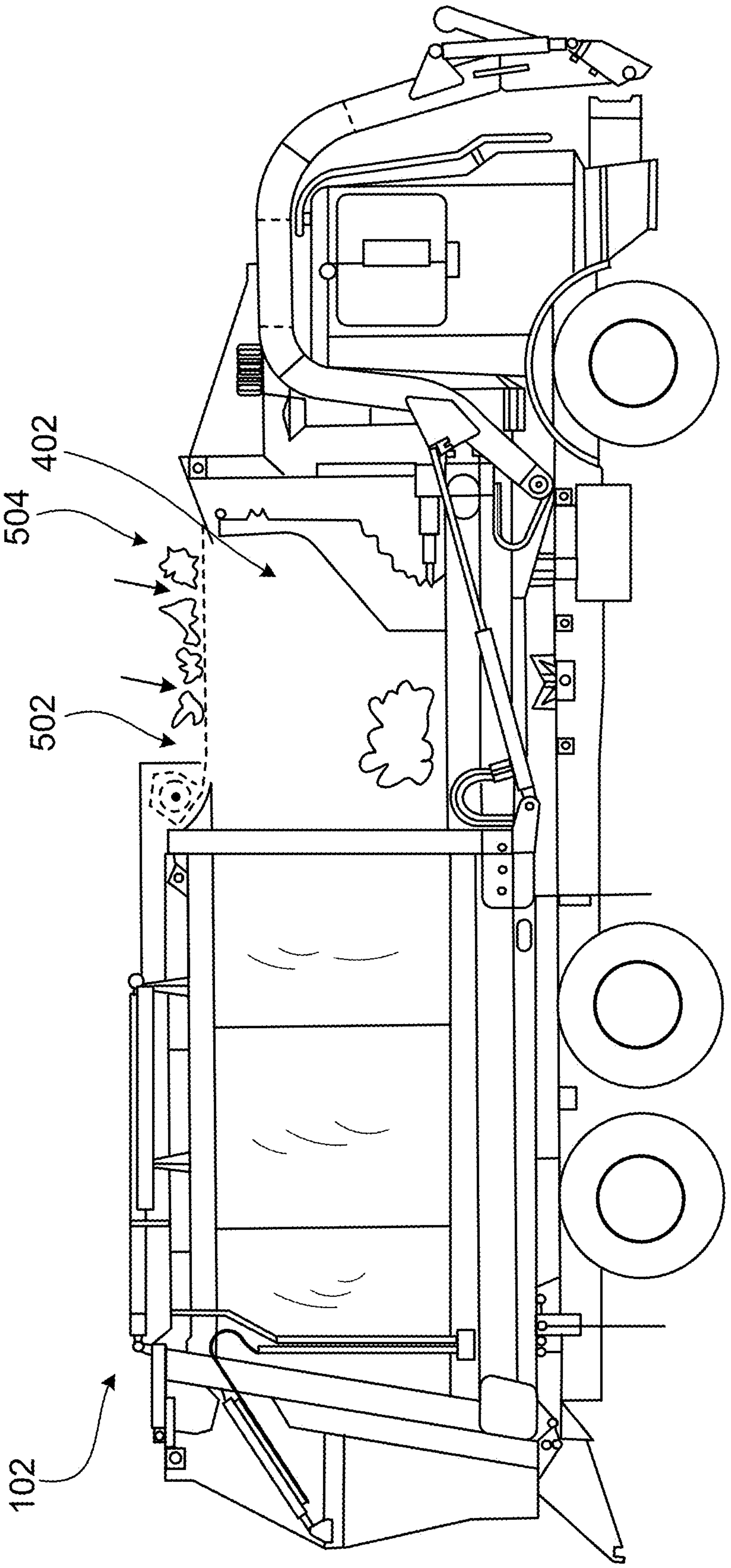
FIGS. 5A and 5B depict example schematics of a refuse collection vehicle configured for identifying contamination and/or other issue(s), according to implementations of the present disclosure.
Figure 5B:
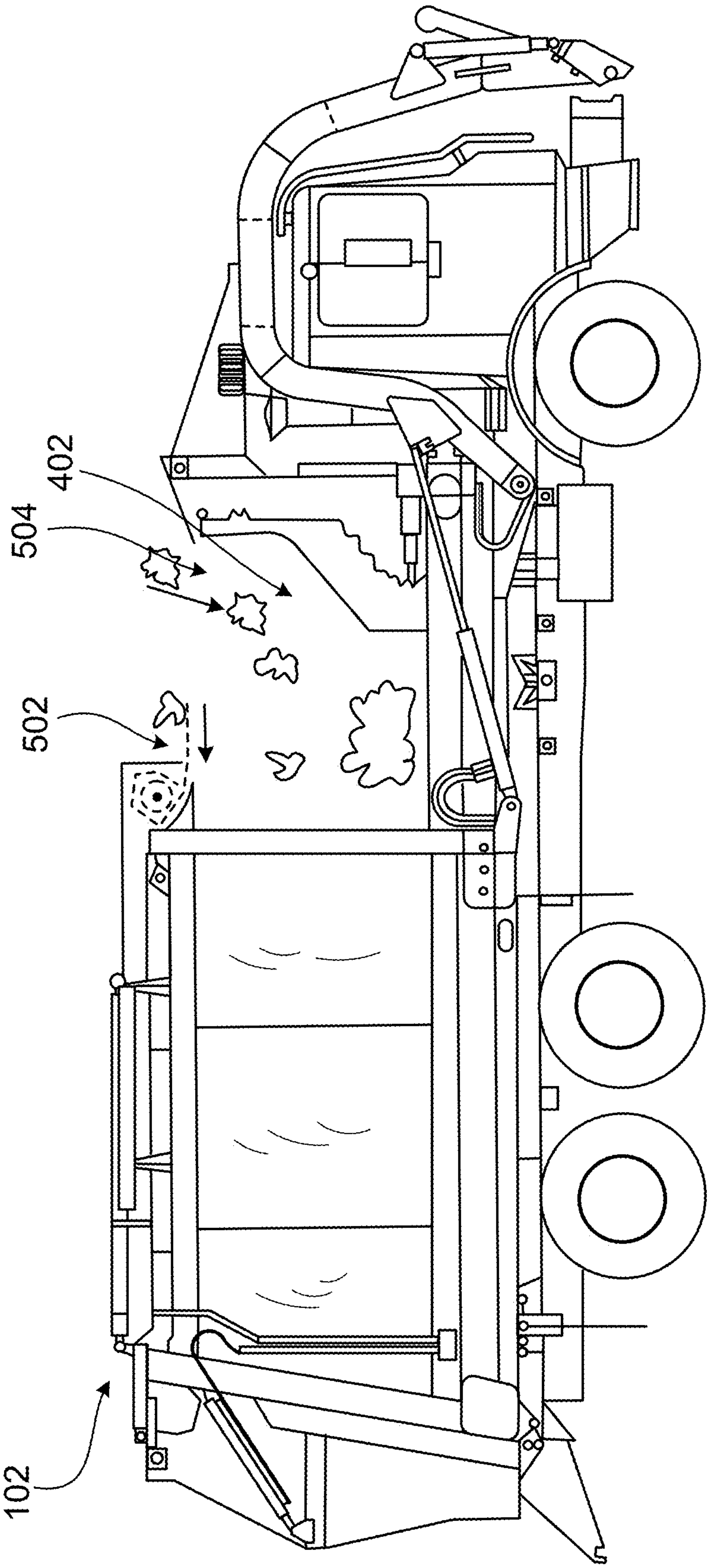

FIGS. 5A and 5B depict example schematics of an RCV configured for identifying contamination and/or other issue(s), according to implementations of the present disclosure. In these examples, the RCV 102 is equipped with a retracting door 502 (e.g., a rolling "garage-style" door) at or near the top of the hopper 402. As shown in FIG. 5A, when the door 502 is extended, it forms a surface on which refuse from an emptied container can land and rest temporarily while image(s) and/or other contaminant sensor data are collected of the refuse by proximal camera(s) and/or other contaminant sensor(s). When the door 502 is retracted, as shown in FIG. 5B, the refuse 504 can fall into the hopper 402. Accordingly, the door 502 can temporarily interrupt the falling of the refuse into the hopper 402, allowing the contaminant sensor data to be collected from the stationary refuse for analysis to identify contamination.

Figure 6A:
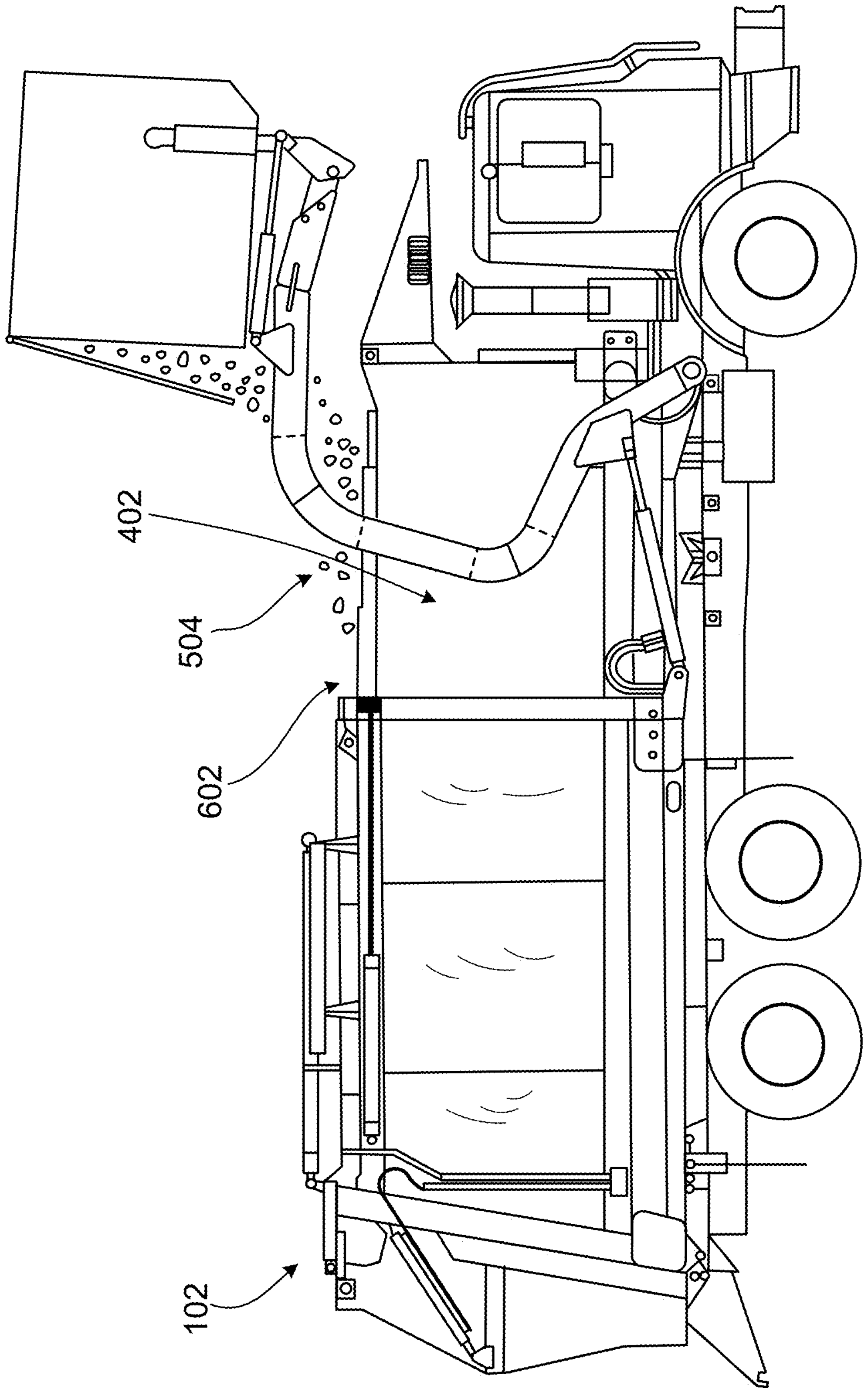
FIGS. 6A and 6B depict example schematics of an RCV configured for identifying contamination and/or other issue(s), according to implementations of the present disclosure.
Figure 6B:
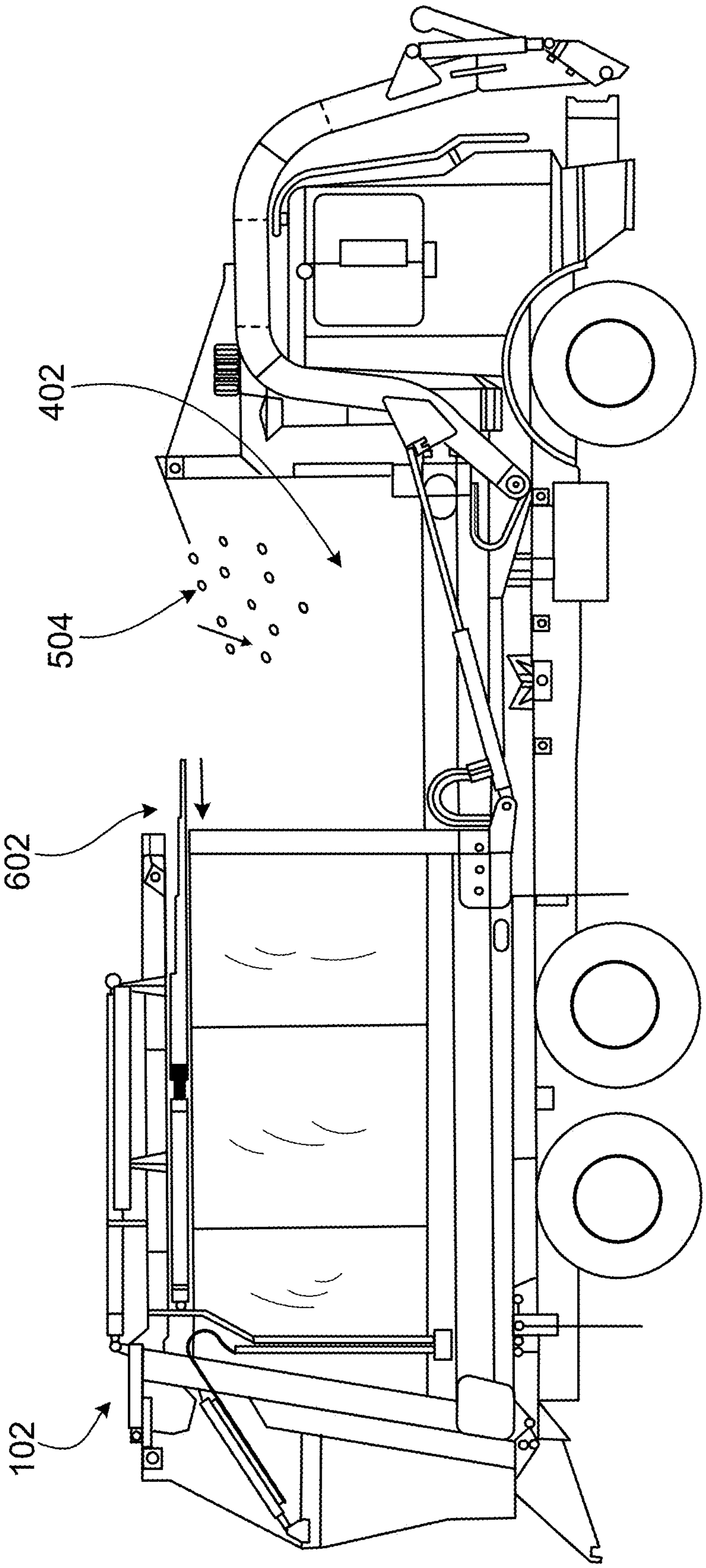

FIGS. 6A and 6B depict example schematics of an RCV configured for identifying contamination and/or other issue(s), according to implementations of the present disclosure. In these examples, the RCV 102 is equipped with a retracting door 602 (e.g., sliding door) at or near the top of the hopper 402. As shown in FIG. 6A, when the door 602 is extended, it forms a surface on which refuse from an emptied container can land and rest temporarily while image(s) and/or other contaminant sensor data are collected of the refuse by proximal camera(s) and/or other contaminant sensor(s). When the door 602 is retracted, as shown in FIG. 6B, the refuse can fall into the hopper 402. Accordingly, the door 602 can temporarily interrupt the falling of the refuse into the hopper 402, allowing contaminant sensor data to be collected from the stationary refuse for analysis to identify contamination.

Figure 7A:
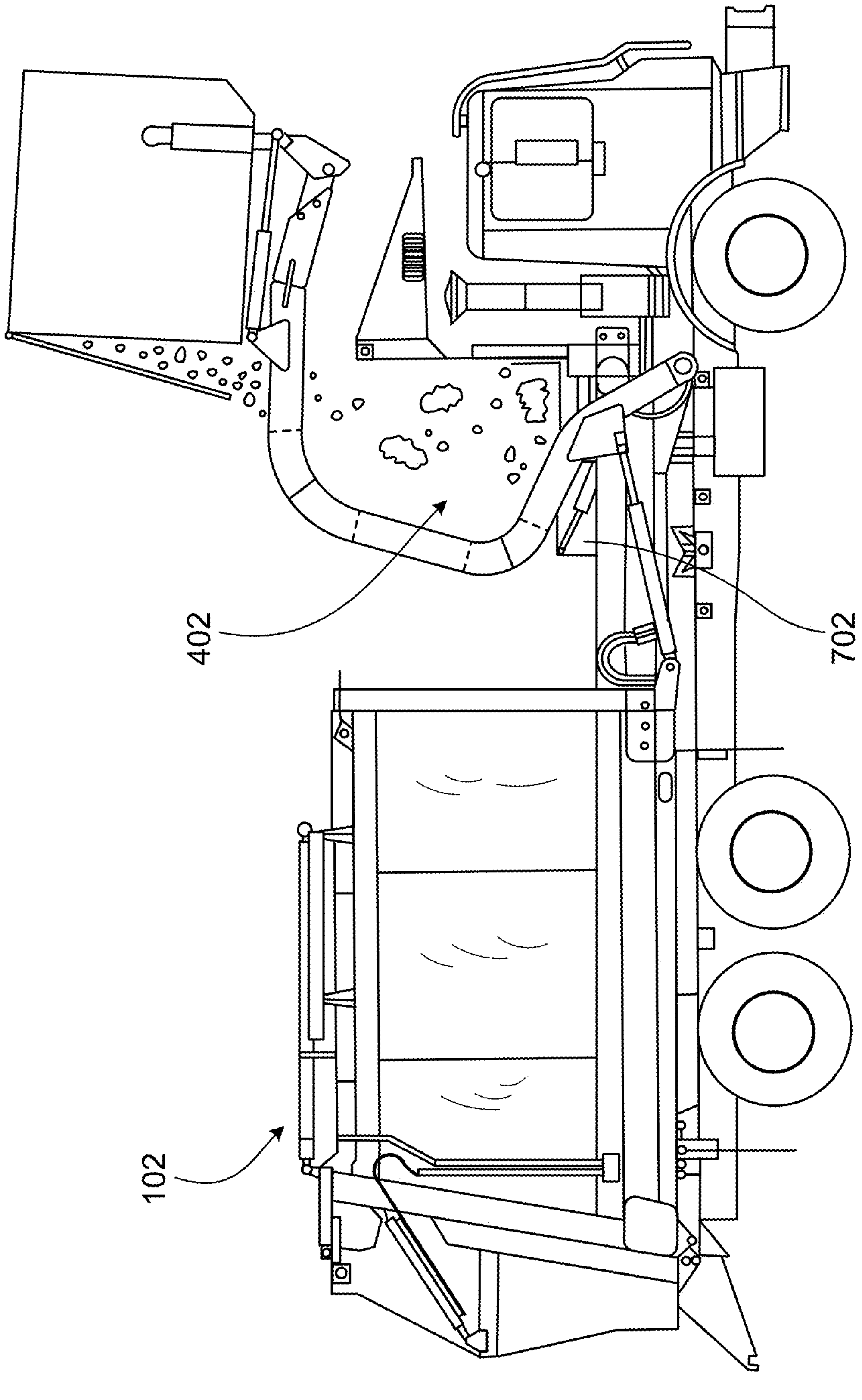
FIGS. 7A and 7B depict example schematics of an RCV configured for identifying contamination and/or other issue(s), according to implementations of the present disclosure.
Figure 7B:
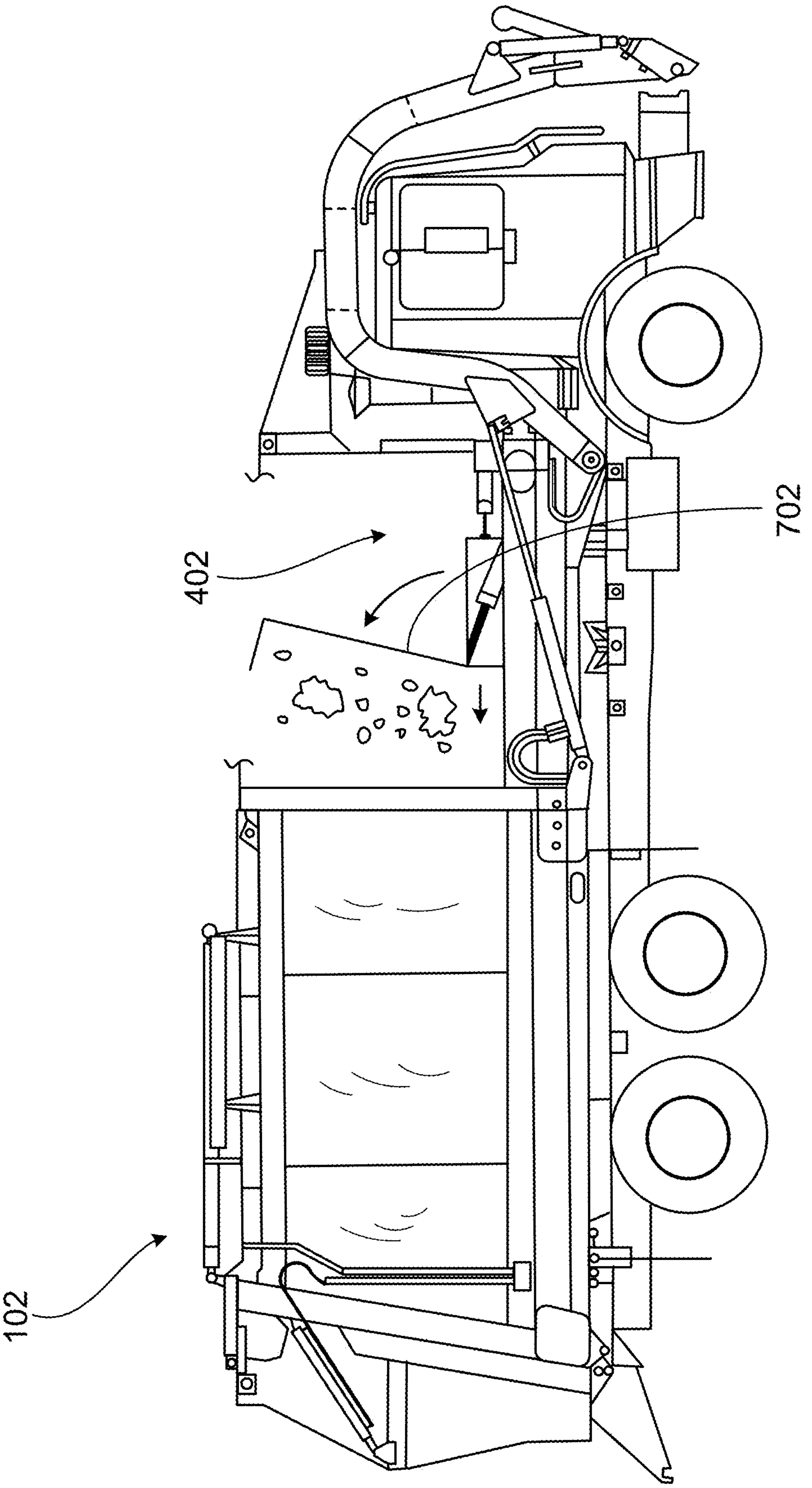

FIGS. 7A and 7B depict example schematics of an RCV configured for identifying contamination and/or other issue(s), according to implementations of the present disclosure. In these examples, the RCV 102 is equipped with a false floor 702 at or near the bottom of the hopper 402. As shown in FIG. 7A, when the floor 702 is substantially horizontal, it forms a surface on which refuse from an emptied container can land and rest temporarily while image(s) and/or other contaminant sensor data are collected of the refuse by proximal camera(s) and/or other contaminant sensor(s). When the false floor 702 is elevated, as shown in FIG. 7B, the refuse can be moved off of the false floor 702, e.g., into another area in the hopper 402.

Figure 8A:
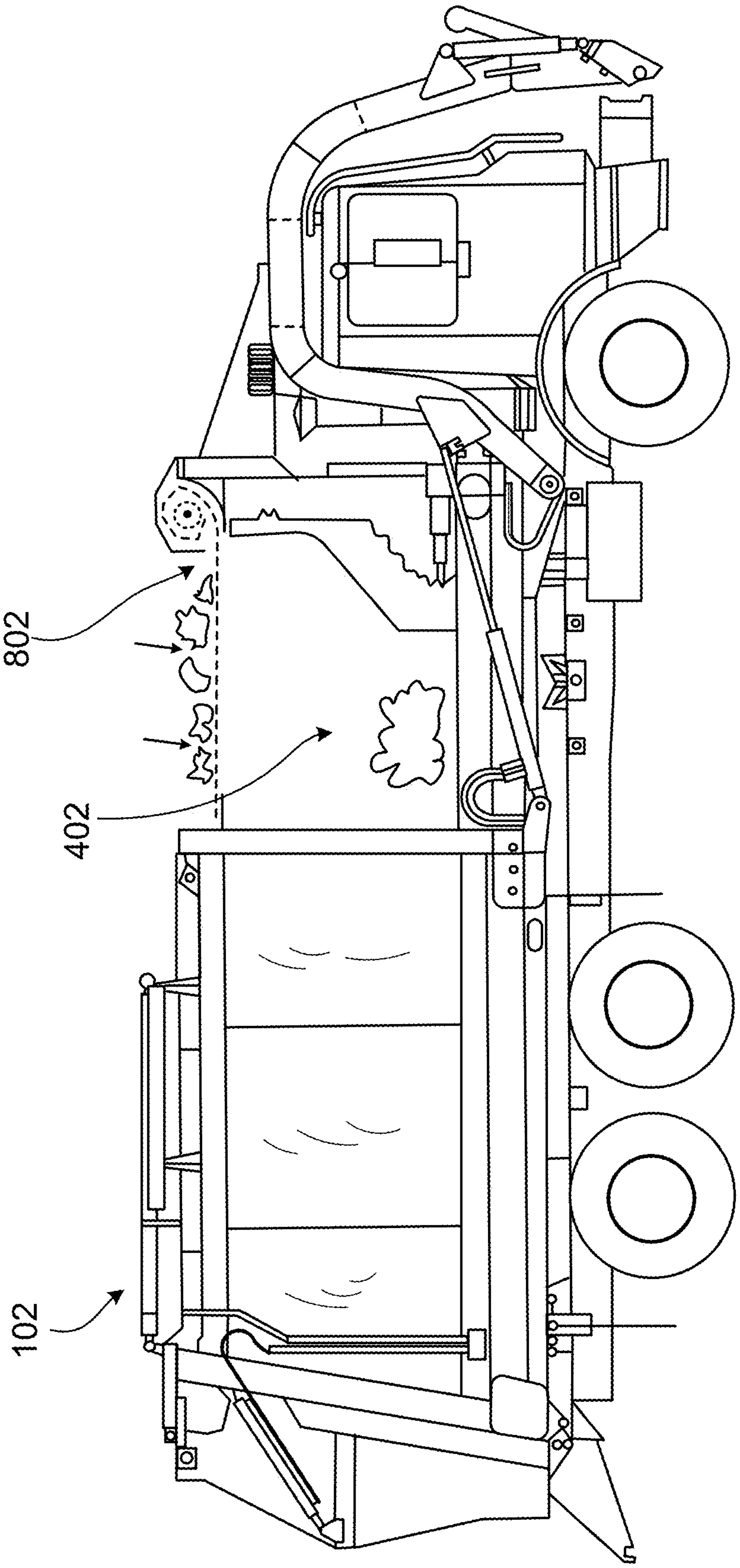
FIGS. 8A and 8B depict example schematics of a refuse collection vehicle configured for identifying contamination and/or other issue(s), according to implementations of the present disclosure.
Figure 8B:
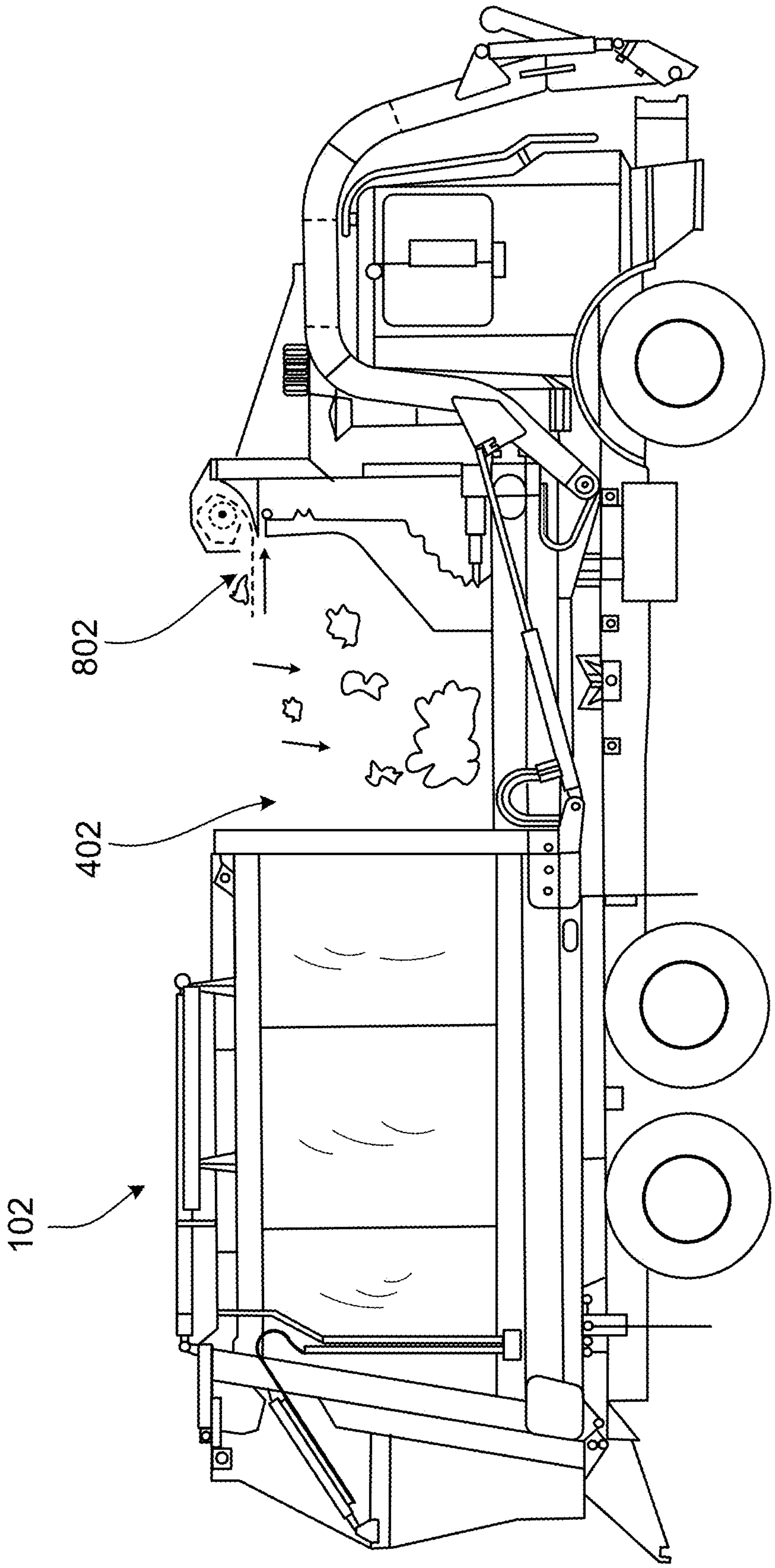

FIGS. 8A and 8B depict example schematics of an RCV configured for identifying contamination and/or other issue(s), according to implementations of the present disclosure. In these examples, the RCV 102 is equipped with a retracting door 802 (e.g., a rolling "reverse garage-style" door) at or near the top of the hopper 402. As shown in FIG. 8A, when the door 802 is extended, it forms a surface on which refuse from an emptied container can land and rest temporarily while image(s) and/or other contaminant sensor data are collected of the refuse by proximal camera(s) and/or other contaminant sensor(s). When the door 802 is retracted, as shown in FIG. 8B, the refuse can fall into the hopper 402. Accordingly, the door 802 can temporarily interrupt the falling of the refuse into the hopper 402, allowing contaminant sensor data to be collected from the stationary refuse for analysis to identify contamination.

Figure 9A:
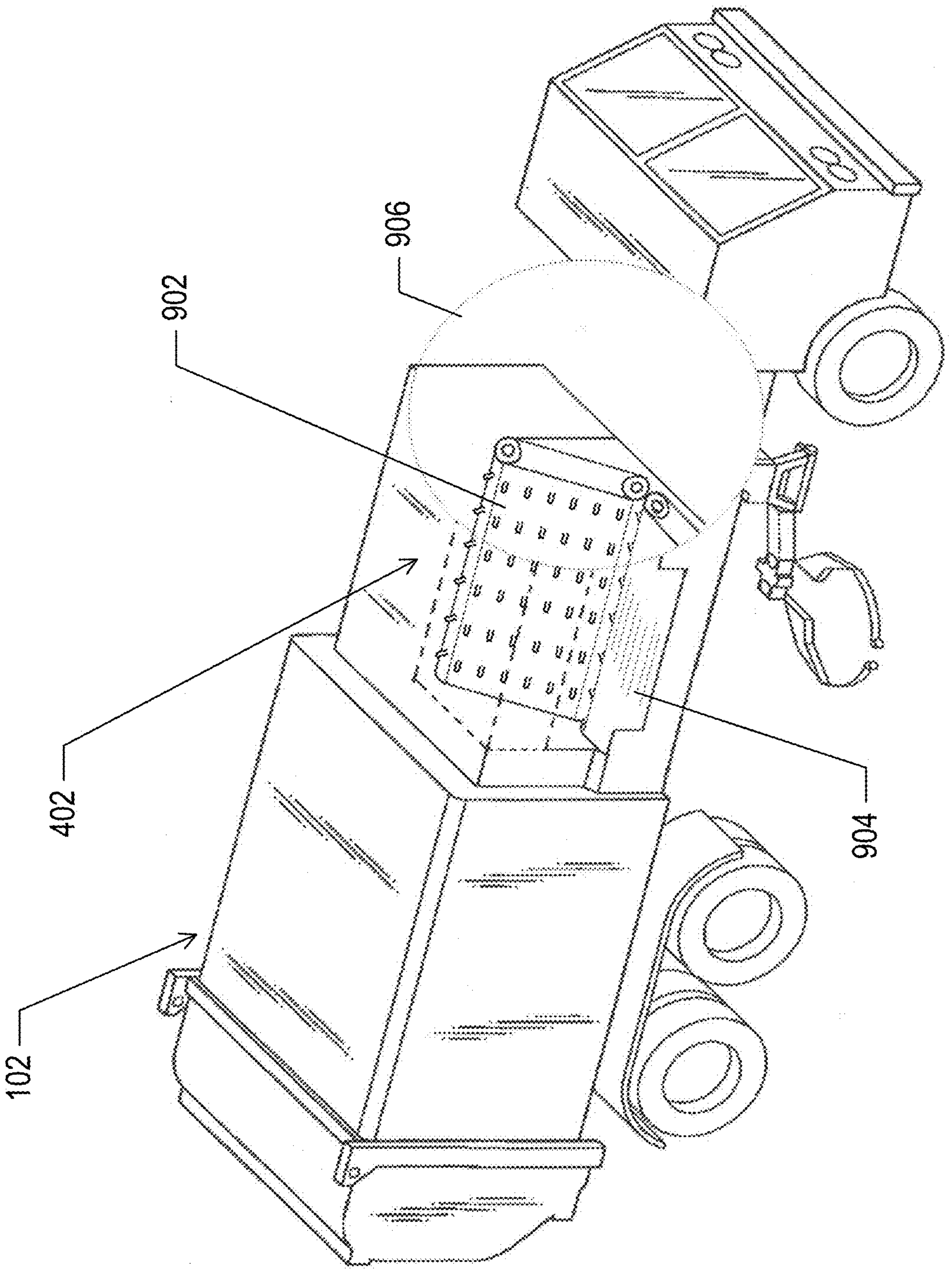
FIGS. 9A and 9B depict example schematics of a refuse collection vehicle configured for identifying contamination and/or other issue(s), according to implementations of the present disclosure.
Figure 9B:
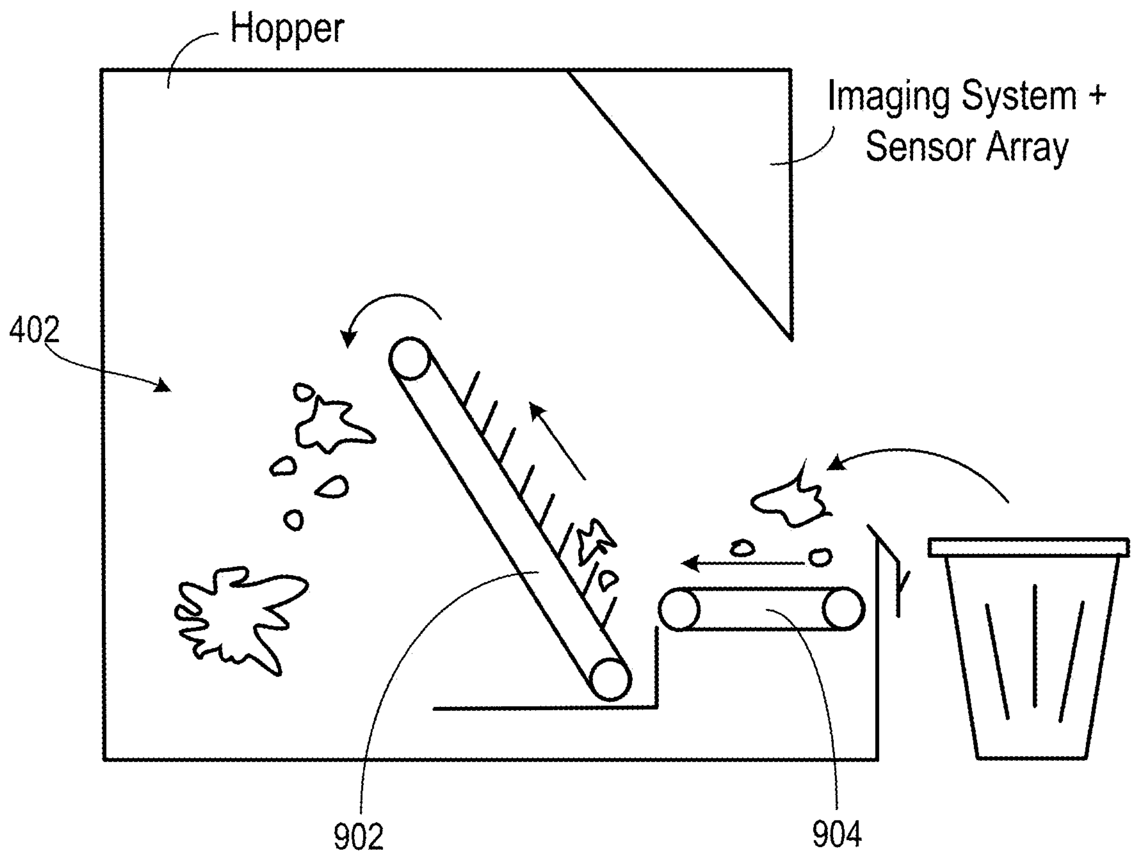

FIGS. 9A and 9B depict example schematics of an RCV configured for identifying contamination and/or other issue(s), according to implementations of the present disclosure. In these examples, the RCV 102 is equipped with conveyor belts 902 and 904 in a portion of the hoper 402. Refuse from a container can be initially emptied onto a first conveyor belt 904 where it may rest while image(s) and/or other contaminant sensor data are collected. The conveyor belts 904 and 902 can then be activated to move the refuse up and over the belt 902 into another portion of the hopper 402. FIG. 9B shows a cutaway view of portion 906 from FIG. 9A.

Figure 10:
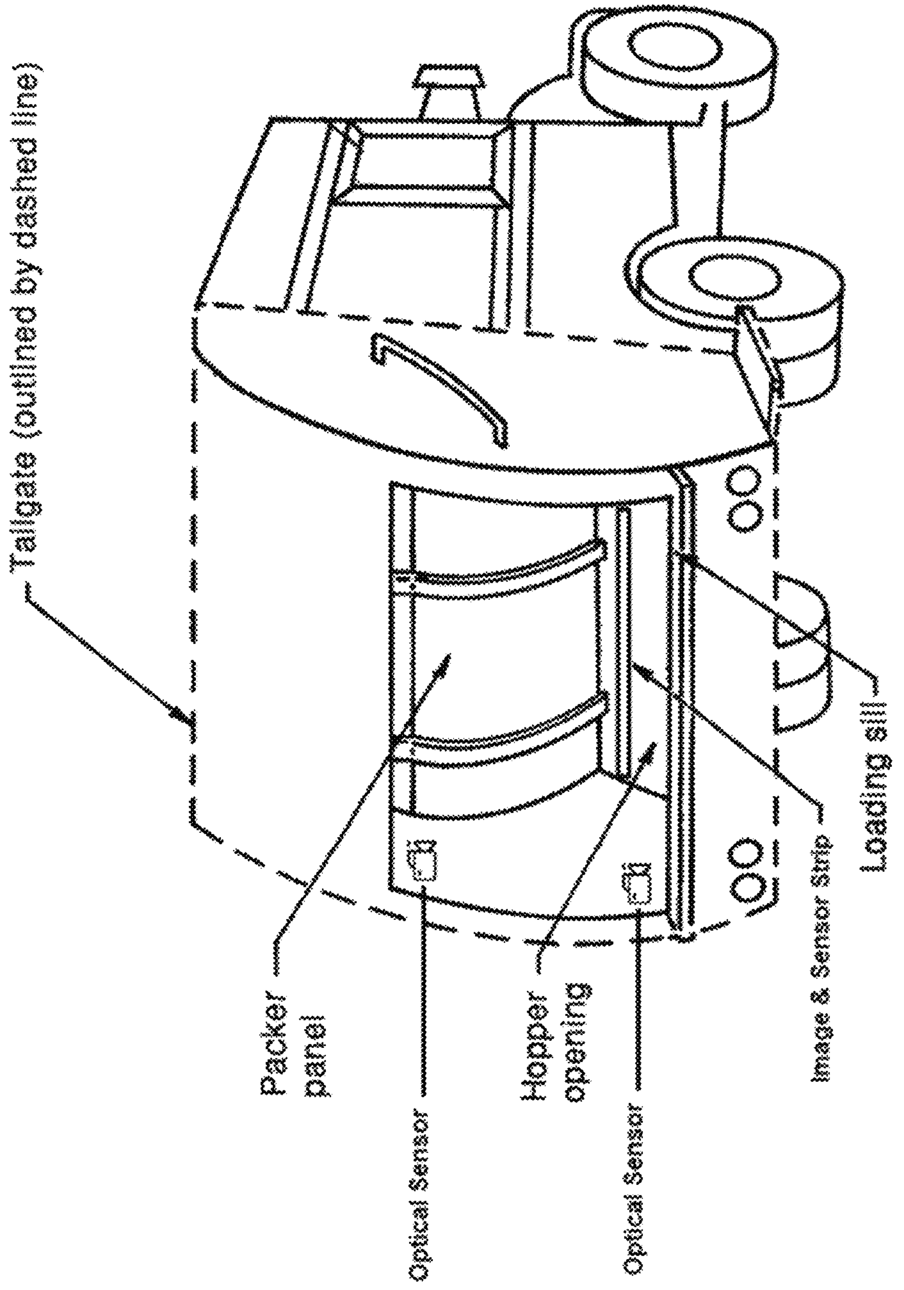
FIG. 10 depicts an example schematic of a refuse collection vehicle configured for identifying contamination and/or other issue(s), according to implementations of the present disclosure.

FIG. 10 depicts an example schematic of an RCV configured for identifying contamination and/or other issue(s), according to implementations of the present disclosure. FIG. 10 illustrates an example configuration, including example placements of contaminant sensor(s) such as optical sensor(s) (e.g., camera(s)).

Figure 11A:
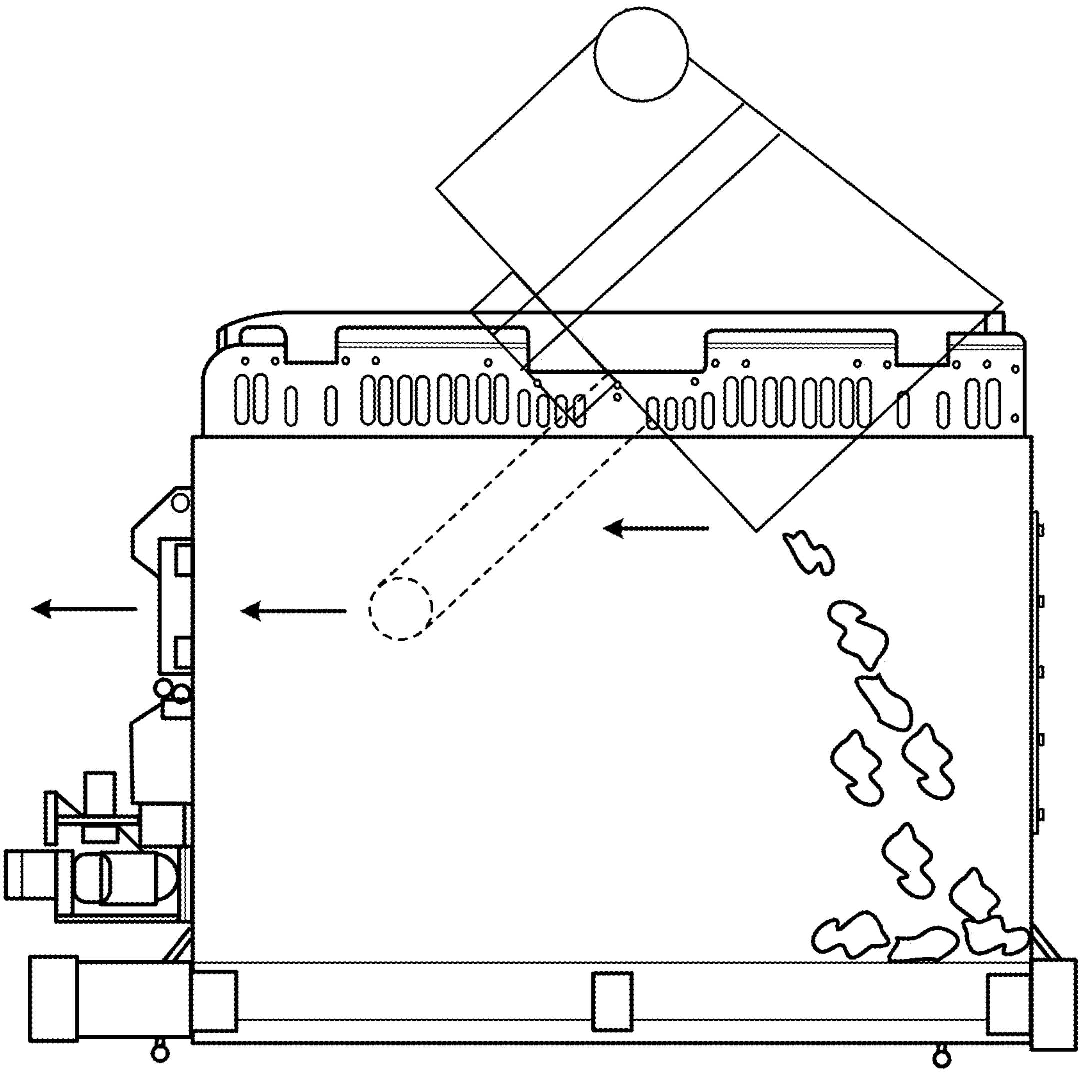
FIGS. 11A and 11B depict example schematics of a refuse collection vehicle configured for identifying contamination and/or other issue(s), according to implementations of the present disclosure.
Figure 11B:
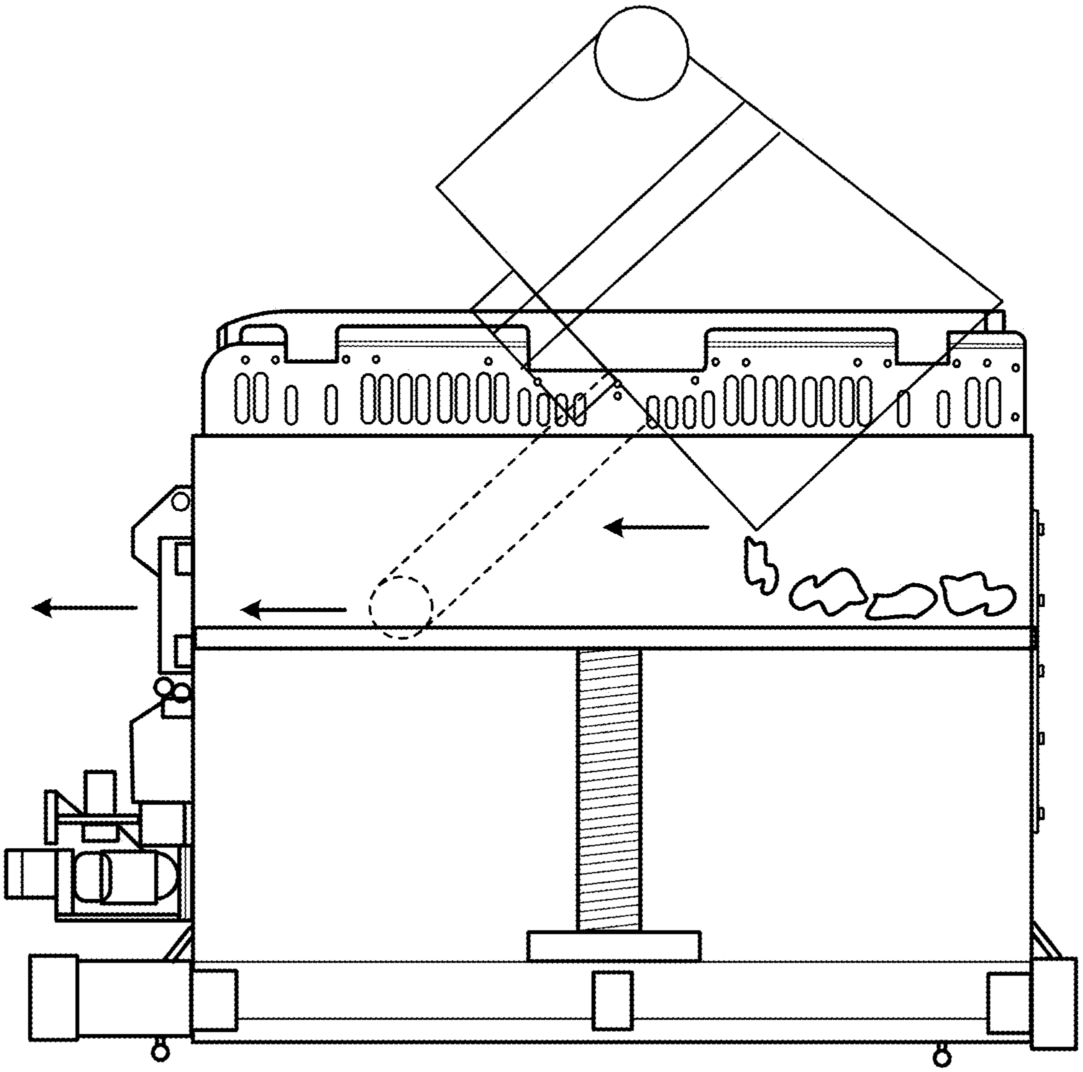

FIGS. 11A and 11B depict example schematics of an RCV configured for identifying contamination and/or other issue(s), according to implementations of the present disclosure. As shown in the example of FIG. 11A, the slide motion of the arm can be used to spread the refuse across the floor on the first cycle. During the following dumps, the refuse can be layered on the previous dump, in the same spreading motion. As shown in the example of FIG. 11B, a similar sliding motion can be used with a height adjustable false floor. Initially the floor starts in the raised position, and the can refuse is spread on the false floor. Once the dump completes, the floor lowers partially for the next layer to be spread. As the loads are dumped the floor continues to lower until it is at the lower position and is ready to be dumped in the body. In some implementations, a mechanism may be included that generates a vibration or other movement that is applied to the surface where the refuse is resting or moving, to help spread the refuse as it is in front of the camera(s) and/or other contaminant sensor(s), and to provide for more effective contaminant sensor data gathering.

In some implementations, a similar type of horizontal roll-up/garage door such as that described above could be used as the surface near the top of the can. Between each dump of refuse, the door could roll up (e.g., horizontally) allowing the garbage to fall below it creating a clean surface for spreading garbage.

Figure 12A:
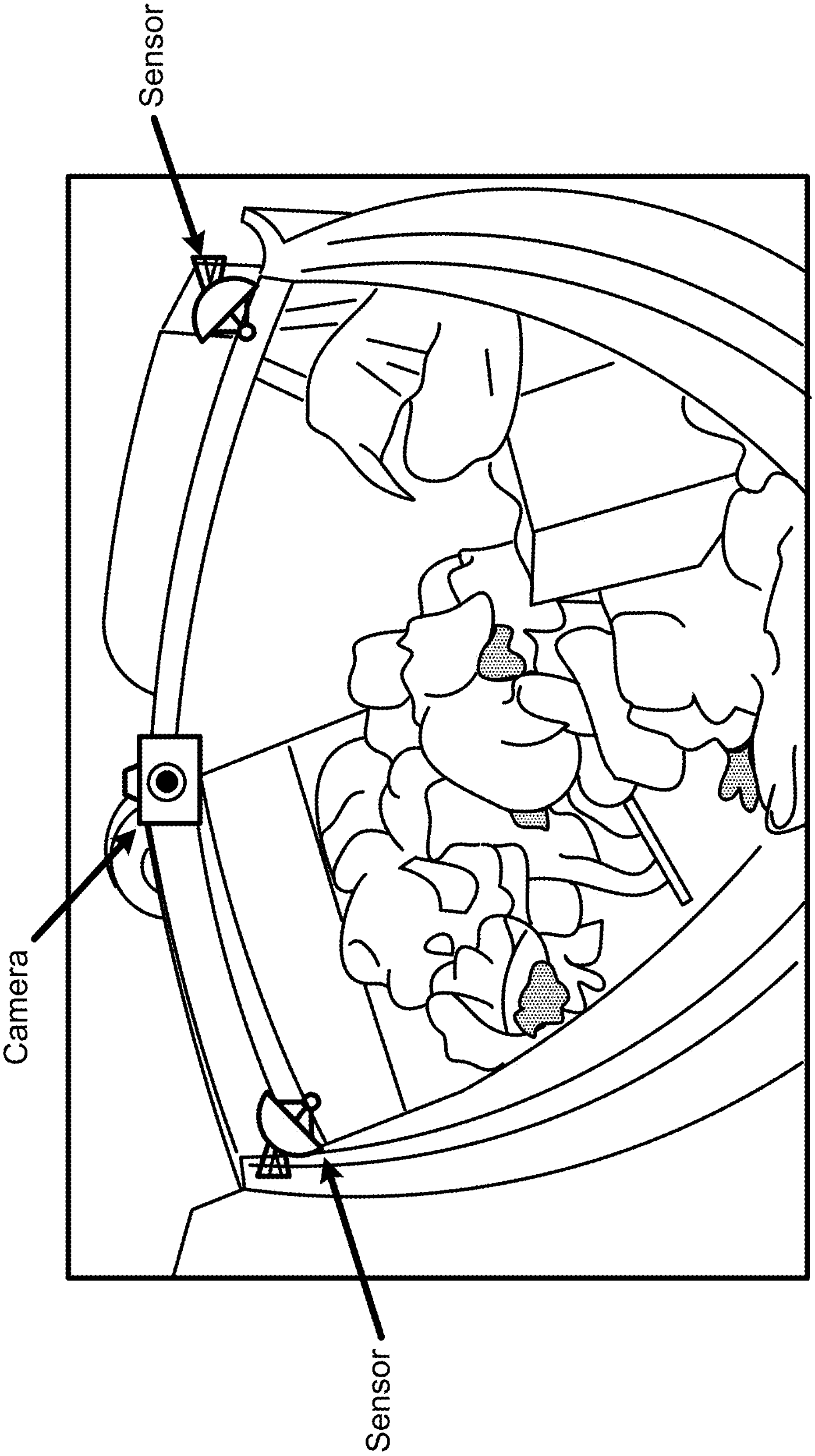
FIG. 12A depicts an example of camera and/or other sensor placement in an RCV, according to implementations of the present disclosure.

FIG. 12A depicts an example of contaminant sensor (e.g., camera) placement in an RCV, according to implementations of the present disclosure. As shown, the camera(s) and/or other sensor(s) can be placed with a view towards refuse, such as refuse in a hopper of the RCV. Any suitable number of camera(s) and/or other sensor(s) can be employed. A combination of cameras and/or sensors may monitor the waste as it is being dumped into the hopper or after it has been dumped, to identify contamination as the refuse falls and/or settles into the hopper (e.g., prior to be compacted).

Figure 12B:
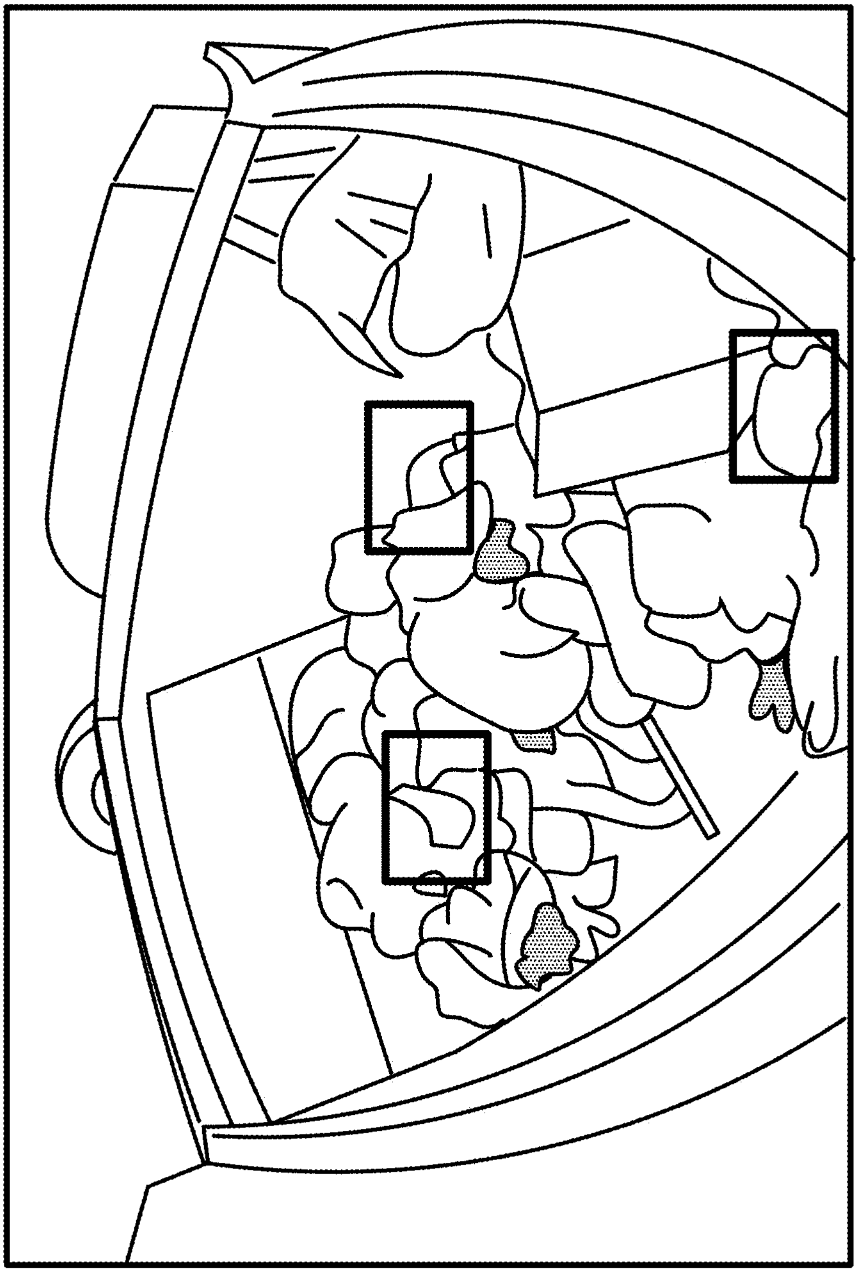
FIG. 12B depicts an example of identified contamination, according to implementations of the present disclosure.

FIG. 12B depicts an example of identified contamination, according to implementations of the present disclosure. When contamination is detected, the system can save image(s) and/or video of the event including marked instances of contaminants (e.g., the squares overlaying the image in this example). The marked image(s) and/or video data can be sent to the cloud for storage and review.

Figure 13A:
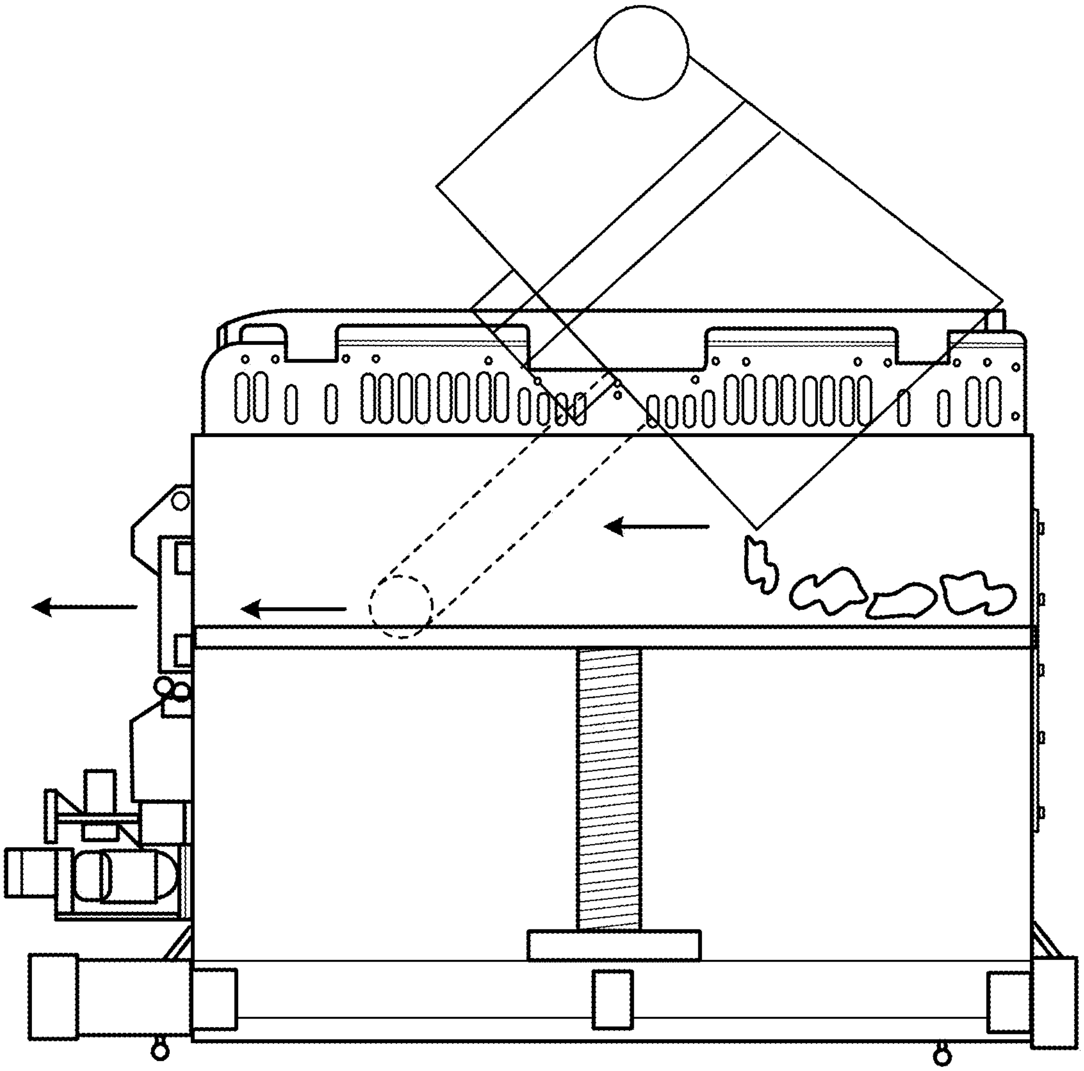
FIGS. 13A and 13B depict example schematics, according to implementations of the present disclosure.
Figure 13B:
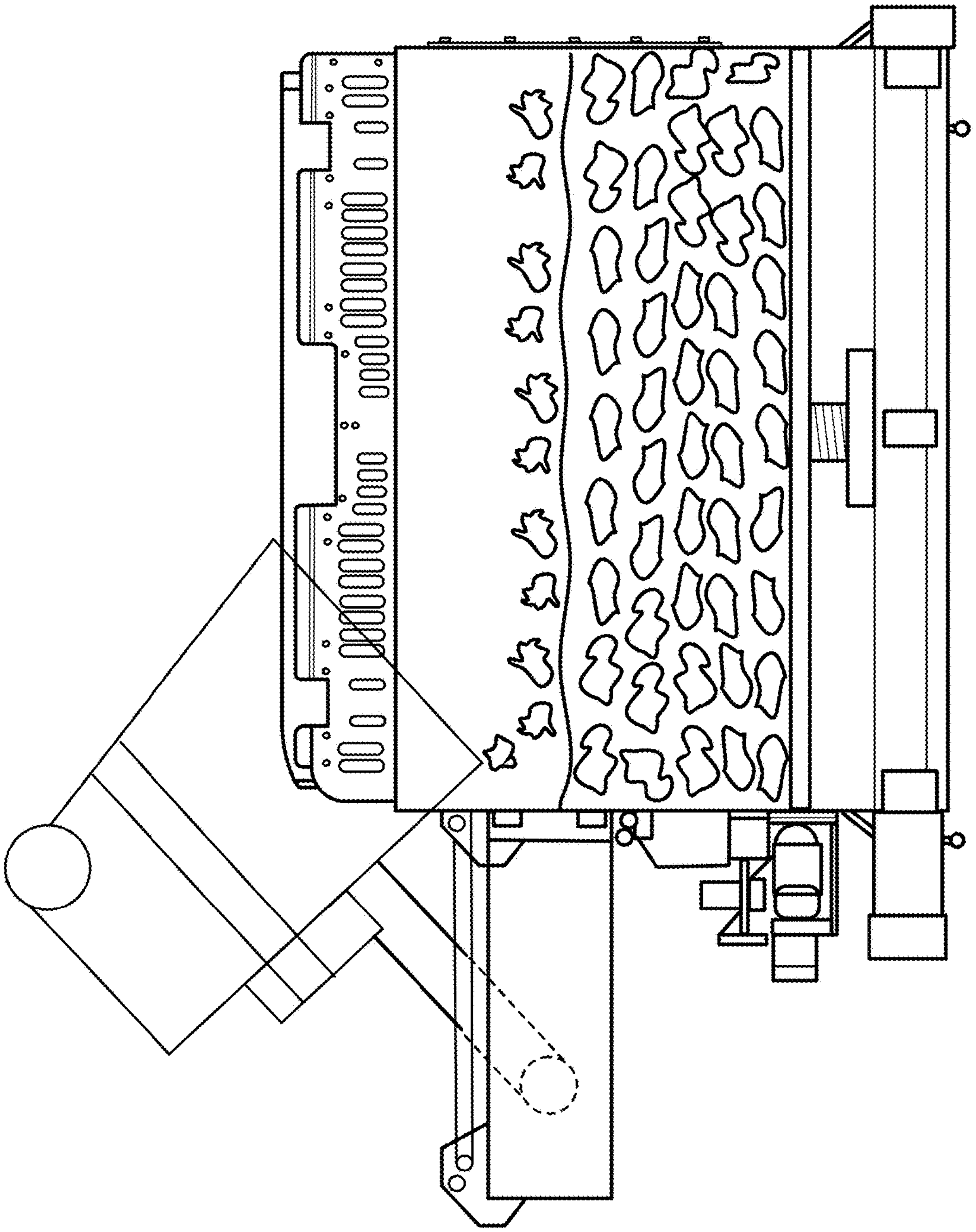
Figure 14A:
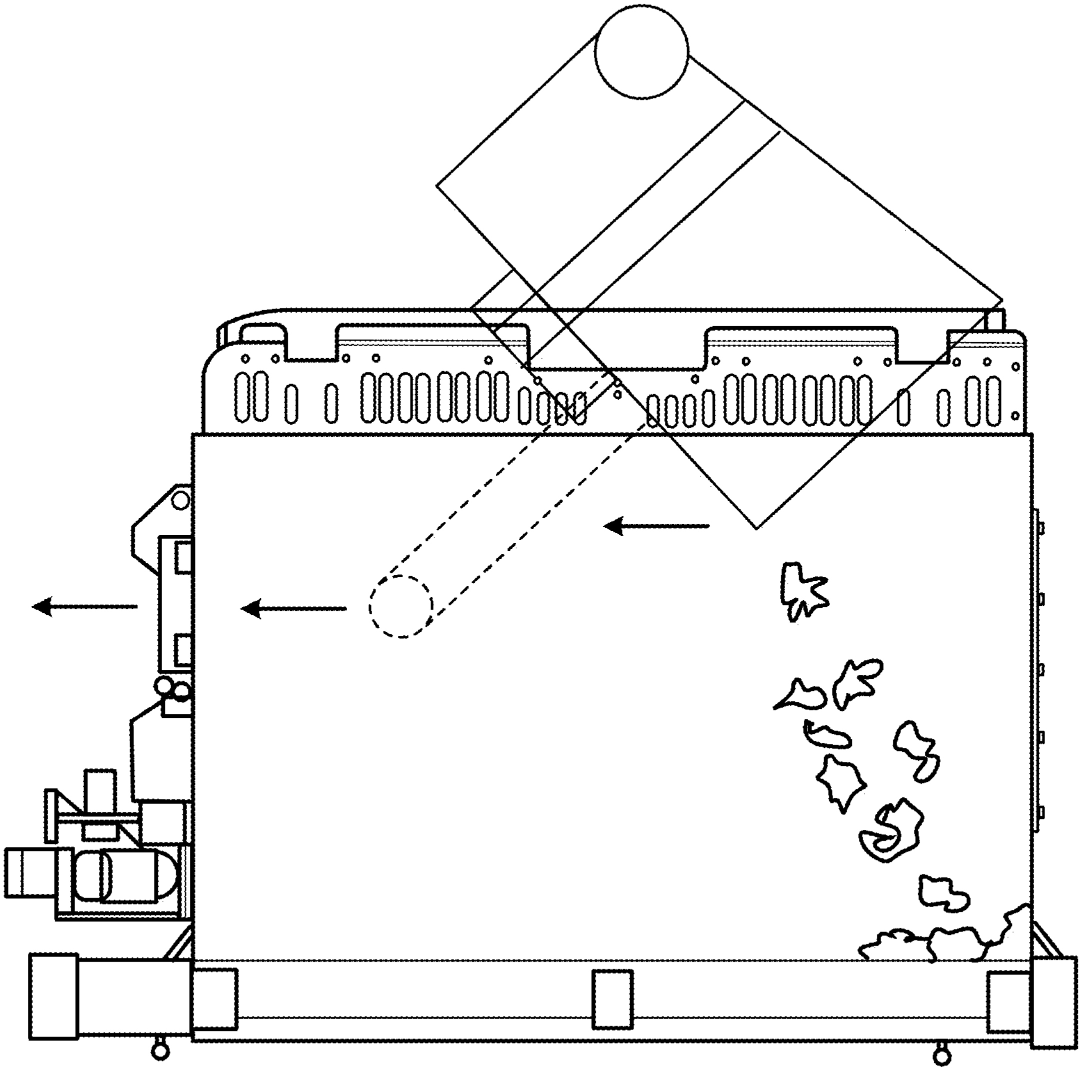
FIGS. 14A-14D depict example schematics, according to implementations of the present disclosure.
Figure 14B:
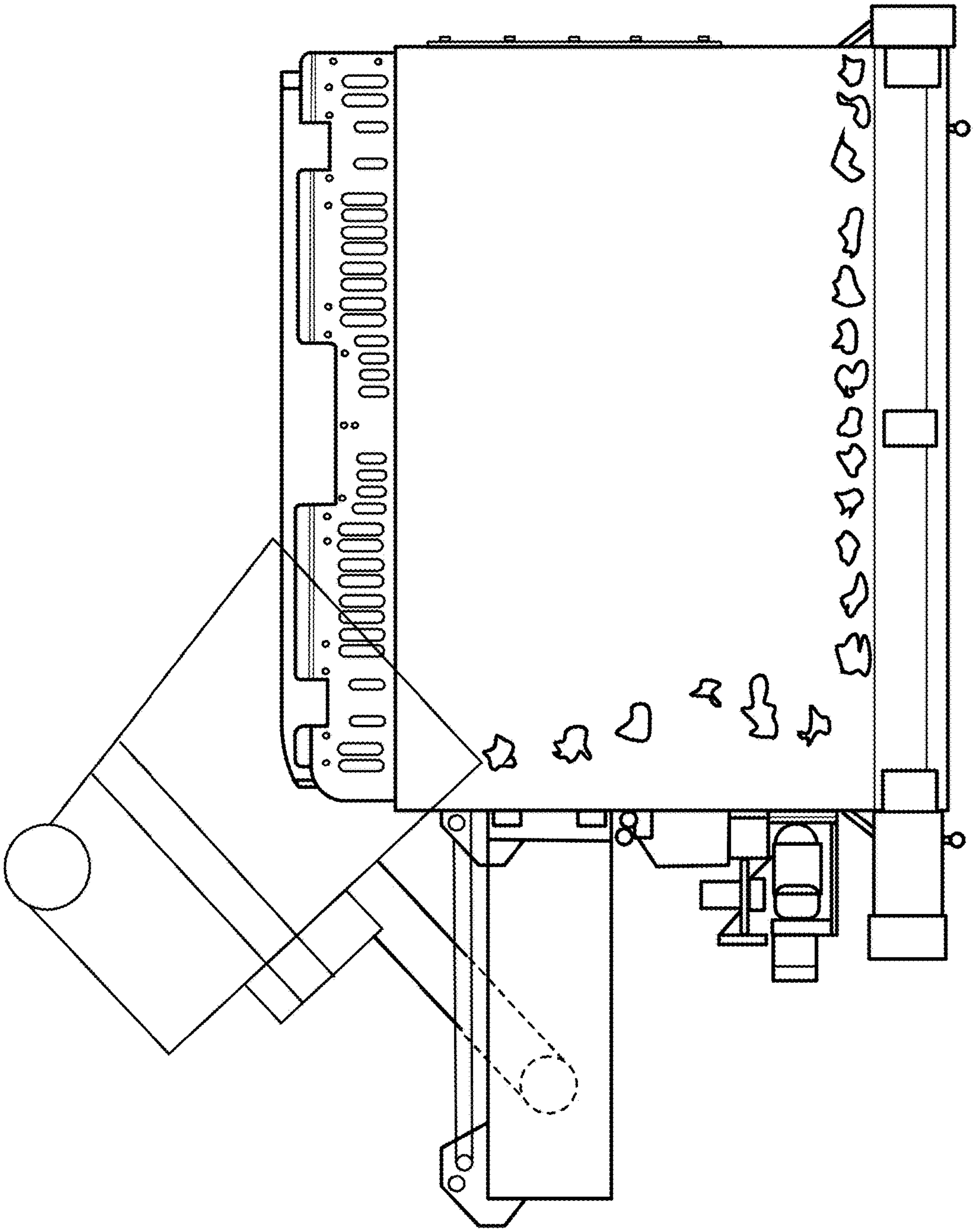
Figure 14C:
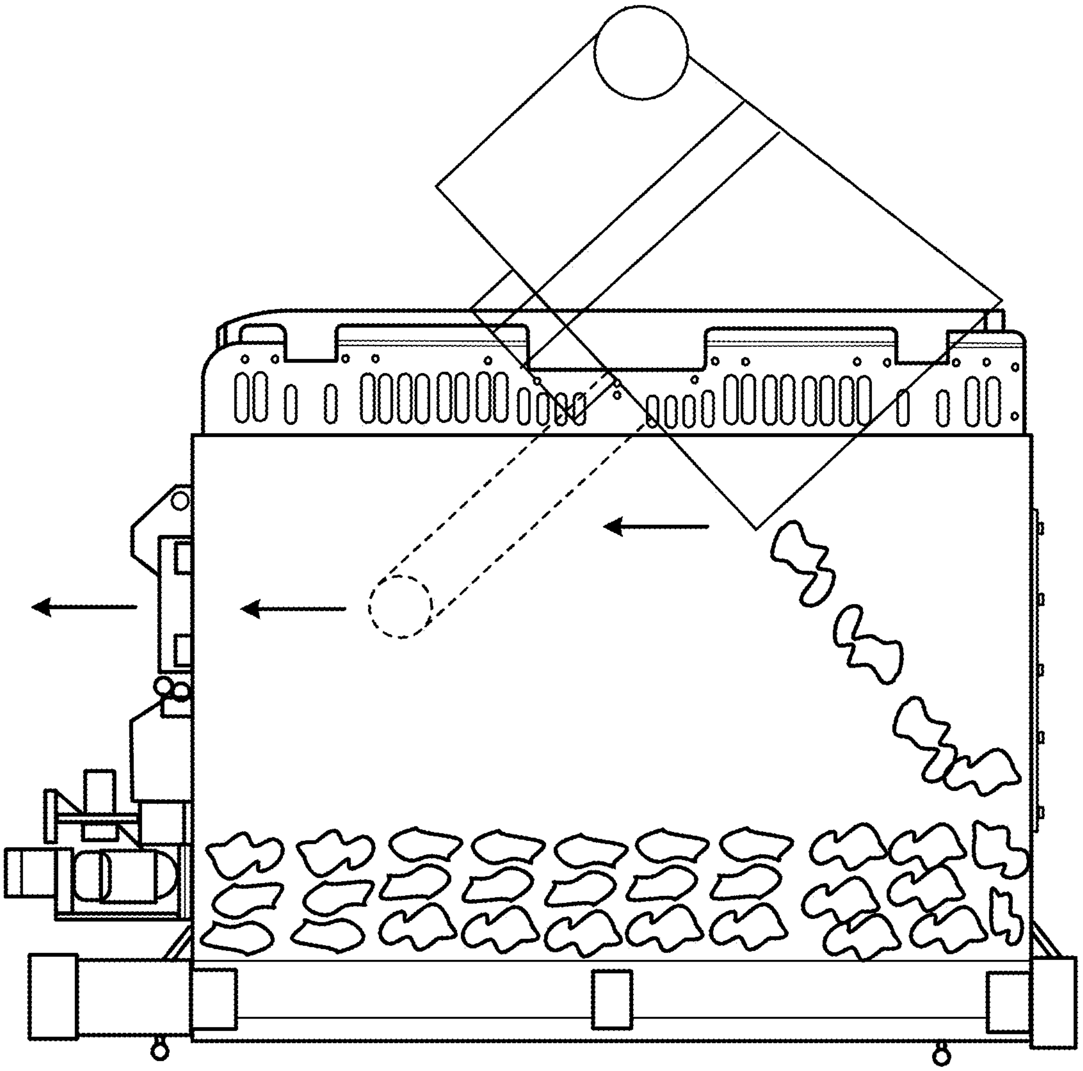
Figure 14D:
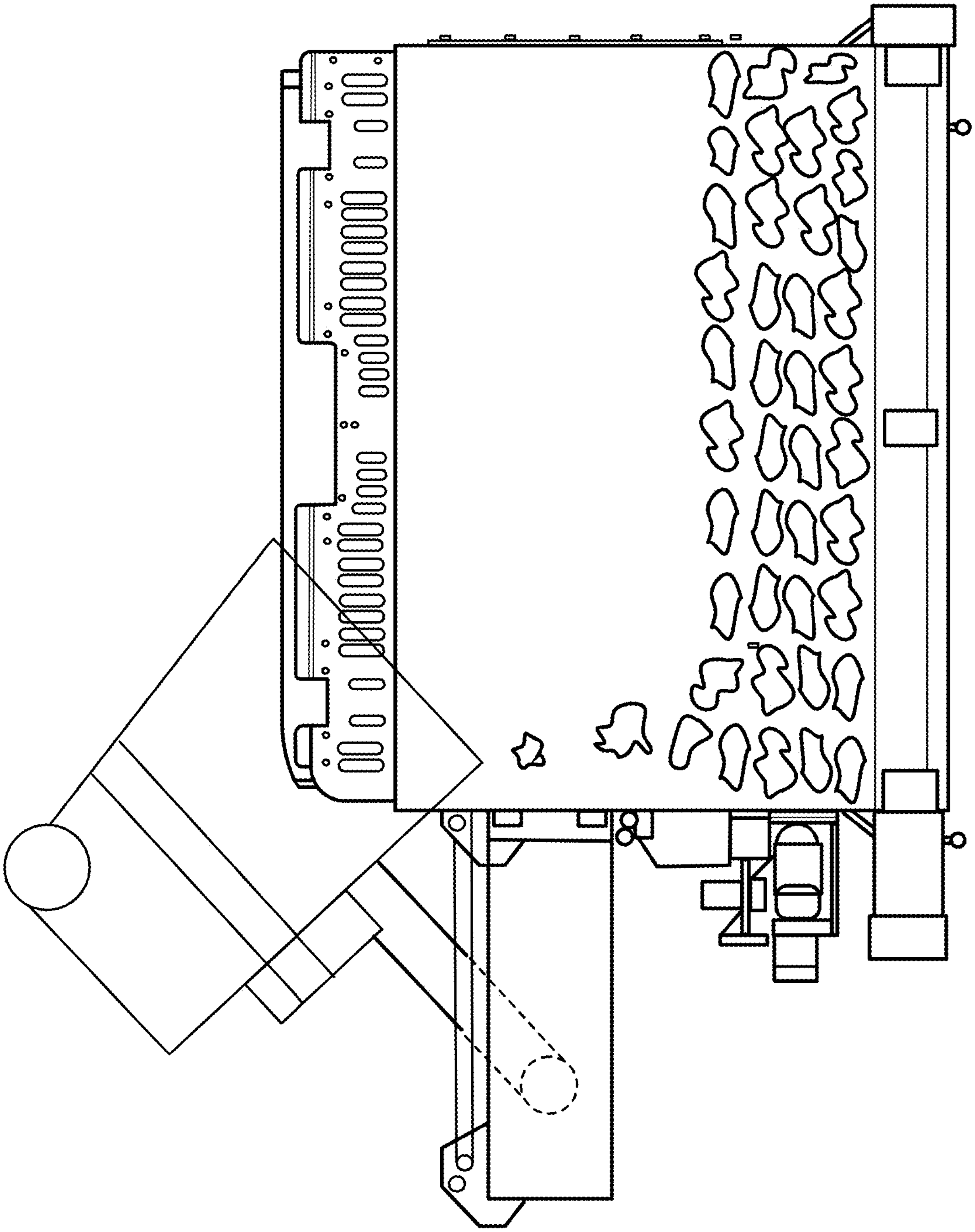

FIGS. 13A and 13B depict example schematics, according to implementations of the present disclosure. These examples show a Curotto-Can™ spreader. This example uses the slide motion of the arm to spread the refuse across a height adjustable false floor. Initially, the floor starts in the raised position; the can load is spread on the false floor. Once the dump completes, the floor lowers partially for the next layer to be spread. As the loads are dumped the floor continues to lower until it is at the lower position and is ready to be dumped in the body.

FIGS. 14A-14D depict example schematics, according to implementations of the present disclosure. These examples show a Curotto-Can™ spreader with raised floor. The first uses the slide motion of the arm to spread the refuse across the floor on the first cycle. During the following dumps, the refuse would be layered on the previous dump, in the same spreading motion.

A similar type of horizontal "Roll-up/garage door" could be used as the surface near the top of the can. Between each garbage can dump the door could roll up (e.g., horizontally) allowing the garbage to fall below it creating a clean surface for spreading garbage.

In the examples described above, the RCV has been configured to include a mechanism and/or structure that functions to hold the refuse in a substantially stationary state after the refuse has been emptied from the container and prior to the refuse entering the hopper, Curotto-Can™, and/or other structure that is to hold the refuse for transport by the RCV. Other structures and/or mechanisms can also be employed. For example, the RCV can be configured to include a ledge, surface, ramp, and so forth to hold the refuse in a stationary position, or in at least a sufficiently stationary state to enable accurate image(s) and/or other contaminant sensor data to be captured for analysis. In some examples, the structure and/or mechanism is also configured to spread, distribute, or otherwise rearrange the refuse for optimal dispersion, to provide for optimal image and/or contaminant sensor data capture for analysis.

Although examples herein may show and/or describe implementations for particular types of RCVs, implementations are not limited to these examples. The structures and/or methods described herein can apply to any suitable type of RCV, including front-loader, rear-loader, side-loader, roll-off, and so forth, with or without Curotto-Can™, carry can, and so forth.

Figure 15:
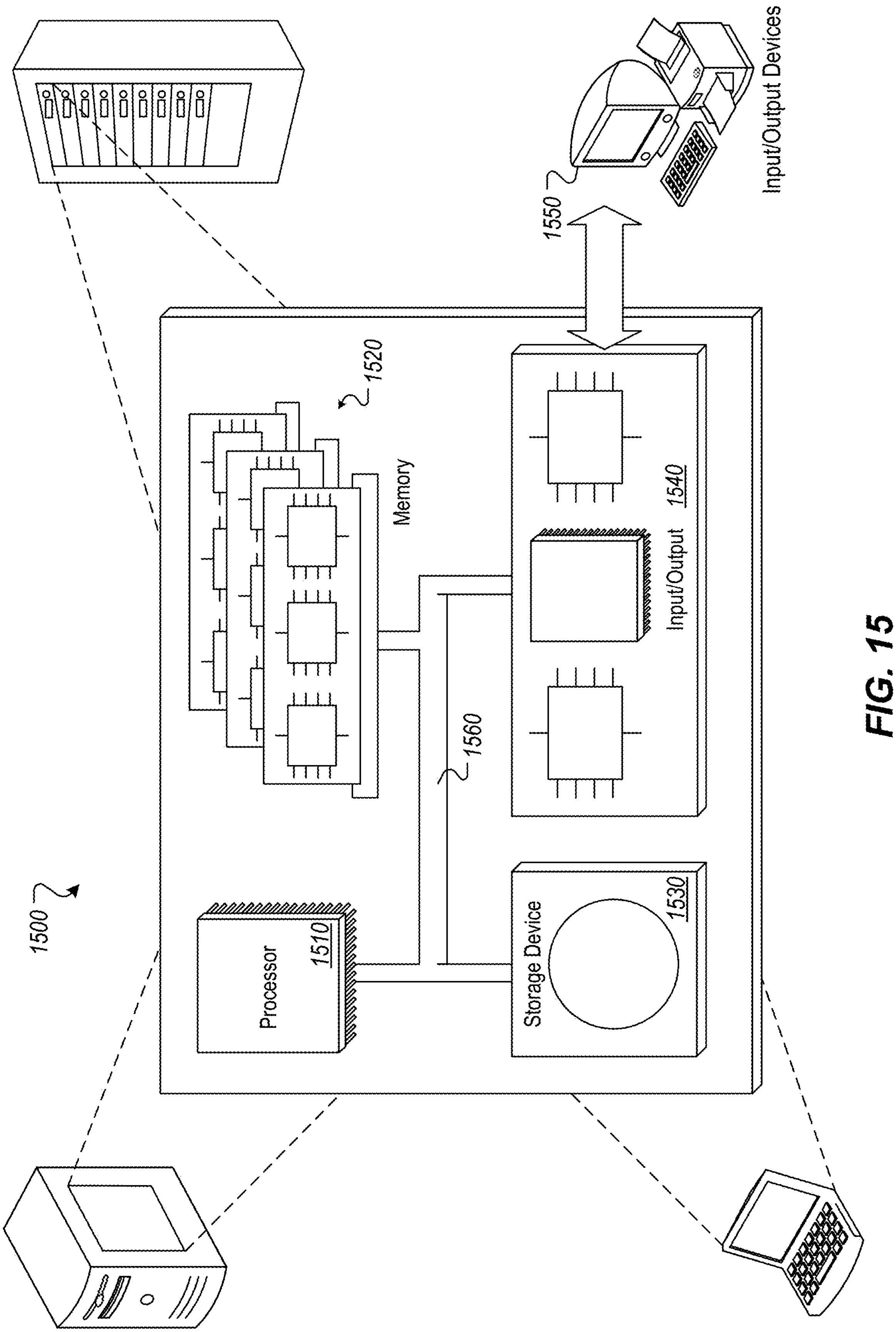
FIG. 15 depicts an example computing system, according to implementations of the present disclosure.

FIG. 15 depicts an example computing system, according to implementations of the present disclosure. The system 1500 may be used for any of the operations described with respect to the various implementations discussed herein. For example, the system 1500 may be included, at least in part, in one or more of the onboard computing device 112, the analysis computing device(s) 120, the output device(s) 126, and/or other computing device(s) or system(s) described herein. The system 1500 may include one or more processors 1510, a memory 1520, one or more storage devices 1530, and one or more input/output (I/O) devices 1550 controllable via one or more I/O interfaces 1540. The various components 1510, 1520, 1530, 1540, or 1550 may be interconnected via at least one system bus 1560, which may enable the transfer of data between the various modules and components of the system 1500.

The processor(s) 1510 may be configured to process instructions for execution within the system 1500. The processor(s) 1510 may include single-threaded processor(s), multi-threaded processor(s), or both. The processor(s) 1510 may be configured to process instructions stored in the memory 1520 or on the storage device(s) 1530. For example, the processor(s) 1510 may execute instructions for the various software module(s) described herein. The processor(s) 1510 may include hardware-based processor(s) each including one or more cores. The processor(s) 1510 may include general purpose processor(s), special purpose processor(s), or both.

The memory 1520 may store information within the system 1500. In some implementations, the memory 1520 includes one or more computer-readable media. The memory 1520 may include any number of volatile memory units, any number of non-volatile memory units, or both volatile and non-volatile memory units. The memory 1520 may include read-only memory, random access memory, or both. In some examples, the memory 1520 may be employed as active or physical memory by one or more executing software modules.

The storage device(s) 1530 may be configured to provide (e.g., persistent) mass storage for the system 1500. In some implementations, the storage device(s) 1530 may include one or more computer-readable media. For example, the storage device(s) 1530 may include a floppy disk device, a hard disk device, an optical disk device, or a tape device. The storage device(s) 1530 may include read-only memory, random access memory, or both. The storage device(s) 1530 may include one or more of an internal hard drive, an external hard drive, or a removable drive.

One or both of the memory 1520 or the storage device(s) 1530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1500. In some implementations, the CRSM may include a data store that provides storage of computer-readable instructions or other information in a non-transitory format. The CRSM may be incorporated into the system 1500 or may be external with respect to the system 1500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1510 and the memory 1520 may be supplemented by, or incorporated into, one or more application-specific integrated circuits (ASICs).

The system 1500 may include one or more I/O devices 1550. The I/O device(s) 1550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1550 may also include one or more output devices such as a display, LED(s), an audio output device (e.g., a speaker), a printer, a haptic output device, and so forth. The I/O device(s) 1550 may be physically incorporated in one or more computing devices of the system 1500, or may be external with respect to one or more computing devices of the system 1500.

The system 1500 may include one or more I/O interfaces 1540 to enable components or modules of the system 1500 to control, interface with, or otherwise communicate with the I/O device(s) 1550. The I/O interface(s) 1540 may enable information to be transferred in or out of the system 1500, or between components of the system 1500, through serial communication, parallel communication, or other types of communication. For example, the I/O interface(s) 1540 may comply with a version of the RS-232 standard for serial ports, or with a version of the IEEE 1284 standard for parallel ports. As another example, the I/O interface(s) 1540 may be configured to provide a connection over Universal Serial Bus (USB) or Ethernet. In some examples, the I/O interface(s) 1540 may be configured to provide a serial connection that is compliant with a version of the IEEE 1394 standard.

The I/O interface(s) 1540 may also include one or more network interfaces that enable communications between computing devices in the system 1500, or between the system 1500 and other network-connected computing systems. The network interface(s) may include one or more network interface controllers (NICs) or other types of transceiver devices configured to send and receive communications over one or more communication networks using any network protocol.

Computing devices of the system 1500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Recycling streams can include an initially unknown amount of contamination (e.g., non-recyclable material). Contaminants may vary from location to location and can be introduced by customers and/or interlopers (e.g., mid-stream contamination). The cost of contamination is typically borne by the recycling facility and may result in lost recycling material or disabled sorting machinery. The cost can also be borne by waste collection services as lost recycling material revenue.

The implementations described herein operate to quantify the type and amount of contaminants in the recycling stream in a timely manner. Increasing efficiency in solid waste collection systems can be accomplished through coordination between many disparate elements. Increasing efficiency can depend on collecting data from the waste collection environment, automating analysis of the collected data, and communicating the automated analysis to impacted parties. For example, reports of contamination can be used by one or more of the following entities:

- Waste collection service providers to identify, quantify, and isolate the cost of contamination;
- Waste collection service providers to educate and change customer behavior; and/or
- A recycling facility to reduce or eliminate contaminants before the sorting process begins.

Accordingly, in some implementations an AI system is applied to refuse collection systems and services. Such a system can employ ML techniques, such as Deep Learning techniques, to automatically learn, reconfigure, and improve over time. Implementations can achieve contaminant detection, quantification, and/or reduction by providing on or more of the following:

- On-the-edge camera and sensor coverage using vehicle-specific positioning;
- On-the-edge sensor fusion of same and/or different contaminant sensor types;
- On-the-edge processing capable of executing machine learning detection application; Cloud-based ML detection systems;
- Wide-area communications to transmit sensor data and report results of contaminant detection;
- Dynamic contaminant reporting and rerouting of trucks prior to arrival at recycling facilities; and/or
- Feedback from multiple sources to reinforce learning and improve detection accuracy.

Waste (refuse) collection can include, but is not limited to, the collection of garbage (e.g., to transport to a landfill), recyclables (e.g., to transport to a recycling facility), and/or yard waste (e.g., to transport to a mulching facility). Waste collection can include collection from residential sites (e.g., small bins), commercial sites (e.g., large bins), and/or other types of sites.

The waste collection vehicles (e.g., trucks) can include a variety of truck types (e.g., front-loader, side-loader, rear-loader, etc.). Different data may be available in different types of trucks, based on the different telemetry collected, differing numbers of sensors, different types of sensors, and so forth. Different trucks may also provide different computing environment, such as environments that support one or more of the following: data streaming, data recording, data recording and uploading, single CPU, distributed computing, and so forth. Different communications systems may be supported by different trucks, such as communications that vary with respect to bandwidth, cost, medium, and so forth.

Entities interacting with the systems can include, but are not limited to, one or more of the following: truck driver/crew, event reviewer, quality control manager (e.g., reviewing validity of the driver and reviewer), truck driver/crew trainer, customer service agents, customers (e.g., residents, businesses, and/or municipalities with waste bins collected by trucks), waste collection service providers (e.g., public municipalities, private companies), and/or facility managers.

Implementations provide a Contaminant Detection Network, which can include any suitable number and type of computing resources and storage devices connected via communications systems to a multitude of trucks. The network topology may be centralized (e.g., cloud-based, client-server, etc.) using proprietary and/or standard communication protocol such internet protocol (IP) and/or transport networks such as 3g/4g/5g. The network topology may also be distributed (e.g., peer-to-peer), using point-to-point communications technology such as but not limited to v2v, and v2i, v2x, Lorawan. WIFI/WIFI Direct/NFC.

The Contaminant Detection Network can perform the following activities:

- Collects data from a multitude of trucks, as well as analysis results that are generated by analysis on the trucks or elsewhere;
- Stores collected data and analysis results;
- Executes AI software using Machine Learning and/or Deep Learning methodologies applied to both collected data and outside data sources to generate new data and analysis results;
- Distributes to a multitude of trucks the software for automating analysis of data collected locally;
- Distributes to individual trucks and/or waste management facilities real-time analysis of truck contents (e.g., contaminants in a truck headed to a recycling facility);
- Distributes to individual trucks and/or waste management service providers real-time safety exceptions, maintenance issues, and operations notifications;
- Manages sharing of AI-based models for detecting contaminants between individual trucks and between trucks and cloud-based servers; and/or
- Manages processing load and communication bandwidth across the Smart Truck Network based on priority, computing resource availability, and communication cost constraints.

Figure 16:
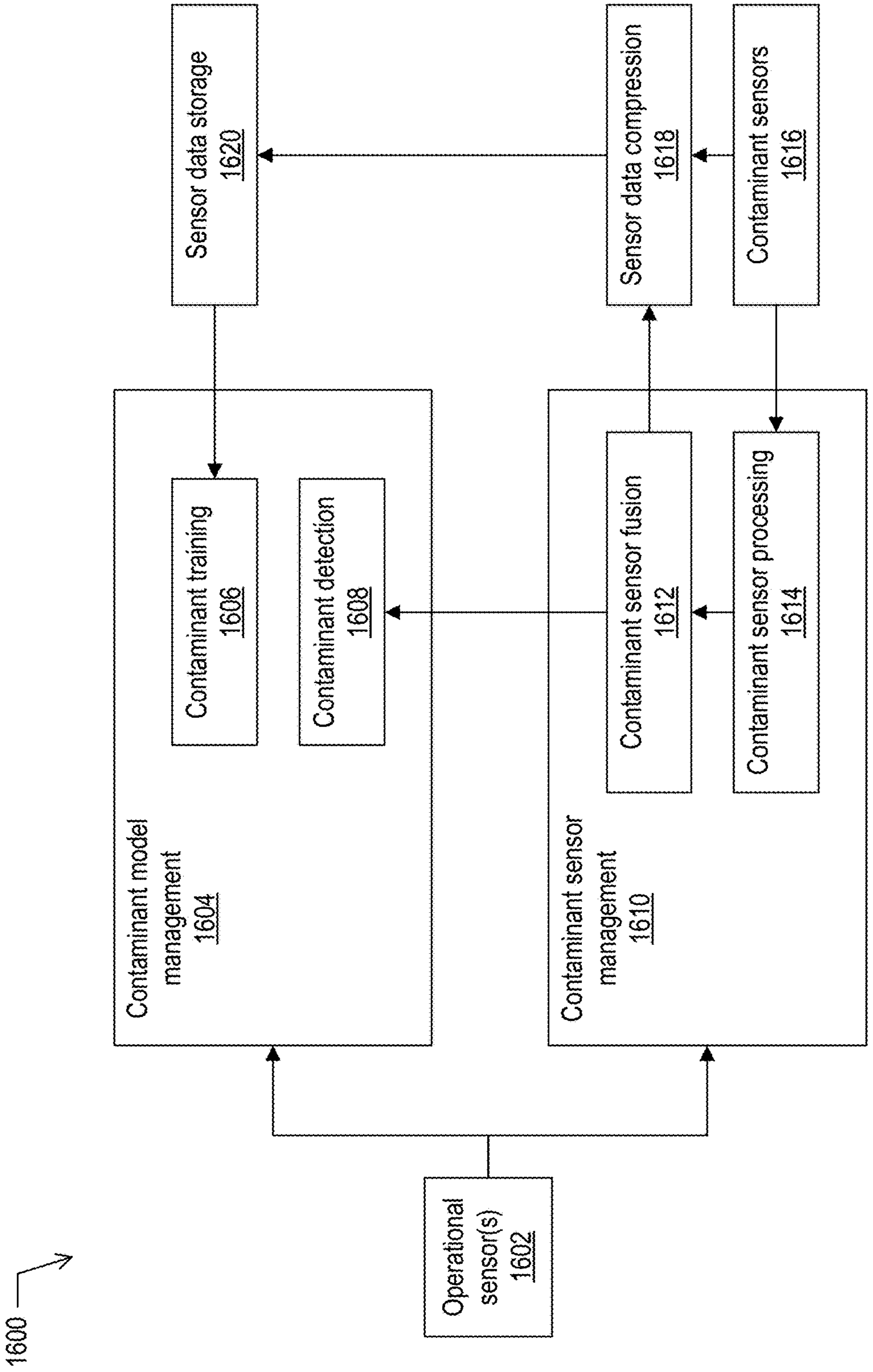
FIG. 16 depicts an example environment for a Contaminant Detection Network, according to implementations of the present disclosure.
Figure 17:
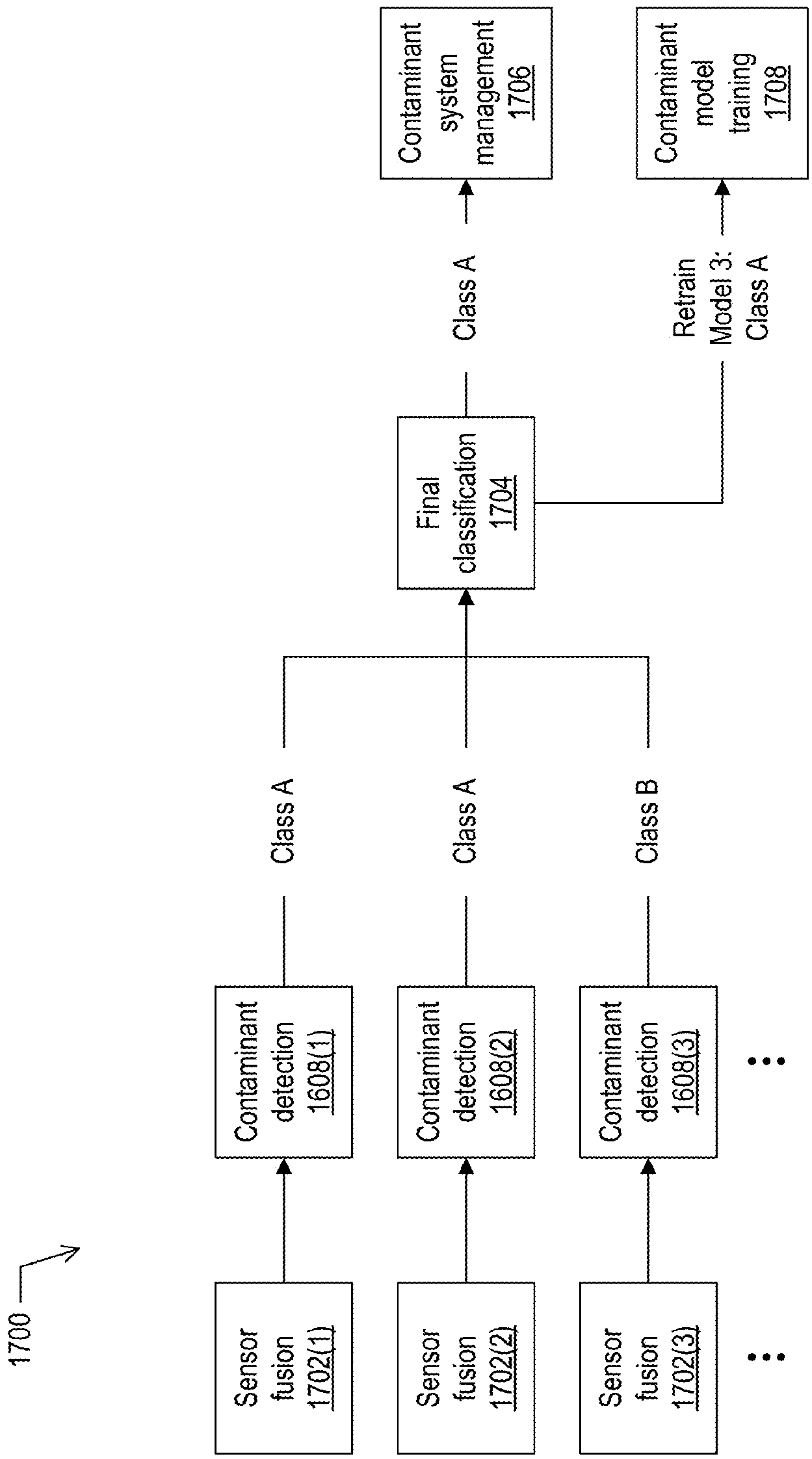
FIG. 17 depicts an example schematic of multiple object detection models with automated retraining, according to implementations of the present disclosure.
Figure 18:
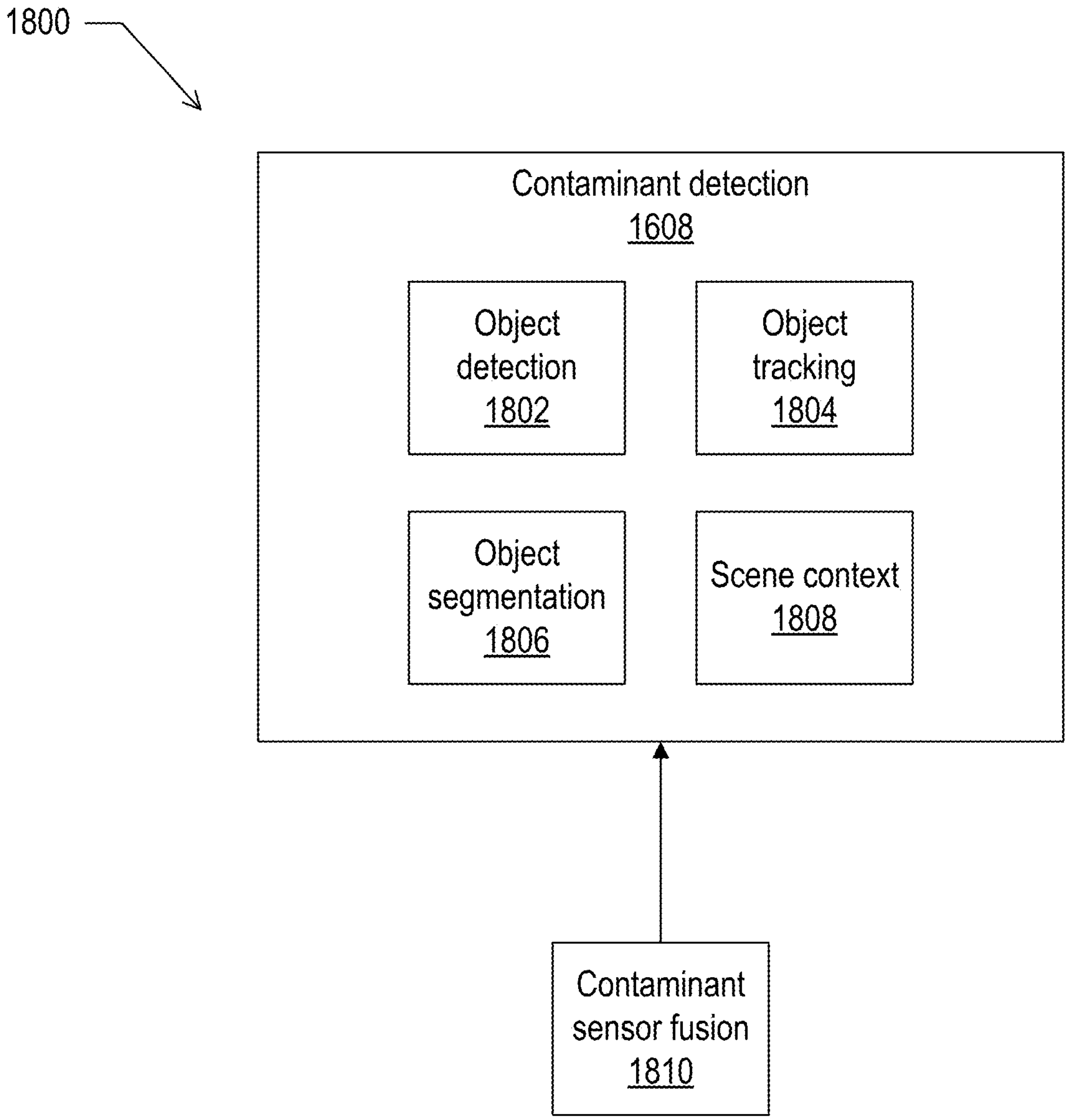
FIG. 18 depicts an example schematic of AI components of contaminant detection, according to implementations of the present disclosure.

The Contaminant Detection Network and its operations are described further with reference to FIGS. 16-18.

FIG. 16 depicts an example environment 1600 for a Contaminant Detection Network, according to implementations of the present disclosure. As shown in this example, the environment 1600 includes operational sensor(s) 1602, contaminant model management 1604, contaminant sensor management 1610, contaminant sensors 1616, sensor data compression 1618, and sensor data storage 1620. Contaminant model management 1604 can include contaminant training 1606 and contaminant detection 1608. Contaminant sensor management 1610 can include contaminant sensor fusion 1612 and contaminant sensor processing 1614. The operational sensor(s) 1602 can include the body sensor device(s) as described above.

Sensor data compression 1618 can be used in some implementations to filter out certain elements of the contaminant sensor data, and/or select those elements of the data that are to be used to train the model and/or that are provided as input to the model to make predictions.

The sensor fusion 1612 can be described in any suitable format, for example a version of JavaScript Object Notation (JSON). The sensor fusion 1612 can be a data structure that correlated, based on time, the various different sources and types of contaminant sensor data as described herein. For example, a JSON record can include a timestamp (date and/or time) along with data elements describing image(s), audio sensor data, and so forth. Accordingly, the sensor fusion can represent an N-dimensional model, where different dimension(s) may represent the different types and/or sources of contaminant sensor data.

The contaminant detection 1608 can include any suitable number of ML-trained models that operate to generate predictions based on the input sensor fusion 1612. The contaminant training 1606 can be used to train the model(s) in the contaminant detection 1608. A model may be trained per individual RCV, such that each RCV has a model (or set of models) that make predictions based on contaminant sensor data generated from that RCV. A model may be trained per type of RCV (e.g., make, model, year of the vehicle), such that the model (or set of models) makes predictions based on contaminant sensor data that is generated from RCVs of that type. A model may also be trained generally for multiple types of RCVs. In some instances, a model may be trained for each customer, and used to detect variations in the refuse produced by that customer. In some examples, the particular contaminant sensors and their arrangement in the RCVs may be standardized, within acceptable ranges of variation in location and orientation, to provide contaminant sensor data that is substantially standardized, such that a same set of model(s) may be used to analyze data from different RCVs.

In some examples, the contaminant sensor management 1610 may be executing separately from the contaminant model management 1604, on different computing device(s). In some examples, the contaminant sensor management 1610 can execute on the one or more computing devices that also execute the contaminant model management 1604. The contaminant sensor management 1610 operates to determine whether the contaminant sensors 1616 are functioning properly, and to manage the contaminant sensors 1616. For example, 1604 may operate on server(s) (e.g., in the cloud), and 1610 may operate on the RCV (e.g., on the UDU). In some implementations, the sensor(s) 1616 can be configured to provide the data that is most useful for training and/or using the model to make predictions.

Contaminant sensor(s) 1616 can include any suitable number and type of sensors to capture the contaminant sensor data, including but not limited to camera(s) that generate image(s) (and/or video) of the refuse. For example, camera(s) can be situated to image the refuse from above, e.g., looking down from an edge of the hopper. Contaminant sensors can also include acoustic sensors that detect sound reflected off the refuse in any suitable frequency range, including sound that is actively projected toward the refuse and/or ambient sound. Collected sound data can be analyzed to detect sounds that are characteristic of certain contaminants, such as the sound of Styrofoam being dropped in the hopper. Contaminant sensors can also include sensors that detect EM radiation outside the visible spectrum, such as UV, IR, microwave, and so forth. Contaminant sensors can include chemical sensors to detect traces of certain molecules in proximity to the refuse, where the presence of such chemical can indicate contamination. Shock sensors can also be employed to detect shock at a precision beyond that discernable by the human car. The different types of contaminant sensor devices may be collocated together in a package of sensors, such that the different types each image a substantially similar view of the refuse. Alternatively, different types of sensor devices may be arranged to optimally collect their different types of data from the refuse.

Different types of contaminant sensor data can be combined to create the sensor fusion, to provide greater confidence in the predictions through analysis of different types of data. A sensor fusion is a combination of different sensor data types. A sensor fusion can be a time-based correlation of different types of data. For example, IR data at a particular time can be correlated with image and/or video data at the same time, as well as potentially other types of data.

Contaminant sensor data can be correlated with the location data (e.g., GPS coordinates) at a time when the contaminant sensor data was generated, to determine a location (e.g., particular customer address) where the RCV was located while collecting the refuse that is depicted in the contaminant sensor data.

In some implementations, the hopper, Curotto-Can™, or other container that holds the refuse can be arranged with source(s) of illumination. For example, strips of light, point sources of light, lamps, LED fixtures, and/or other suitable light sources can be used to illuminate the refuse to enable the collection of contaminant sensor data that is more effectively analyzed for a higher confidence prediction. Any suitable number and arrangement of light sources can be employed. The light source(s) can be arranged to provide substantially uniform illumination of the refuse (e.g., in white light). The light source(s) can emit visible light and/or light in other spectrum ranges, such as IR or UV illumination of the refuse.

Contaminant Sensor Processing (CSP) can use imaging, audio, and/or gas chromatography sensor data, and/or other suitable data collection, to create a dataset in a raw format. Image sensors may use visible and non-visible spectrum (such as infrared, UV, radioactive) to create an ultra-wide data set. The audio sensors can use high resolution and/or high bandwidth to capture all relevant frequency information. Gas chromatography sensors can include organic (e.g., food waste) or chemical detectors indicative of contamination. The sensors may include custom hardware and/or off-the-shelf hardware such as tablet/smartphone/IP cameras, and so forth.

In some implementations, Contaminant Sensor Processing (CSP) can monitor contaminant sensors and is capable of self-determining contaminant sensor health within the environment being sensed. For example, a video sensor is capable of self-determining when all or part of its field-of view is blocked by a temporary obstacle, obscured by grime, distorted by rain, or otherwise impaired.

In some implementations, CSP enhances sensor data for Contaminant Sensor Fusion and Contaminant Model Detection. For example, a video sensor monitoring a truck's hopper during daylight hours is often viewing a scene that is part brightly lit by sunlight and part dimly lit due to the shadow from the side of the hopper. This divergent scene can be anticipated based on sun location, truck heading direction, hopper geometry, and current weather conditions. Scene normalization balances the differences between brightly and dimly lit areas of the video stream to provide consistent sensor data for sensor fusion and model detection. Audio signal processing can detect and localize contaminants as they enter the truck hopper based on interaction with other recyclables and the side of the truck.

In some implementations, CSP uses detected shadow areas to control light sources to add illumination to the shaded areas of the truck hopper. The intensity of illumination is controlled by the disparity between the shaded and illuminated area.

CSP can occur on a computing device either co-located with the sensor, located centrally within the truck, or located remotely separate from the truck. Depending on configuration, CSP output is compressed and stored locally for future viewing or transmission.

In some instances, CSP immediately reports changes in health and routinely reports health status to a Contaminant Sensor Management processor. Health status reports can be included internally within the sensor data stream or external to the sensor data stream. CSP can respond optionally to requests for health status from the Contaminant Sensor Management processor.

In some implementations, Contaminant Sensor Fusion utilizes high resolution and high bandwidth data fed from sensors distributed across a vehicle at multiple locations for best possible coverage of recycling bin contents entering the truck hopper. Sensor fusion is used by AI methods in Contaminant Detection. Sensor fusion manages compression and modification of each data feed to control cost and bandwidths. In some examples, Contaminant Sensor Fusion evolves over time to produce sensor feeds that generate best results for Contaminant Detection. This evolution considers availability of Contaminant Detection processing and flexibility of data feeds that can be provided in static or dynamic real-time format.

In some implementations, Contaminant Sensor Fusion (CSF) is used to perform one or more of the following:

- Synchronize imaging sensors from different aspect angles to create stereoscopic or volumetric views of objects;
- Reconstruct the blocked parts of an image by filling detected object back in using AI predictive methods;
- Associate audio sensors with imaging sensors to identify the sound of objects emptied from trash bins into the truck hopper;
- Track objects frame-to-frame in real-time using a single camera as they fall into the hopper to capture multiple views of the same object. Use flash lighting to aid tracking and build a volumetric model of the object; and/or
- Track the fall rate of objects in a video stream to determine density of the objects In some instances, a measurement of drag of the objects may be used to determine their density.

Contaminant Sensor Management (CSM) can monitor Contaminant Sensor Processing for impairment and can configure Contaminant Sensor Fusion based on the availability of contaminant sensors and the input that is to be provided to Contaminant Detection Processing.

Upon receipt of a health report from CSP indicating sensor impairment, CSM can request confirmation of sensor impairment from the truck driver, crew, and/or a (cloud-based, web-based, and/or central) reviewer. A confirmation request may include data and graphical information for presentation to the reviewer indicating the nature of the impairment detected.

In some implementations, CSM reconfigures CSF to use the remaining contaminant sensors as required by Contaminant Model Detection. CSM may report sensor impairment to the waste collection service provider ordering cleaning or repair. CSM may also restore normal sensor configuration upon confirmation from a reviewer that sensor impairment no longer exists.

In some implementations, CSM monitors the importance of an individual sensor's input by tracking the weights while training a detection model. If the weights that are applied to the sensor input are continuously decreasing (or become zero), an event may be generated to check for an issue with the sensor.

CSM processing can occur on a computing device co-located with a "master" sensor, located centrally within the truck, and/or located remotely separate from the truck.

In some implementations, CSM immediately reports changes in health and routinely reports health status reports about sensors and sensor fusion to a Contaminant Model Management processor. CSM responds to requests for sensor availability and sensor fusion configuration from the Contaminant Model Management processor.

In some implementations, Containment Detection identifies the type and location of both contaminants and recyclable material dumped into the hopper of a truck based on input from either CSF, CSP, or both CSF and CSP. Types of contaminants and recyclables may be specified by a set of class names (e.g., Styrofoam, plastic bag, hose, wire, cardboard, paper, plastic bottles, glass, cans, etc.). Contaminant classes can vary from truck to truck based on the intake capabilities of local recycling facilities. Location of contaminants can be specified by either a bounding box or segmentation of the contaminant in a video (visible spectrum) sensor image of the truck hopper.

In some implementations, an Object Detection module forms the core of Contaminant Detection and uses a configurable set of ML techniques depending on sensor configuration available on the truck, as shown in FIG. 18. Convolutional neural networks (CNNs) may be trained specifically for detection of contaminants and used typically for two-dimensional visible spectrum and non-visible sensor input data. Configuration can take the form of a detection model that specifies feature detection processes to be applied to sensor data, feature accumulation functions, and feature weights applied to the feature accumulation functions. For example, a detection model can provide a portable specification executable on suitable processors. Models used for Contaminant Detection include but are not limited to AlexNet, GoogleNet, ResNet, and VGG.

In some implementations, the analysis performed by the ML engine can employ a suitable deep learning network. The network can provide a measure of fit, such as a precision metric. In some implementations, a loss function may be employed, and the level of precision or confidence in the prediction may be based on the loss function being less than a threshold value. For example, the model may be trained until the loss function is less than the threshold value, to ensure an appropriate degree of accuracy (e.g., confidence) in the prediction output by the model. In a particular example, a false positive rate (e.g., of incorrectly identifying the presence of contamination in a particular customer's refuse) may be kept at 5% or less.

In some implementations, the loss function involved in the contaminant detection model has specialized considerations due to its usage in the public domain. Different households as well as neighborhoods may have varying degrees of sensitivity to being alerted for contaminants in their refuse marked for recycling. This sensitivity may change over time. Further, the campaigns conducted by the refuse collection operator may have varying degrees of acceptance. For instance, an informational campaign might reach out to larger parts of neighborhoods in which the falsely alerted households are not likely to be particularly offended. On the other hand, a stricter campaign with a stronger message might have a more potent reaction from falsely alerted households.

Thus, the model may incorporate dual objectives of maximizing the true positive rate (TPR), while minimizing the false positive proportion ($FP_{prop}$). These terms are defined below in the example of Table 1, using confusion matrix terminology.

TABLE 1

| | | True Value | |
|---|---|---|---|
| | | Cont | Non-cont |
| Predicted | Cont | A | B |
| | Non-cont | C | D |

In some examples, TPR (also described as sensitivity or recall) can be calculated per the following formula: TPR=A/(A+C). $FP_{prop}$ can be calculated per the following formula: $FP_{prop}$=B/(A+B+C+D)

In some examples, both of these are functions of the classification model parameters, θ. Two specialized optimization problems can be formulated as shown in the examples below.

Formulation 1: Maximize TPR(θ) subject to $FP_{prop}(\theta) < FP_{prop}^{tet}$, where $FP_{prop}^{tet}$ is a maximum $FP_{prop}$ value that the user (e.g., modeler) achieves.

Formulation 2: Minimize $FP_{prop}(\theta)$ subject to $TPR(\theta) > TPR^{tgt}$, where $TPR^{tgt}$ is a minimum TPR value that the user (e.g., modeler) achieves.

Additional considerations pertaining to specific applications can be added to the formulations. For instance, instead of a minimum TPR or maximum $FP_{prop}$, the problem may minimize deviation from target values, such as in the below example of Formulation 2a.

Formulation 2a: Minimize $FP_{prop}(\theta)+\alpha \times \max[0, (TPR(\theta)-TPR^{tgt})]$, where α is a relative weight between the positive deviation of TPR from its target and $FP_{prop}$.

The implementations described herein can use any of the above formulations or suitable derivatives thereof in the model development process to determine the best set of parameter values θ*.

An example process for model development is presented below:

For j in 1 to n times:

Randomly split the dataset into k parts (also known as folds).

For each fold i:

Combine the remaining k−1 folds as training dataset,

Train an ML classification model,

Predict on the fold i using the trained model—obtain predicted score for contamination, and Solve an appropriate formulation to obtain the optimal parameters $\theta_{ij}$*.

Selection of final model parameters θ* from the set of $\theta_{ij}$* can be finally done through a variety of methods, for instance, mean, median, most frequent values, and so forth.

In some implementations, the results of the analysis (e.g., the prediction generated by the model) may be in the form of a binary answer, indicating whether there is contamination or not. Alternatively, the results may be generated as a list of materials identified in the refuse and/or a proportion of each material in the refuse (e.g., 20% recyclable, 80% non-recyclable, or 10% paper, 20% plastic, 30% organic waste, etc.). In some examples, the results may include information describing particular objects in the refuse identified as types of materials, such as images overlaid with bounding boxes or other visual indicators of contaminant objects. The analysis can include classification of contaminant sensor data (e.g., images), object detection within the contaminant sensor data, or both.

In some implementations, the results of the analysis to identify contamination (or lack thereof) in the refuse may be used to automatically perform an action, such as an action to route the RCV to an appropriate facility. For example, the RCV can be routed to a facility that is suitable for processing recyclable materials, if the refuse is found to contain at least a threshold amount of recyclable material. Such routing may including sending an instruction to redirect an autonomous RCV, or sending an instruction to a driver of the RCV. The results of the analysis can also trigger an action to print and send (e.g., mail, email, etc.) a notification (e.g., letter) to a customer indicating that contamination is present in the refuse they are providing for collection.

In some implementations, a model may be developed for each customer that describes a typical refuse stream for that customer, and deviations from the model may be used to trigger action(s) related to the customer's refuse. In instances where on-vehicle analysis is performed, such that the ML model is applied on the vehicle to analyze refuse in real time as it is collected, the predictions generated by the model may be (e.g., visually) reviewed by personnel in the vehicle as they are generated. The personnel may verify whether the prediction is accurate (or not), and indicate through a user interface whether the prediction is accurate. This review may be used to further refine and retrain the model for more accurate prediction.

As described herein, the application of the model to make predictions may be performed on the RCV, in the cloud, or elsewhere. In either example, analysis may be performed in real time as the data is collected, in a batch process sometime later, or both types of analysis may be employed. The analysis performed using the model may be performed in real time, using a stream of contaminant sensor data, such that the predictions generated by the model are generated periodically based on the current set of contaminant sensor data. Alternatively, the analysis may be triggered based on a triggering event or condition that is determined based on the location data and/or the operational sensor data, as described above. In the examples where the contaminant sensor data is analyzed substantially in real time as a stream of data, the object tracking described herein may be used to track objects (such as particular pieces of contaminant or non-contaminant refuse) over time as the refuse moves in the hopper (or the Curotto-Can™), and is supplanted with additional refuse.

Real time analysis of the refuse stream may necessitate additional computing resources compared to batch processing of the contaminant sensor data after the fact. The computing system doing the analysis may be optimized to provide sufficiently accurate and reliable predictions within a time period that is suitable for triggering the appropriate actions in response to a prediction.

FIG. 17 depicts an example schematic 1700 of multiple object detection models with automated retraining, according to implementations of the present disclosure. As shown in this example, any suitable number of sensor fusions 1702 can each provide data to an instance of contaminant detection 1608. The output of the various contaminant detections 1608 can be used to generate a final classification 1704 which is provided to contaminant system management 1706 and which may also be used in contaminant model training 1708. In some examples, each sensor fusion 1702 may include contaminant sensor data from a different set of contaminant sensors, such that the analysis of multiple sensor fusions by different contaminant detections 1608 (e.g., different models) may represent a redundancy to ensure a more accurate final output from the final classification 1704. The contaminant system management 1706 may initiate the action(s) described above, which are triggered in response to certain output(s) from the final classification 1704.

Multiple detection models may be employed in Object Detection and/or prediction for multiple sensor or sensor fusion inputs, in which a sensor fusion 1704 includes any suitable number of contaminant sensors 1616. In this example, a final classifier combines the resulting outputs of the multiple models. Alternatively, multiple sensor inputs may be combined and used by a single detection model to produce a final class label and location for each detected object. Any individual model results that differ from the final detection result may be sent to Contaminant Model Training in the dataset for that model with the correct class identified, as shown in the example.

FIG. 18 depicts an example schematic 1800 of AI components of contaminant detection 1608, according to implementations of the present disclosure. As shown in this example, contaminant detection 1608 can include object detection 1802, object tracking 1804, object segmentation 1806, and scene context 1808. A sensor fusion 1810 can provide contaminant sensor data to the contaminant detection 1608 as described herein.

A contaminant sensor fusion 1810 can be provided to contaminant detection 1608, which can include one or more ML-trained model. The contaminant detection can include one or more of object detection 1802 and object segmentation 1806. Object detection 1802 can include, for example, designating a boundary box that includes objects in the refuse that the model has identified as contaminant (or non-contaminant) objects. The object segmentation 1806 can be a more fine-grained boundary of each object, distinguishing different objects from one another in a more distinct manner. Object tracking 1804 can be a time based set of data (e.g., a time series) that provides information regarding the movement, over time, of particular objects in the collected refuse, tracked until it disappears from the scene through removal or being covered by other objects. The scene context 1808 can include information regarding objects that are proximal to other objects. For example, the model may take into account objects that fully, or partly, occlude other objects in the contaminant sensor data that is collected. The dimensions of the container and/or their characteristics can also be accounted for in the scene context 1808. Scene context 1808 and other aspects of the model can also be used to estimate characteristics of the objects that are identified as contaminants or non-contaminants, such as volume, shape, color, material, and so forth.

In some instances, an Object Segmentation module is applied when a precise description of detected objects is appropriate and processing resources are available. Segmentation provides a pixel by pixel classification of object location to provide an exact boundary of contaminant objects. Object Segmentation follows Object Detection or, alternatively, takes input directly from CSF. When configured to use Object Detection, segmentation models trained for pixel classification may be applied to regions identified by Object Detection as containing a contaminant object. Models operating directly based on the sensor data input may be trained and deployed using the same CNN technology used for Object Detection, the difference being that instead of being trained to detect one of a class of objects, the model detects one of a class of individual pixels.

In some implementations, Object Tracking incorporates temporal information from a sequence of results generated by Object Detection and, if applied, Object Segmentation modules. Object Tracking can be applied to a sequence of sensor data input showing recyclables dropped from a trash bin into a truck hopper. An individual object detected and linked from frame to frame in a sequence may increase confidence of model detection results and event reporting.

Scene Context can add knowledge of how contaminants interact within a truck hopper to increase confidence of model detection results. For example, a plastic bag (which is often considered a contaminant) deforms in the presence of other solid recyclables or when deposited against the bottom or side of a hopper. Using this deformable property combined with knowing the location of hopper sides and bottom aids in confirming an object detected in the plastic bag class.

Contaminant Detection processing of one or more detection models executes on a computing device either co-located with a "master" sensor or located centrally within the truck. Alternatively, processing executes remotely using sensor data transmitted wirelessly to a remote processor.

Models used for Contaminant Detection can be trained with sensor data from either a single truck or multiple trucks. Training on a single truck allows models to evolve independently. When training a model for multiple trucks, the trucks may be determined to have available similar and compatible sensor data. For example, a model requiring a volumetric view may require fusion of multiple imaging sensors that trucks which a single imaging sensor may not be able to support.

In some instances, Contaminant Training makes available the trained model to all similar trucks for use in Contaminant Detection. When training a model for a single truck, Contaminant Training monitors similar trucks for detection accuracy and, optionally, requests or distributes models with best detection accuracy to all the similar trucks. Trained models may be continuously updated based on any, or all, of the following:

- Truck drivers or crew members may use in-cab or mobile devices to tag or label specific instances of possible objects of interest (e.g., contaminants);
- Cloud-based reviewers may monitor automated review through a High-Speed Reviewing System (HSRS) and resolve questionable or unclassifiable detection results; and/or
- Feedback from waste processing facilities for contaminants that may not have been previously detected.

Updates may take the form of new classes of objects of interest or retrained models for previously trained objects. Misclassified results can be automatically fed back into the training dataset for the correctly classified contaminant class to improve the model on the next training iteration.

In some implementations, Contaminant Model Management determines when to allocate processing resources to sensor processing, sensor fusion, contaminant detection, and model training.

Models may be trained to detect contaminant classes of interest that may be defined by local recycling regulations, waste processing facility capabilities, waste service provider preferences, or other purposes. The models may be trained to detect all the contaminant classes of interest or trained to detect a specific class. Contaminant Model Management can determine which model or configuration of a model to use and when to use it. In some implementations, requests to use the trained models to detect contaminants can be satisfied by specifying:

- The set of classes to detect (contaminants and non-contaminants);
- The truck or set of trucks requested to provide sensor input data;
- The location or area where detection is called for (e.g., specific customer pickup sites or municipal boundaries); and/or
- When and where detection results are to be used (e.g., notify truck driver when contaminants are detected, notify recycling facility prior to truck arrival, dynamic truck rerouting).

Using the specification requested, Contaminant Model Management can determine where to execute models for detecting requested contaminant class sets based on one or more of the following: availability of sensor input data on each requested truck, cost of transmitting sensor input data, and/or cost of executing the model on available processors. A model can be packaged and deployed to the processing node for execution based on one or more of the following: the object set to be detected, the capabilities of the selected processing node, and/or the sensor input data available to the selected processing node.

In some implementations, a contaminant detection report for a truck's current intake is continuously updated with input from Contaminant Detection. The report identifies the type, number and percentage of contaminants and non-contaminants. If a Contaminant Detection report indicates that the target local recycling facility is likely to reject the truck's contents, the system can initiate dynamic rerouting of the truck to a local or otherwise convenient and available landfill facility.

Individual configuration and usage of Contaminant Detection Networks comprehends a wide variety of installed truck bases, local ordinances and cost component that considers available hardware and sensors on the truck fleet, cellular network plans, data storage access, reviewer availability and training, among many other considerations.

On-the-truck/On-the-edge detection and model training with remote offline reviewing:

Contaminant Detection occurs on a truck. Contaminant Detection events are packaged with sensor data/GPS location and sent to a remote review system (automated or manned). The sent package is retained on the truck.

Review system grades the event as valid or invalid and then sends back to the truck the grade and, if invalid, the correct detection class.

Contaminant Training occurs on the truck. Contaminant Model Management receives the grade from the review system and adds the retained sensor data to the training dataset under the correct class for inclusion in future model training.

On-the-truck/On-the-edge detection and model training with local reviewing:

Contaminant Detection occurs on a truck. Contaminant Detection events are displayed locally (ELD, dashboard, etc.).

Truck driver or crew member grades the event as valid or invalid and, if invalid, identifies the correct detection class.

Contaminant Training occurs on the truck. Contaminant Model Management receives the grade from the driver or crew member and adds the displayed image to the training dataset under the correct class for inclusion in future model training.

On-the-truck/On-the-edge detection and model training with mid-stream (FOG) reviewing:

Contaminant Detection occurs on a truck. Contaminant Detection events are displayed locally within a facility in proximity to the truck (e.g., landfill or recycling center).

Facility intake grades the event as valid or invalid and, if invalid, identifies the correct detection class.

Contaminant Training occurs on the truck. Contaminant Model Management receives the grade from the intake facility and adds the reviewed image to the training dataset under the correct class for inclusion in future model training.

On-the-truck/On-the-edge detection, in-the-cloud model training with remote offline reviewing:

Contaminant Detection occurs on a truck. Contaminant Detection events are packaged with sensor data/GPS location and sent to remote review system (automated or manned). The sent package is retained on the truck.

Review system grades the event as valid or invalid and then sends to cloud-based contaminant model management the grade and, if invalid, the correct detection class and packaged sensor data.

Contaminant Training occurs in the cloud. Contaminant Model Management receives the grade and sensor data package from the review system and adds the received sensor data to the training dataset under the correct class for inclusion in future model training.

On-the-truck/On-the-edge detection and model training with remote online (live streaming) reviewing:

Contaminant Detection occurs on a truck. A live sensor feed is sent to remote review system (automated or manual). The sensor data is retained on the truck.

Review system determines the correct detection class.

Contaminant Training occurs on the truck. Contaminant Model Management receives the correct detection class from the review system and adds the retained sensor data to the training dataset under the correctly detected class for inclusion in future model training.

In some implementations, contaminant detection customer engagement provides feedback to customers when contaminants are found in the customer's recycling container. Customer engagement can include keeping track of customer improvement in reducing contaminants and, for residential customers, having neighborhood competitions to reduce contaminants. Customer engagement can access contaminant detection models allowing immediate detection of items for disposal. A mobile application can allow customers to take a picture of an item and, by using the contaminant detection model, recommend the correct container for disposal.

Some implementations provide an HSRS. Many actors in waste management can contribute "ground truth" labelling and review of waste collection events. Both automated and manual review processes can be used to monitor all critical functions of the Smart Truck Network. Labelling can be used to identify objects of interest (both contaminants and non-contaminants) depicted in the Contaminant Detection Network data. Manual reviewing includes, in some examples, one or more of the following:

- Drivers/crew initiate reviews using a user interface to a camera feed. The user interface allows the driver or crew member to label an event containing specific contaminants;
- Cloud-based reviewers verify and delineate objects (for further automated training, driver feedback and/or customer notification); and/or A facility-based reviewer reports events related to downstream contaminants (either detected or undetected by the Smart Truck Sensors).

The HSRS supports reviewers creating new classes based on monitoring observations. The HSRS system prioritizes reviewing of new uses cases based on past accuracy results of automated reviews and automatically reduces the percentage of manual reviews over time. The HSRS can show content to the user in multiple formats with multiple display overlays and annotations to save time and reduce redundant reviews. The HSRS supports combining multiple reviews of similar events to generate a single review output.

Below is an example description of multi-layer ML (e.g., CNN or other type of Deep Learning) that may be employed in some implementations.

Artificial Intelligence Sensor Network: (AISN) (Layer 1).

The system can use image and audio sensor data to create dataset in raw format. The image sensor(s) of the system use visible and non-visible spectrum (such as infra red, UV, radio active) to create an ultra-wide data set. The audio sensor(s) of the system use high resolutions and high bandwidth to capture frequency information. The sensors can be a combination of custom hardware and/or off the shelf hardware tablet/smartphone/IP cameras.

The sensor network is configured to record high resolution and high bandwidth data feed, which is distributed across the refuse collection vehicle associated with the system and at multiple locations for improved coverage. The sensor network is part of an AI system that can self modify based on training results and/or user feedback in order to optimize the performance results and efficiency. In some implementations, the optimization process involves compression and modification of each data feed to control costs and bandwidth requirements, to optimize the system over time, and to transmit a subset of compressed data. The data feed modification can be in static or dynamic real-time format for maximum flexibility.

Edge and Cloud Training and Inference Network (ECTIN) (Layer 2 and 3).

The dataset create by the AISN is used as input to object classification using machine learning. ECTIN runs a customized machine learning algorithms and/or models based on a various machine learning models such but not limited to VGG16, VGG19, Alexnet, LeNet, AlexNet, VGG, GoogLeNet, ResNet, ResNet50, Inception V3, Xception.

In some implementations, the system uses a custom training model that is constantly updated over time based on feedback from the user and HSRS and AIUI.

In some examples, the inference results from the trained network are also reviewed by human and Artificial intelligence software (HSRS) that back propagate into ECTIN models.

ECTIN (Edge Processing).

The ECTIN is integrated in AISN on the edge to process data in real time at high data rates to provide high performance results. As an example, the system can do inference in real time on each image received from the AISN without sending the image to the cloud. The inference results are used in real time across multiple sensors and also on the same sensor in a temporal manner to improve yield results and effectively perform sensor fusion. The sensor fusion is performed in real time across the sensor(s) on a single vehicle, as well as across multiple trucks using standard communication network such as 3g/4g and future 5g. Sensor fusion can also be performed using p2p communications technology, including, but not limited to v2v, and v2i, v2x.

Application specific classes for an application may be user defined. The list of classes can be white listed or black listed for specific applications, such as recycling contamination and trash content analysis. The list of classes that can be detected can include, but is not limited to, organic waste, food, liquids, nuclear and medical waste.

High Speed Reviewing System (HSRS) (Layer 4).

Implementations of the system provide a combination of automated and manual review processes that monitor all critical functions of the AISN. Implementations can also be used to create new classes based on monitoring results. In some examples, the HSRS system prioritizes reviewing of new uses cases based on past accuracy results and automatically reduces the manual review percentage over time. The HSRS can show content to the user in an optimal way to save time and reduce redundant reviews. In some implementations, each review can process several thousand images and video minutes per minutes with the ML acceleration described herein.

Artificial Intelligence User Interface: (AIUI) (Layer 5).

In some implementations, the system has the ability to transmit notifications to a user in real time or at a customizable time. Notifications transmitted to the user can include information related to contaminations, safety exceptions, maintenance issues, or operations notifications required by each individual business use case that the AI system learns over time. In some implementations, the user has the ability to challenge or confirm the results of the system. This feedback is used to improve inference on edge and/or in the cloud.

Figure 19:
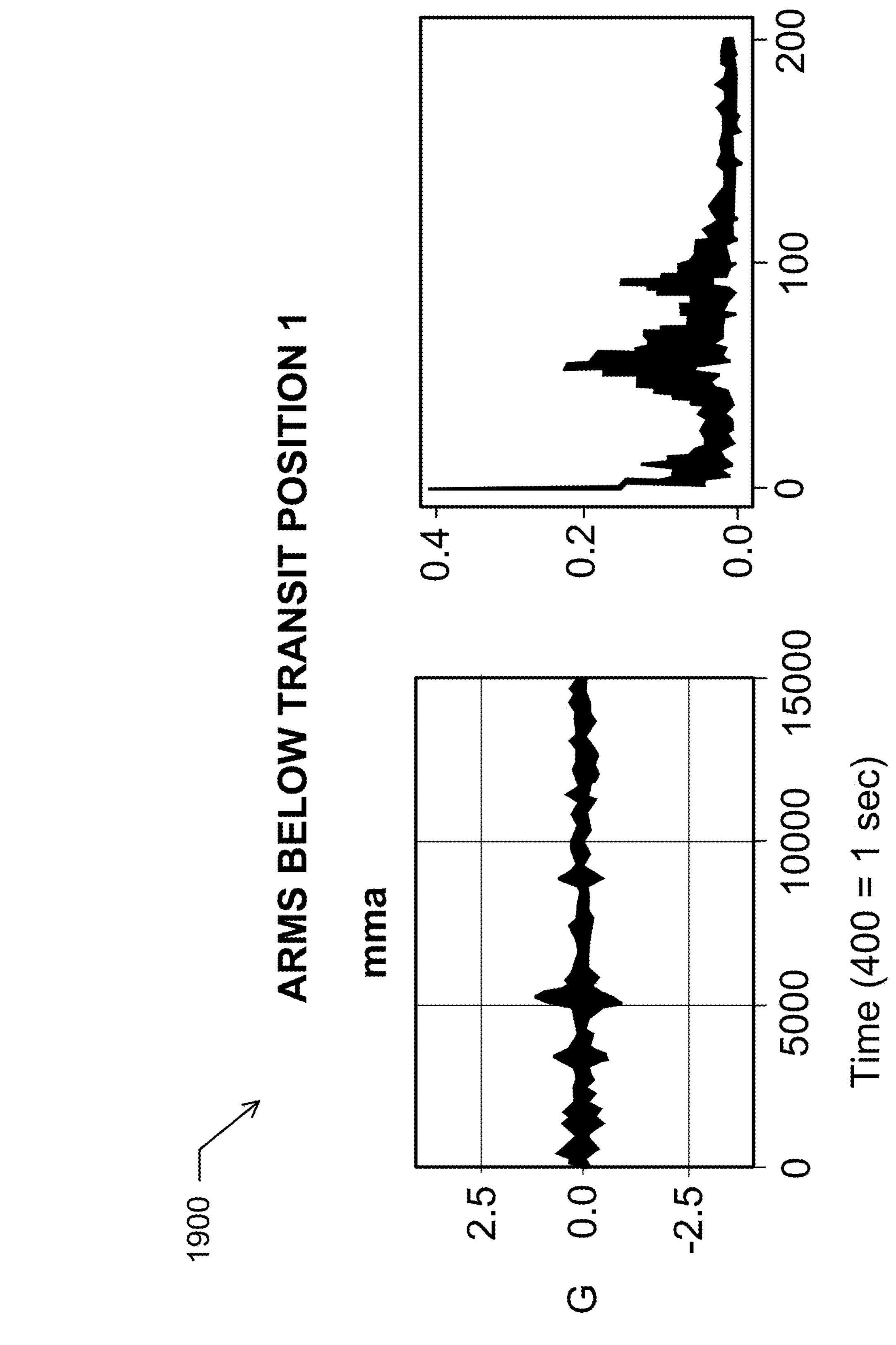
FIG. 19 depicts an example graph of accelerometer data that may be employed, according to implementations of the present disclosure.

FIG. 19 depicts an example graph 1900 of accelerometer data that may be employed, according to implementations of the present disclosure. For example, accelerometer data may be employed to detect lift arm events (e.g., arm below transit position threshold).

Figure 20:
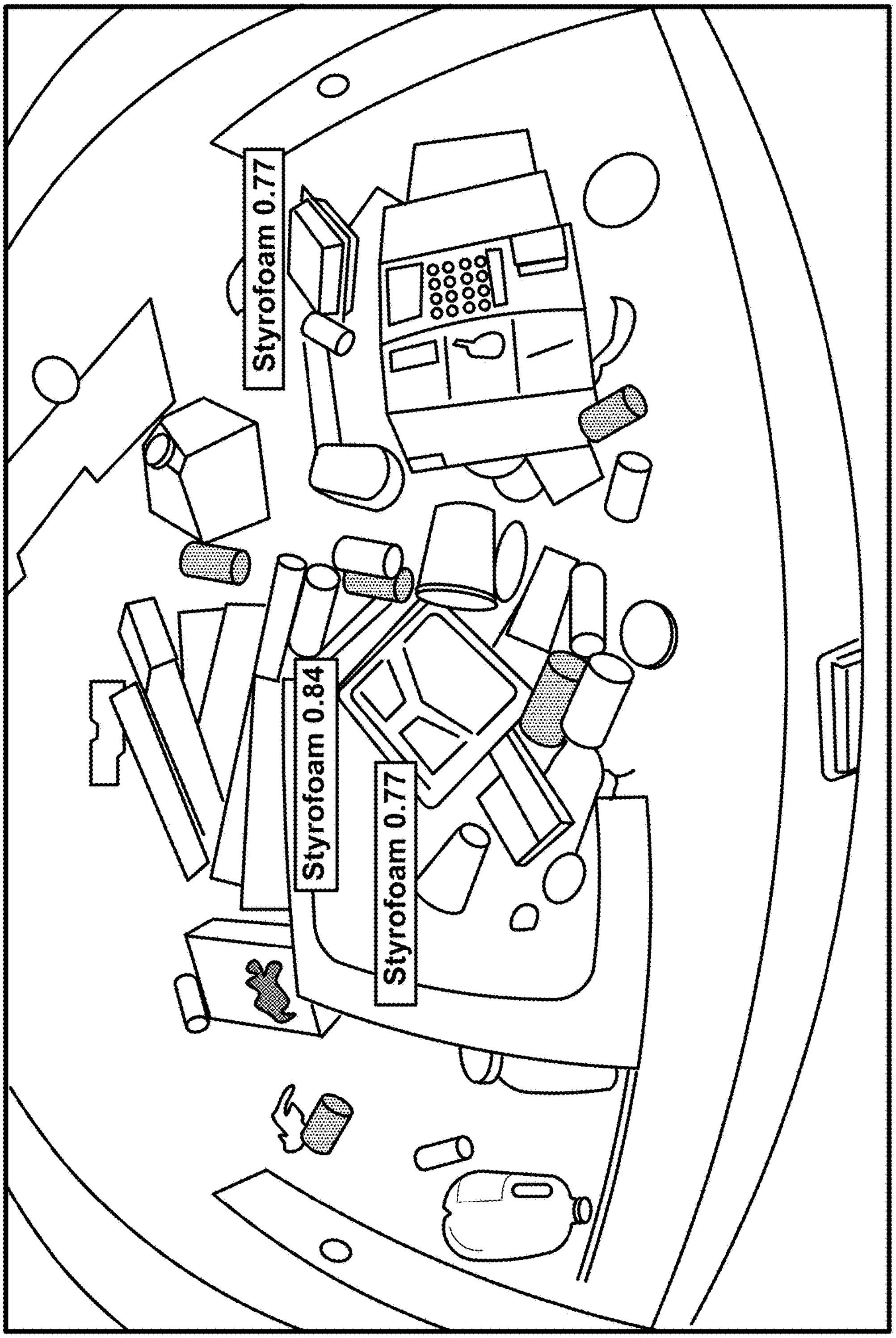
FIG. 20 depicts an example image classification with contaminant object identification, according to implementations of the present disclosure.

FIG. 20 depicts an example image classification 2000 with contaminant object identification, according to implementations of the present disclosure.

Figure 21:
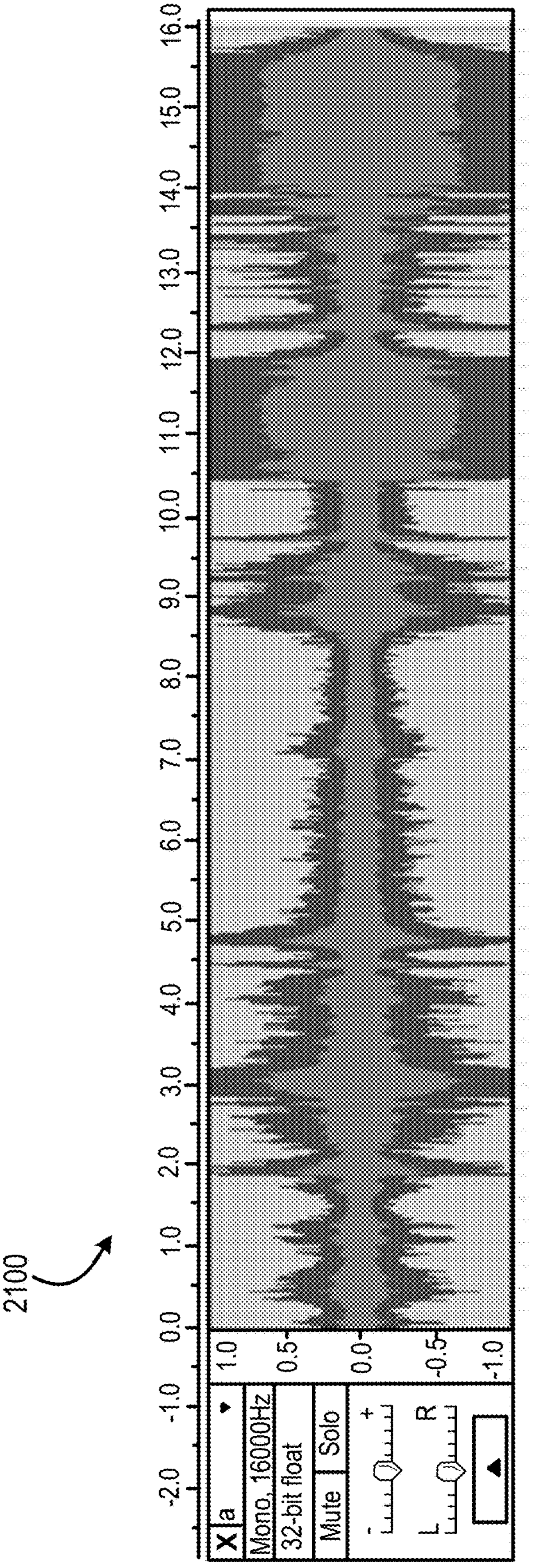
FIG. 21 depicts an example of audio data that may be employed in the analysis, according to implementations of the present disclosure.

FIG. 21 depicts an example 2100 of audio data that may be employed in the analysis, according to implementations of the present disclosure. For example, such audio data may be collected and analyzed, as described herein, to detect a characteristic sound of particular type(s) of material(s) present in the refuse (e.g., contaminant Styrofoam, etc.).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term “computing system” encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A refuse collection vehicle (RCV), comprising:

a hopper configured to receive refuse;

one or more refuse collection surfaces configured to temporarily interrupt falling of the refuse into the hopper, the one or more refuse collection surfaces being movable to deposit the refuse into the hopper;

at least one image sensor configured to capture image data of the refuse positioned on the one or more refuse collection surfaces, wherein movement of the one or more refuse collection surfaces is based at least in part on a timing of capture of the image data by the at least one image sensor;

a sensor device configured to detect an operation state of a vehicle body component of the RCV; and at least one processor communicably coupled to the sensor device and the at least one image sensor, the at least one processor configured to perform operations comprising:

analyzing sensor data to detect a presence of a triggering condition based at least in part on a particular operational state of the vehicle body component, the sensor data being generated by the sensor device and indicating the operational state;

in response to detecting the triggering condition, accessing the image data generated by the at least one image sensor, the image data indicating a physical state of the refuse positioned on the one or more refuse collection surfaces;

providing the image data as input to at least one contaminant detection model trained, using at least one machine learning (ML) algorithm, to output a classification of the image data, wherein the classification indicates a degree of contamination of the refuse; and storing, in a machine-readable medium, the classification of the image data.

2. The refuse collection vehicle of claim 1, wherein:

the one or more refuse collection surfaces comprise:

a first surface; and a second surface; and movement of the one or more refuse collection surfaces comprises movement of the first surface and the second surface to deposit refuse, from the first surface and the second surface, into the hopper.

3. The refuse collection vehicle of claim 2, wherein movement of the one or more refuse collection surface comprises:

rotation of the first surface about a first axis; and rotation of the second surface about a second axis different from the first axis, wherein the second axis is parallel to the first axis.

4. The refuse collection vehicle of claim 3, wherein:

the first surface and the second surface are surfaces of a set of pivot vanes that are movable between a closed state and an open state;

in the closed state, the set of pivot vanes cooperatively form a surface for temporarily supporting the refuse while the at least one image sensor captures the image data; and in the open state, the set of pivot vanes allows the refuse to fall into the hopper.

5. The refuse collection vehicle of claim 3, wherein the first axis and the second axis are orthogonal to a forward and rearward direction of travel of the RCV.

6. The refuse collection vehicle of claim 2, wherein:

the one or more refuse collection surfaces comprise:

a front edge facing a front of the RCV; and a rear edge facing a rear of the RCV; and the one or more refuse collection surfaces are movable to deposit, from at least one of the front edge or the rear edge, refuse into the hopper.

7. The refuse collection vehicle of claim 1, wherein:

the one or more refuse collection surfaces form a retractable door that is movable between an extended state and a retracted state;

in the extended state, the one or more refuse collection surfaces form a surface for temporarily supporting the refuse while the at least one image sensor captures the image data; and in the retracted state, the one or more refuse collection surfaces are retracted to allow the refuse to fall into the hopper.

8. The refuse collection vehicle of claim 7, wherein:

the retractable door comprises a rolling door; and movement of the one or more refuse collection surfaces comprises:

at least a portion of the rolling door being rolled up to move from the extended state to the retracted state; and at least a portion of the rolling door being unrolled to move from the retracted state to the extended state.

9. The refuse collection vehicle of claim 7, wherein:

the retractable door comprises a sliding door, and movement of the one or more refuse collection surfaces comprises linear translation of at least a portion of the sliding door to move between the retracted state and the extended state.

10. The refuse collection vehicle of claim 1, wherein:

the one or more refuse collection surfaces are configured to be coupled with the hopper such that:

a front edge of the one or more refuse collection surfaces faces a front of the RCV; and a rear edge of the one or more refuse collection surfaces faces a rear of the RCV; and the one or more refuse collection surfaces are movable to deposit, from at least one of the front edge or the rear edge, refuse into the hopper.

11. A method, comprising:

placing refuse onto one or more refuse collection surfaces of a refuse collection vehicle (RCV), the one or more refuse collection surfaces being configured to temporarily interrupt falling of the refuse into a hopper of the RCV, and the one or more refuse collection surfaces being movable to deposit the refuse into the hopper;

capturing, using at least one image sensor, image data of the refuse positioned on the one or more refuse collection surfaces;

moving the one or more refuse collection surfaces based at least in part on a timing of the capturing the image data, wherein the RCV comprises multiple sensors configured to sense one or more characteristics of the refuse positioned on the one or more refuse collection surfaces, the multiple sensors comprising:

a first type of sensor configured to generate a first type of data; and a second type of sensor configured to generate a second type of data different than the first type of data;

performing, by at least one processor, sensor fusion to generate fused data based at least in part on a combination of the first type of data and the second type of data;

providing, by the at least one processor, the fused data as input to at least one contaminant detection model trained, using at least one machine learning (ML) algorithm, to output a classification of the fused data, the classification indicating a degree of contamination of the refuse; and storing, in a machine-readable medium, the classification of the fused data.

12. The method of claim 11, wherein:

the one or more refuse collection surfaces comprise:

a first surface; and a second surface; and the moving the one or more refuse collection surfaces comprises moving the first surface and the second surface to deposit refuse into the hopper.

13. The method of claim 12, wherein the moving the first surface and the second surface comprises:

rotating the first surface about a first axis; and rotating the second surface about a second axis different from the first axis, wherein the second axis is parallel to the first axis.

14. The method of claim 11, further comprising:

spreading, using a vibration generating mechanism, the refuse across the one or more refuse collection surfaces prior to capturing, by the at least one image sensor, the image data of the refuse positioned on the one or more refuse collection surfaces.

15. The method of claim 11, wherein:

the one or more refuse collection surfaces are configured to be coupled with the hopper such that:

a front edge of the one or more refuse collection surfaces faces a front of the RCV; and a rear edge of the one or more refuse collection surfaces faces a rear of the RCV; and the one or more refuse collection surfaces are movable to deposit, from at least one of the front edge or the rear edge, refuse into the hopper.

16. A system, comprising:

one or more refuse collection surfaces couplable with a hopper of a refuse collection vehicle (RCV) and configured to interrupt falling of refuse into the hopper, the one or more refuse collection surfaces being movable to deposit the refuse into the hopper;

at least one image sensor configured to capture image data of the refuse positioned on the one or more refuse collection surfaces, wherein movement of the one or more refuse collection surfaces is based at least in part on a timing of capture of the image data by the at least one image sensor;

a sensor device configured to detect an operation state of a vehicle body component of the RCV; and at least one processor communicably coupled to the sensor device and the at least one image sensor, the at least one processor configured to perform operations comprising:

analyzing sensor data to detect a presence of a triggering condition based at least in part on a particular operational state of the vehicle body component, the sensor data being generated by the sensor device and indicating the operational state;

in response to detecting the triggering condition, accessing the image data generated by the at least one image sensor, the image data indicating a physical state of the refuse positioned on the one or more refuse collection surfaces;

providing the image data as input to at least one contaminant detection model trained, using at least one machine learning (ML) algorithm, to output a classification of the image data, wherein the classification indicates a degree of contamination of the refuse; and storing, in a machine-readable medium, the classification of the image data.

17. The system of claim 16, wherein:

the one or more refuse collection surfaces comprise:

a first surface; and a second surface; and movement of the one or more refuse collection surfaces comprises:

rotation of the first surface about a first axis; and rotation of the second surface about a second axis different from the first axis, wherein the second axis is parallel to the first axis.

18. The system of claim 16, wherein movement of the one or more refuse collection surfaces comprises linear translation of the one or more refuse collection surfaces.

19. The system of claim 16, wherein:

the one or more refuse collection surfaces are configured to be coupled with the hopper such that:

a front edge of the one or more refuse collection surfaces faces a front of the RCV; and a rear edge of the one or more refuse collection surfaces faces a rear of the RCV; and the one or more refuse collection surfaces are movable to deposit, from at least one of the front edge or the rear edge, refuse into the hopper.

20. The system of claim 16, wherein the one or more refuse collection surfaces are configured to move vertically within the hopper to accommodate additional refuse placed on the one or more refuse collection surfaces.

* * * * *